US012651020B2

(12) United States Patent
Aggarwal et al.

(10) Patent No.: US 12,651,020 B2
(45) Date of Patent: Jun. 9, 2026

(54) DIGITAL ASSISTANT INTELLIGENCE ENGINE

(71) Applicant: Apple Inc., Cupertino, CA (US)

(72) Inventors: Akshay Aggarwal, San Jose, CA (US); Shruti Bhargava, Seattle, WA (US); Karan M. Daryanani, San Francisco, CA (US); Saiyam Kohli, Cupertino, CA (US); Christine S. O'Mara, Cary, NC (US); Lewis N. Perkins, Cambridge, MA (US); Nidhi Rajshree, Los Gatos, CA (US); Chiraag Sumanth, San Francisco, CA (US); Nicholas L. Tzou, Sunnyvale, CA (US); Hong Yu, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/084,647

(22) Filed: Mar. 19, 2025

(65) Prior Publication Data

US 2025/0348534 A1     Nov. 13, 2025

Related U.S. Application Data

(60) Provisional application No. 63/737,450, filed on Dec. 20, 2024, provisional application No. 63/670,057, (Continued)

(51) Int. Cl.
G06F 16/632          (2019.01)
G06F 16/2457         (2019.01)
(Continued)

(52) U.S. Cl.
CPC ...... *G06F 16/632* (2019.01); *G06F 16/24575* (2019.01); *G06F 16/638* (2019.01); *G06N 3/006* (2013.01)

(58) Field of Classification Search
None
See application file for complete search history.

(56) References Cited

U.S. PATENT DOCUMENTS 7,555,431 B2     6/2009    Bennett
7,624,007 B2    11/2009    Bennett
(Continued)

OTHER PUBLICATIONS

Coulouris et al., "Distributed Systems: Concepts and Design (Fifth Edition)", Addison-Wesley, May 7, 2011, 391 pages.
(Continued)

*Primary Examiner* — Yu Zhao
(74) *Attorney, Agent, or Firm* — YHE Law LLP

(57) ABSTRACT

Systems and processes for operating an intelligent automated assistant are provided. An example method includes, at a computer system that is configured to communicate with a display generation component and an input device: detecting an audio input including a query; in response to detecting the audio input including the query: retrieving contextual data related to the query; in accordance with a determination that the query includes a request of a first type: converting the query to a rewritten query based on the contextual data related to the query; and providing the rewritten query to a first digital assistant component; and in accordance with a determination that the query includes a request of a second type different from the request of the first type, providing the query and the contextual data related to the query to a second digital assistant component different from the first digital assistant component.

45 Claims, 35 Drawing Sheets

Related U.S. Application Data filed on Jul. 11, 2024, provisional application No. 63/657,722, filed on Jun. 7, 2024, provisional application No. 63/646,803, filed on May 13, 2024.

(51) Int. Cl.
  *G06F 16/638*  (2019.01)
  *G06N 3/006*  (2023.01)

(56) References Cited

U.S. PATENT DOCUMENTS

| | | | |
|---|---|---|---|
| 7,647,225 | B2 | 1/2010 | Bennett et al. |
| 7,657,424 | B2 | 2/2010 | Bennett |
| 7,702,508 | B2 | 4/2010 | Bennett |
| 7,725,307 | B2 | 5/2010 | Bennett |
| 7,725,320 | B2 | 5/2010 | Bennett |
| 7,729,904 | B2 | 6/2010 | Bennett |
| 7,752,152 | B2 | 7/2010 | Paek et al. |
| 7,831,426 | B2 | 11/2010 | Bennett |
| 7,912,702 | B2 | 3/2011 | Bennett |
| 9,076,448 | B2 | 7/2015 | Bennett et al. |
| 9,986,419 | B2 | 5/2018 | Naik et al. |
| 10,043,516 | B2 | 8/2018 | Saddler et al. |
| 10,176,808 | B1 | 1/2019 | Lovitt et al. |
| 10,356,243 | B2 | 7/2019 | Sanghavi et al. |
| 10,389,876 | B2 | 8/2019 | Engelke et al. |
| 10,410,637 | B2 | 9/2019 | Paulik et al. |
| 10,791,176 | B2 | 9/2020 | Phipps et al. |
| 11,080,336 | B2 | 8/2021 | Van Dusen |
| 11,217,255 | B2 | 1/2022 | Kim et al. |
| 2018/0293484 | A1* | 10/2018 | Wang ..................... G06F 16/632 |
| 2019/0213490 | A1* | 7/2019 | White .................... G06N 5/043 |
| 2020/0379727 | A1* | 12/2020 | Blatz ...................... G06F 9/451 |
| 2021/0103452 | A1* | 4/2021 | Pratt .................. G06Q 30/0283 |
| 2022/0122610 | A1* | 4/2022 | Carbune ................. G06F 3/167 |
| 2022/0335932 | A1* | 10/2022 | Sharifi .................... G10L 15/30 |
| 2023/0144884 | A1 | 5/2023 | Carbune et al. |
| 2025/0086394 | A1* | 3/2025 | Reddy .................. G06F 40/279 |
| 2025/0336381 | A1* | 10/2025 | Levine ................. G06F 16/632 |
| 2025/0348702 | A1 | 11/2025 | Aggarwal et al. |

OTHER PUBLICATIONS

Invitation to Pay Additional Fees and Partial International Search Report received for PCT Patent Application No. PCT/US2025/028058, mailed on Sep. 1, 2025, 10 pages.

International Search Report and Written Opinion received for PCT Patent Application No. PCT/US2025/028058, mailed on Oct. 22, 2025, 16 pages.

* cited by examiner

System 100

550
568
570
553
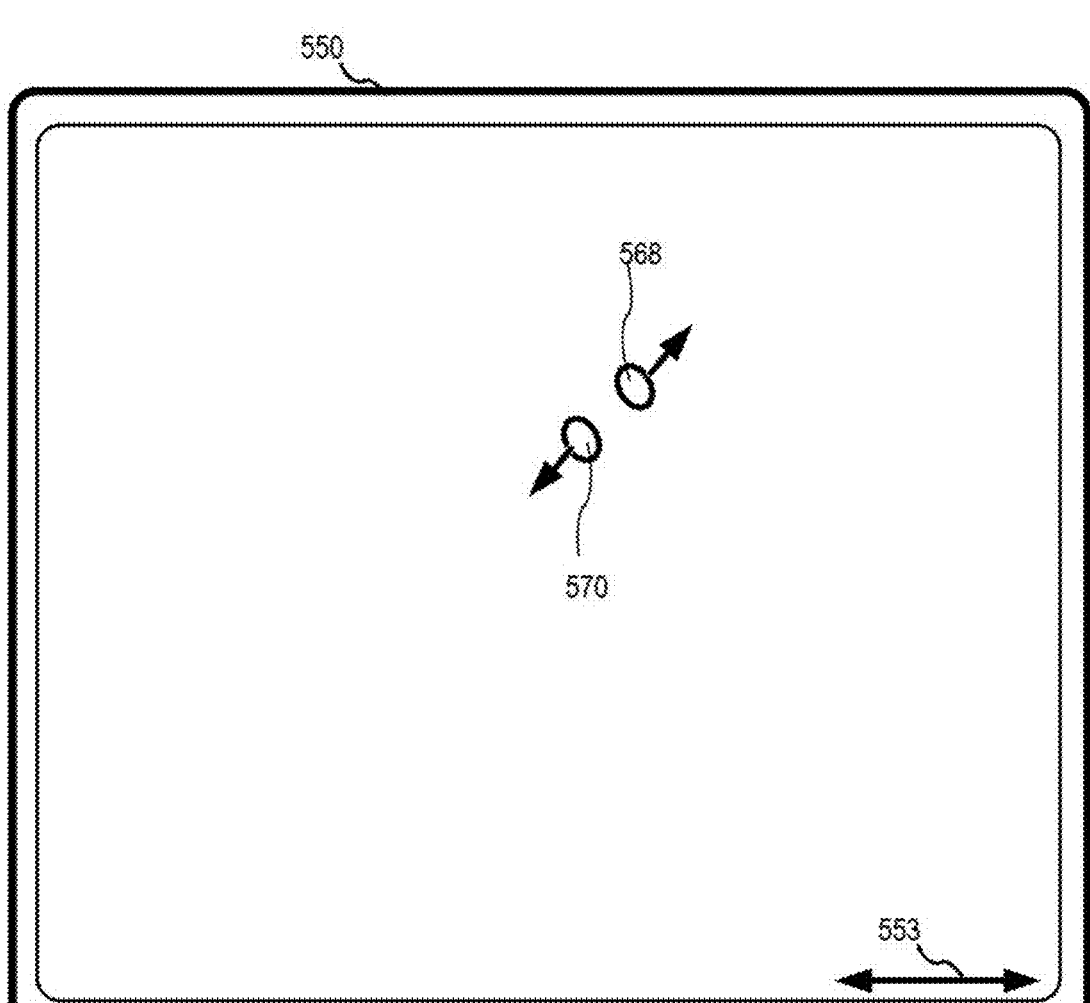
551
560
562
Tactile Output
Generator(s) 457
Contact Intensity
Sensor(s) 459
552
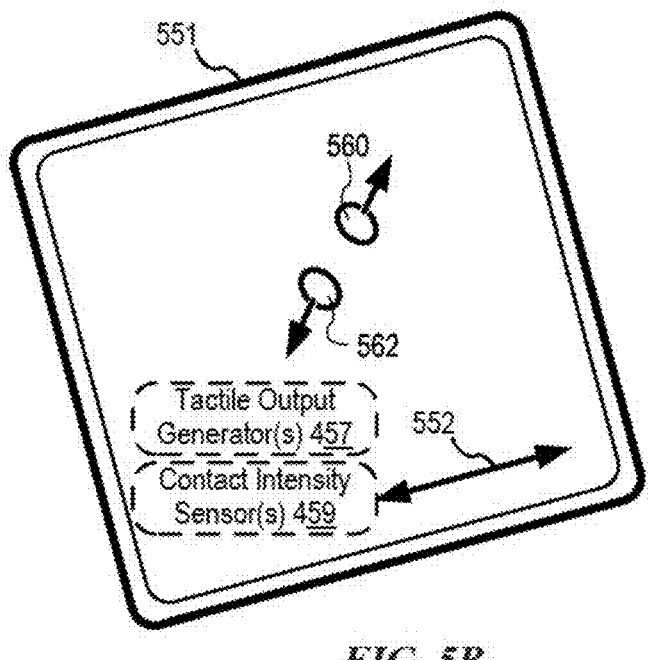
*FIG. 5B*

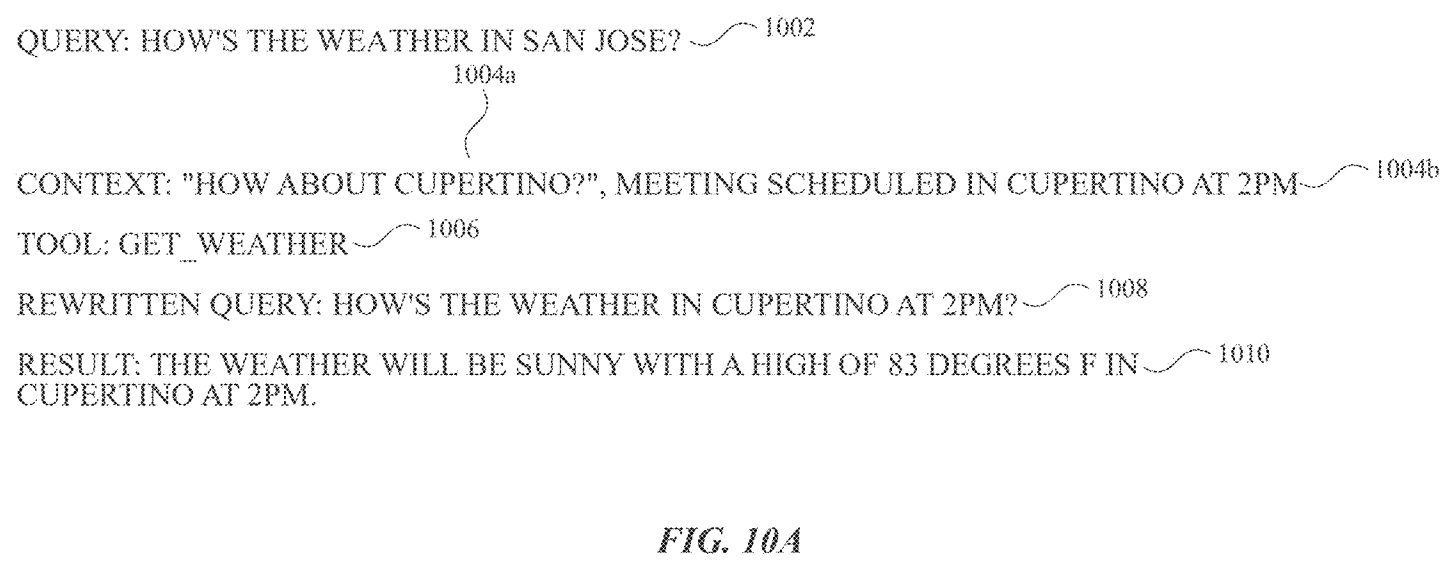

QUERY: HOW'S THE WEATHER IN SAN JOSE? ⟋1002

CONTEXT: "HOW ABOUT CUPERTINO?", MEETING SCHEDULED IN CUPERTINO AT 2PM ⟋1004b

1004a

TOOL: GET_WEATHER ⟋1006

REWRITTEN QUERY: HOW'S THE WEATHER IN CUPERTINO AT 2PM? ⟋1008

RESULT: THE WEATHER WILL BE SUNNY WITH A HIGH OF 83 DEGREES F IN ⟋1010
CUPERTINO AT 2PM.

*FIG. 10A*

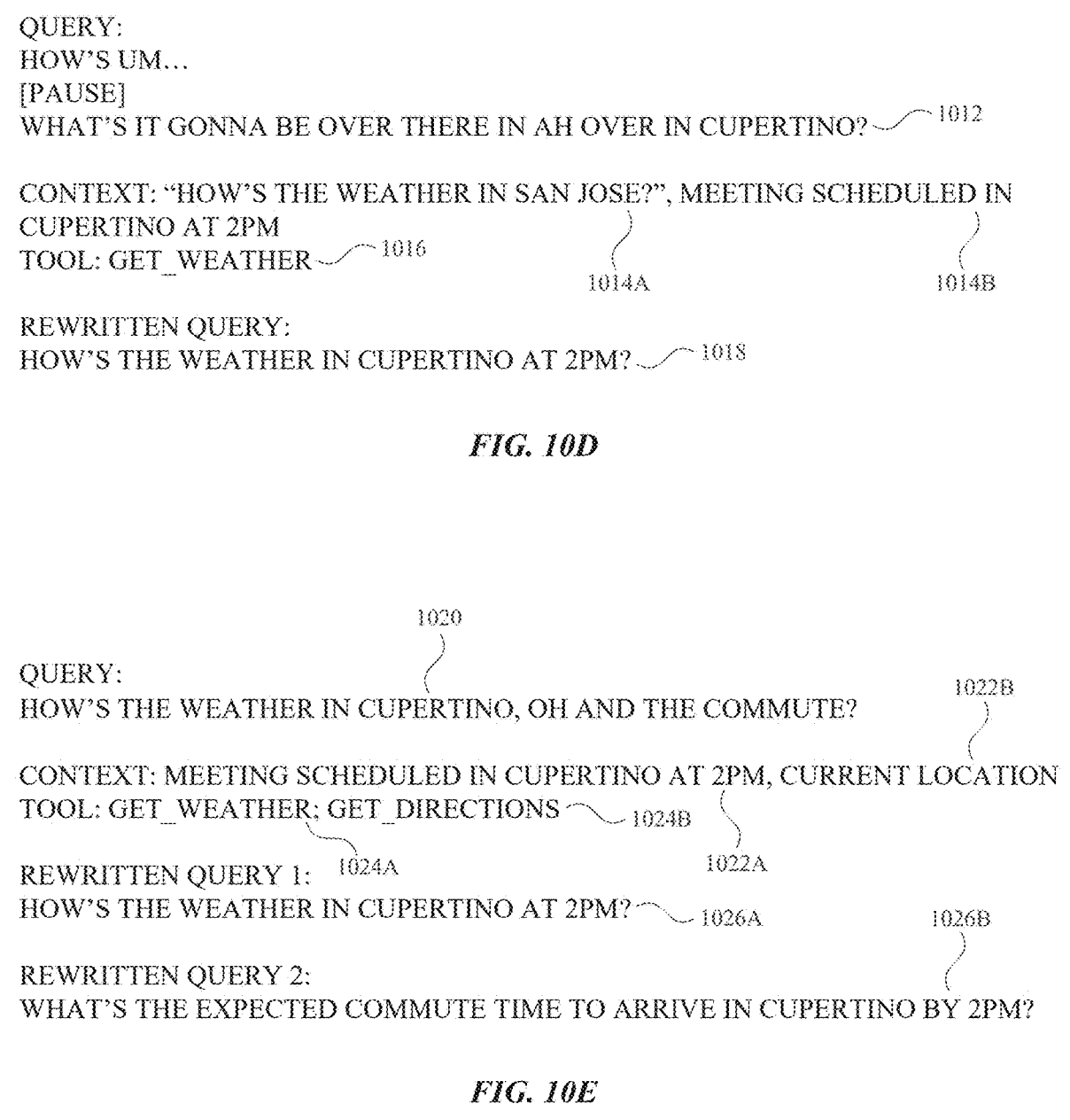

QUERY:
HOW'S UM...
[PAUSE]
WHAT'S IT GONNA BE OVER THERE IN AH OVER IN CUPERTINO? ⟋ 1012

CONTEXT: "HOW'S THE WEATHER IN SAN JOSE?", MEETING SCHEDULED IN CUPERTINO AT 2PM
TOOL: GET_WEATHER ⟋ 1016

1014A

1014B

REWRITTEN QUERY:
HOW'S THE WEATHER IN CUPERTINO AT 2PM? ⟋ 1018

QUERY:
HOW'S THE WEATHER IN CUPERTINO, OH AND THE COMMUTE?

1022B

CONTEXT: MEETING SCHEDULED IN CUPERTINO AT 2PM, CURRENT LOCATION
TOOL: GET_WEATHER; GET_DIRECTIONS ⟋ 1024B

REWRITTEN QUERY 1: 1024A

1022A

HOW'S THE WEATHER IN CUPERTINO AT 2PM? ⟋ 1026A

1026B

REWRITTEN QUERY 2:
WHAT'S THE EXPECTED COMMUTE TIME TO ARRIVE IN CUPERTINO BY 2PM?

*FIG. 10E*

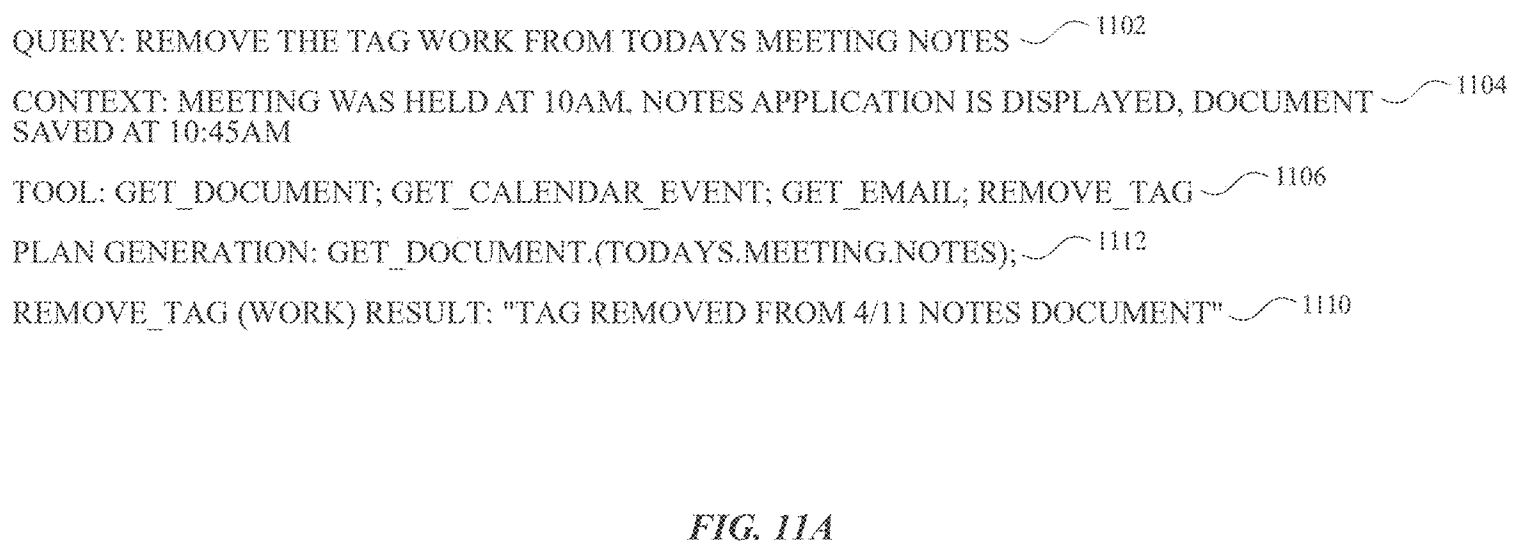

QUERY: REMOVE THE TAG WORK FROM TODAYS MEETING NOTES 〜1102

CONTEXT: MEETING WAS HELD AT 10AM. NOTES APPLICATION IS DISPLAYED. DOCUMENT SAVED AT 10:45AM 〜1104

TOOL: GET_DOCUMENT; GET_CALENDAR_EVENT; GET_EMAIL; REMOVE_TAG 〜1106

PLAN GENERATION: GET_DOCUMENT.(TODAYS.MEETING.NOTES); 〜1112

REMOVE_TAG (WORK) RESULT: "TAG REMOVED FROM 4/11 NOTES DOCUMENT" 〜1110

*FIG. 11A*

Figure 12A:
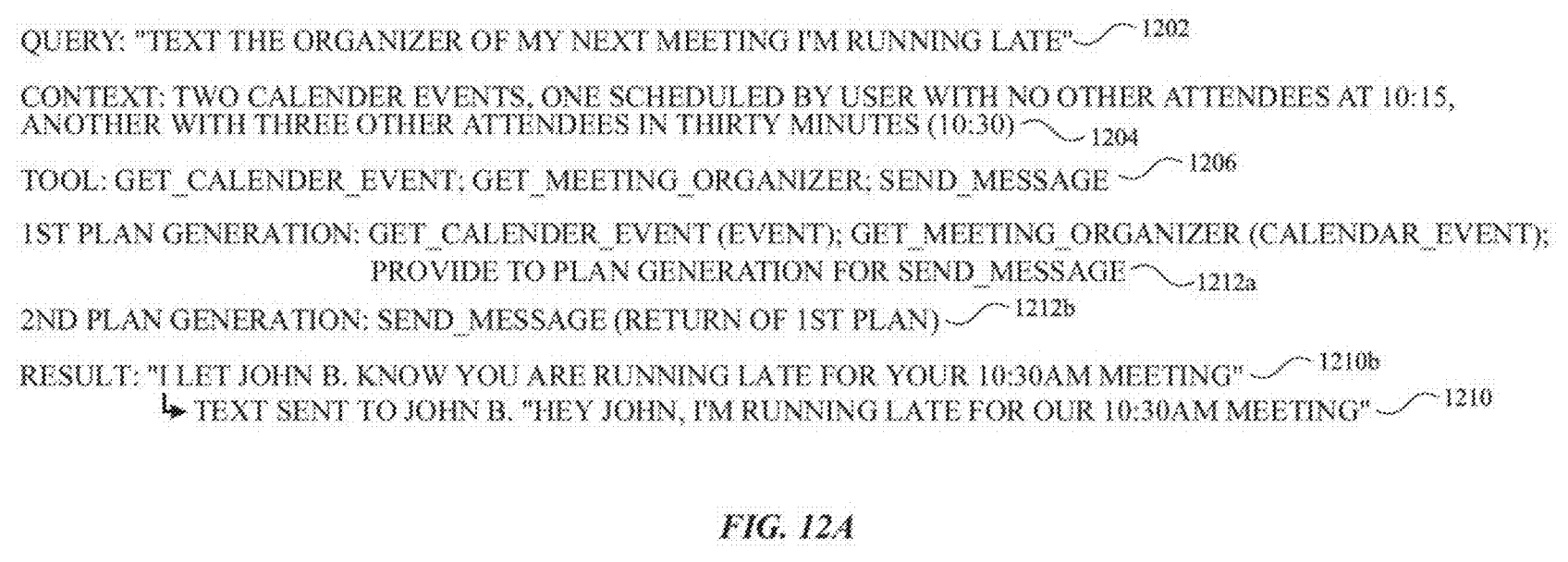

QUERY: "TEXT THE ORGANIZER OF MY NEXT MEETING I'M RUNNING LATE" ~ 1202

CONTEXT: TWO CALENDER EVENTS. ONE SCHEDULED BY USER WITH NO OTHER ATTENDEES AT 10:15, ANOTHER WITH THREE OTHER ATTENDEES IN THIRTY MINUTES (10:30) ~ 1204

TOOL: GET_CALENDER_EVENT; GET_MEETING_ORGANIZER; SEND_MESSAGE ~ 1206

1ST PLAN GENERATION: GET_CALENDER_EVENT (EVENT); GET_MEETING_ORGANIZER (CALENDAR_EVENT); PROVIDE TO PLAN GENERATION FOR SEND_MESSAGE ~ 1212a

2ND PLAN GENERATION: SEND_MESSAGE (RETURN OF 1ST PLAN) ~ 1212b

RESULT: "I LET JOHN B. KNOW YOU ARE RUNNING LATE FOR YOUR 10:30AM MEETING" ~ 1210b
    TEXT SENT TO JOHN B. "HEY JOHN, I'M RUNNING LATE FOR OUR 10:30AM MEETING" ~ 1210

Figure 13:
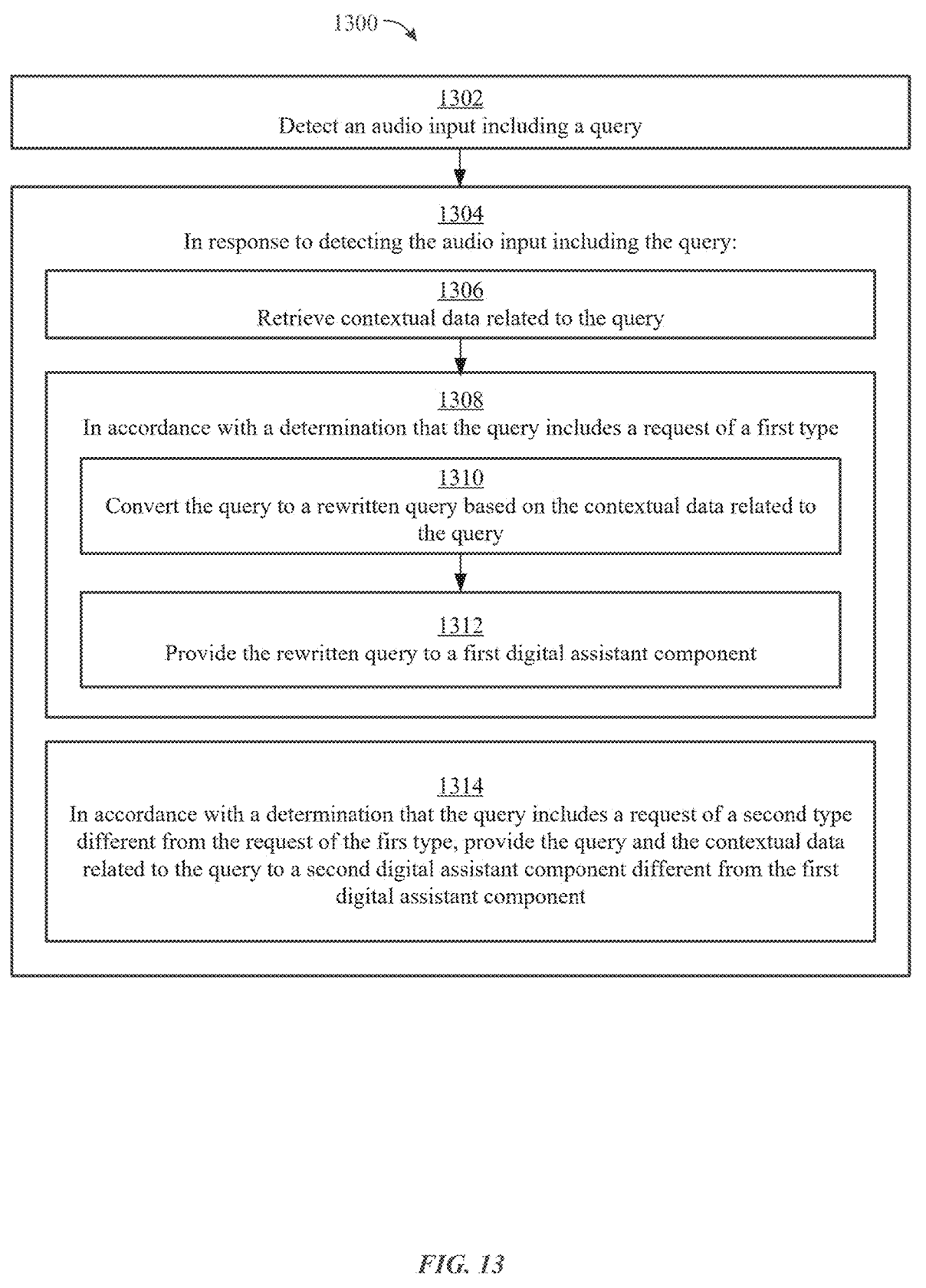

1302
Detect an audio input including a query

1304
In response to detecting the audio input including the query:

1306
Retrieve contextual data related to the query

1308
In accordance with a determination that the query includes a request of a first type

1310
Convert the query to a rewritten query based on the contextual data related to the query

1312
Provide the rewritten query to a first digital assistant component

1314
In accordance with a determination that the query includes a request of a second type different from the request of the firs type, provide the query and the contextual data related to the query to a second digital assistant component different from the first digital assistant component

Figure 14:
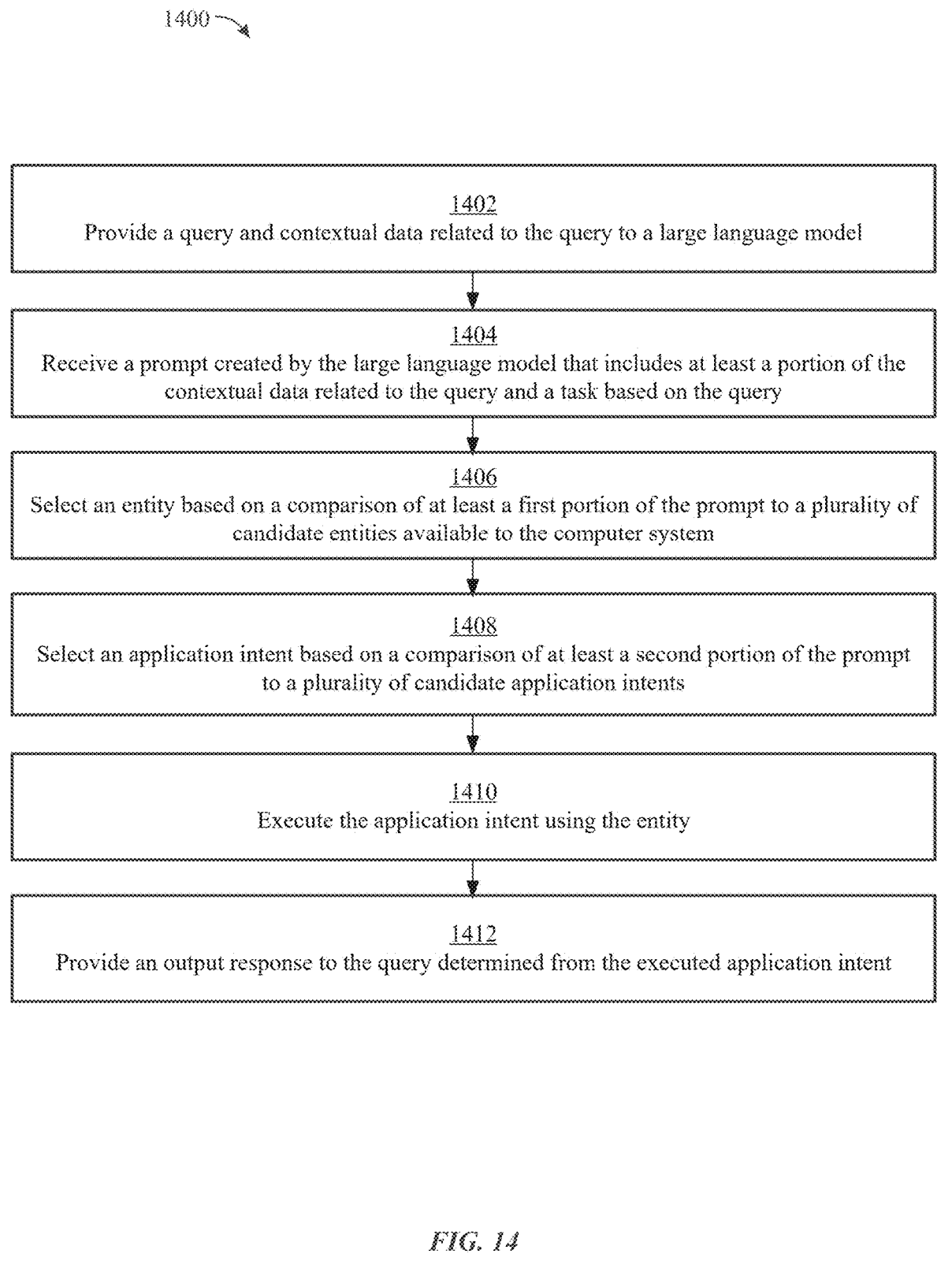

1402
Provide a query and contextual data related to the query to a large language model

---

1404
Receive a prompt created by the large language model that includes at least a portion of the contextual data related to the query and a task based on the query

---

1406
Select an entity based on a comparison of at least a first portion of the prompt to a plurality of candidate entities available to the computer system

---

1408
Select an application intent based on a comparison of at least a second portion of the prompt to a plurality of candidate application intents

---

1410
Execute the application intent using the entity

---

1412
Provide an output response to the query determined from the executed application intent

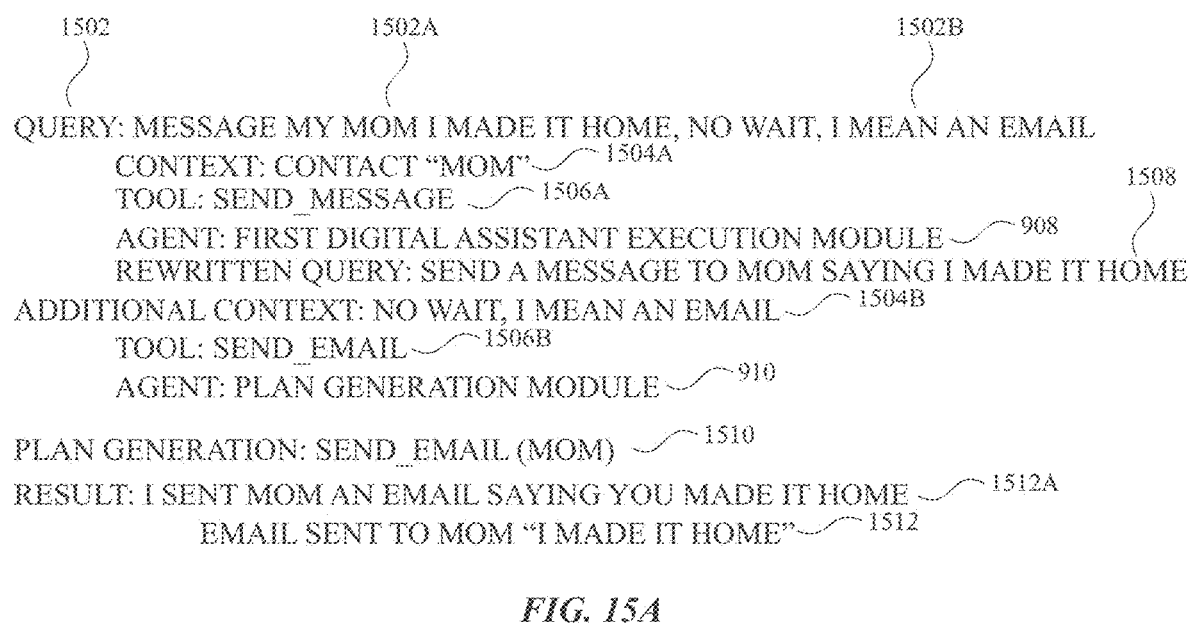

QUERY: MESSAGE MY MOM I MADE IT HOME, NO WAIT, I MEAN AN EMAIL
        CONTEXT: CONTACT "MOM" —— 1504A
        TOOL: SEND_MESSAGE —— 1506A
        AGENT: FIRST DIGITAL ASSISTANT EXECUTION MODULE —— 908
        REWRITTEN QUERY: SEND A MESSAGE TO MOM SAYING I MADE IT HOME    1508
ADDITIONAL CONTEXT: NO WAIT, I MEAN AN EMAIL —— 1504B
        TOOL: SEND_EMAIL —— 1506B
        AGENT: PLAN GENERATION MODULE —— 910

PLAN GENERATION: SEND_EMAIL (MOM) —— 1510

RESULT: I SENT MOM AN EMAIL SAYING YOU MADE IT HOME —— 1512A
        EMAIL SENT TO MOM "I MADE IT HOME" —— 1512

*FIG. 15A*

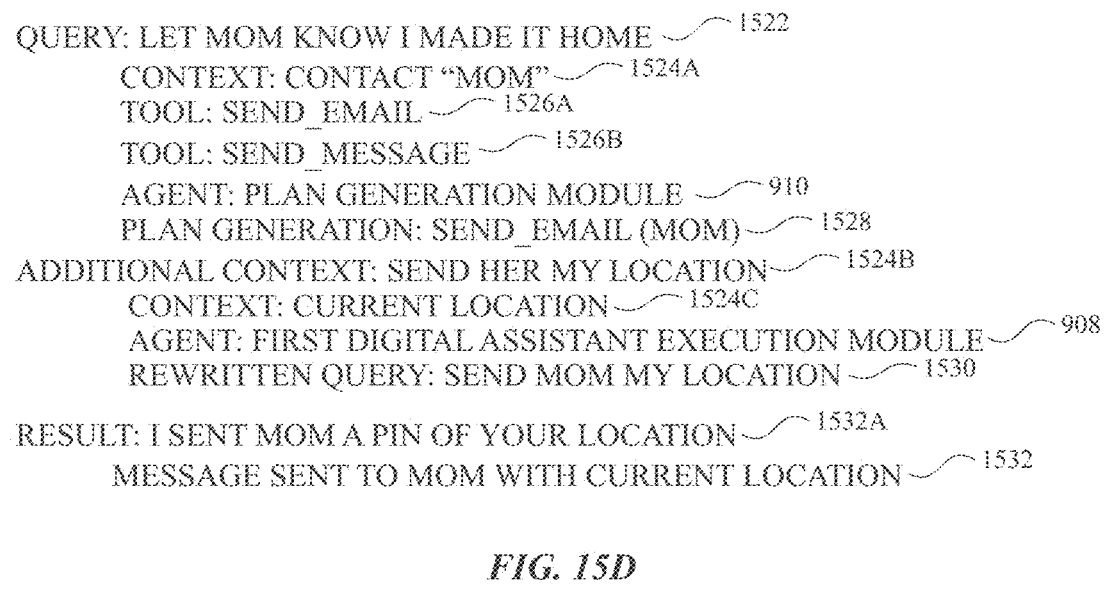

QUERY: LET MOM KNOW I MADE IT HOME ~ 1522
      CONTEXT: CONTACT "MOM" ~ 1524A
      TOOL: SEND_EMAIL ~ 1526A
      TOOL: SEND_MESSAGE ~ 1526B
      AGENT: PLAN GENERATION MODULE ~ 910
      PLAN GENERATION: SEND_EMAIL (MOM) ~ 1528
ADDITIONAL CONTEXT: SEND HER MY LOCATION ~ 1524B
      CONTEXT: CURRENT LOCATION ~ 1524C
      AGENT: FIRST DIGITAL ASSISTANT EXECUTION MODULE ~ 908
      REWRITTEN QUERY: SEND MOM MY LOCATION ~ 1530

RESULT: I SENT MOM A PIN OF YOUR LOCATION ~ 1532A
      MESSAGE SENT TO MOM WITH CURRENT LOCATION ~ 1532

*FIG. 15D*

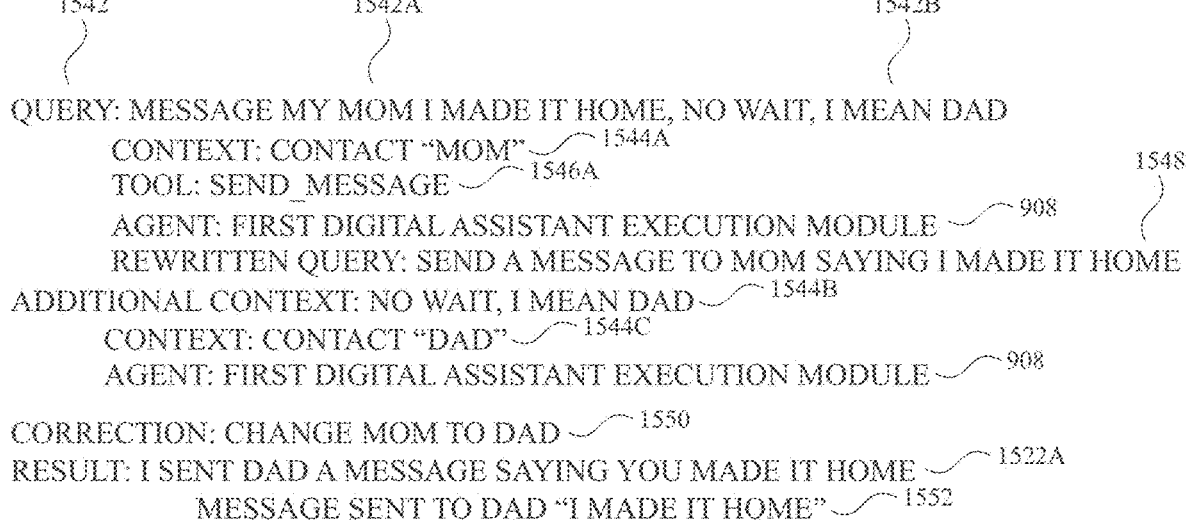

QUERY: MESSAGE MY MOM I MADE IT HOME, NO WAIT, I MEAN DAD
    CONTEXT: CONTACT "MOM" ⁓ 1544A
    TOOL: SEND_MESSAGE ⁓ 1546A
    AGENT: FIRST DIGITAL ASSISTANT EXECUTION MODULE ⁓ 908
    REWRITTEN QUERY: SEND A MESSAGE TO MOM SAYING I MADE IT HOME
ADDITIONAL CONTEXT: NO WAIT, I MEAN DAD ⁓ 1544B
    CONTEXT: CONTACT "DAD" ⁓ 1544C
    AGENT: FIRST DIGITAL ASSISTANT EXECUTION MODULE ⁓ 908

CORRECTION: CHANGE MOM TO DAD ⁓ 1550
RESULT: I SENT DAD A MESSAGE SAYING YOU MADE IT HOME ⁓ 1522A
    MESSAGE SENT TO DAD "I MADE IT HOME" ⁓ 1552

*FIG. 15G*

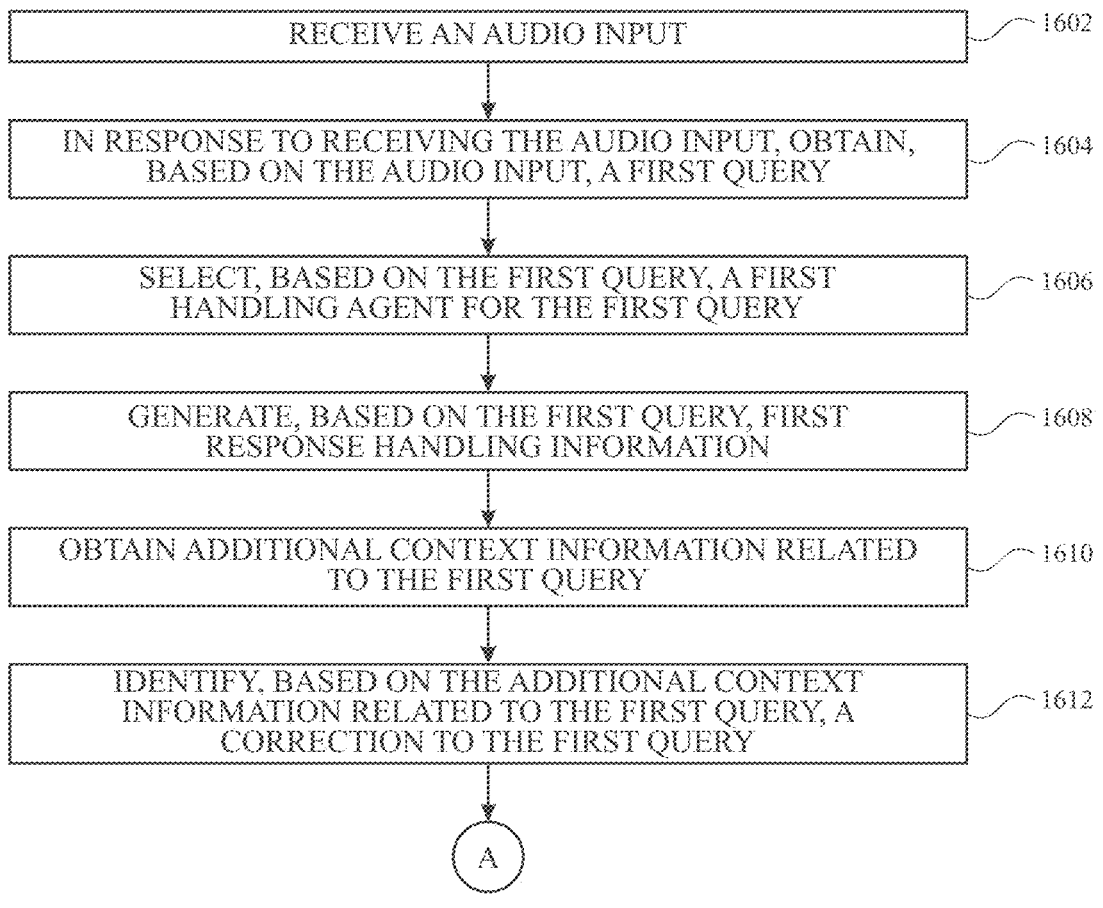

RECEIVE AN AUDIO INPUT                                                    1602

IN RESPONSE TO RECEIVING THE AUDIO INPUT, OBTAIN,          1604
BASED ON THE AUDIO INPUT, A FIRST QUERY

SELECT, BASED ON THE FIRST QUERY, A FIRST                        1606
HANDLING AGENT FOR THE FIRST QUERY

GENERATE, BASED ON THE FIRST QUERY, FIRST                      1608
RESPONSE HANDLING INFORMATION

OBTAIN ADDITIONAL CONTEXT INFORMATION RELATED         1610
TO THE FIRST QUERY

IDENTIFY, BASED ON THE ADDITIONAL CONTEXT                      1612
INFORMATION RELATED TO THE FIRST QUERY, A
CORRECTION TO THE FIRST QUERY

DIGITAL ASSISTANT INTELLIGENCE ENGINE

CROSS-REFERENCE TO RELATED APPLICATIONS

This application claims priority to U.S. Patent Application Ser. No. 63/737,450, entitled "DIGITAL ASSISTANT INTELLIGENCE ENGINE," filed on Dec. 20, 2024, and claims priority to U.S. Patent Application Ser. No. 63/670, 057, entitled "DIGITAL ASSISTANT INTELLIGENCE ENGINE," filed on Jul. 11, 2024, and claims priority to U.S. Patent Application Ser. No. 63/657,722, entitled "DIGITAL ASSISTANT INTELLIGENCE ENGINE," filed on Jun. 7, 2024, and claims priority to U.S. Patent Application Ser. No. 63/646,803, entitled "DIGITAL ASSISTANT INTELLI-GENCE ENGINE," filed on May 13, 2024, the entire contents of which are hereby incorporated by reference in their entirety.

FIELD

This relates generally to intelligent automated assistants and, more specifically, to routing and interpreting queries received by intelligent automated assistants.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

SUMMARY

Example methods are disclosed herein. An example method includes, at a computer system that is configured to communicate with a display generation component and an input device: detecting an audio input including a query; in response to detecting the audio input including the query: retrieving contextual data related to the query; in accordance with a determination that the query includes a request of a first type: converting the query to a rewritten query based on the contextual data related to the query; and providing the rewritten query to a first digital assistant component; and in accordance with a determination that the query includes a request of a second type different from the request of the first type, providing the query and the contextual data related to the query to a second digital assistant component different from the first digital assistant component.

Example non-transitory computer-readable media are disclosed herein. An example non-transitory computer-readable storage medium stores one or more programs configured to be executed by one or more processors of a computer system that is in communication with a display generation component and an input device, the one or more programs including instructions for: detecting an audio input including a query; in response to detecting the audio input including the query: retrieving contextual data related to the query; in accordance with a determination that the query includes a request of a first type: converting the query to a rewritten query based on the contextual data related to the query; and providing the rewritten query to a first digital assistant component; and in accordance with a determination that the query includes a request of a second type different from the request of the first type, providing the query and the contextual data related to the query to a second digital assistant component different from the first digital assistant component.

Example computer systems are disclosed herein. An example computer system comprises one or more processors; wherein the computer system is configured to communicate with a display generation component, an input device, and memory storing one or more programs configured to be executed by the one or more processors, the one or more programs including instructions for: detecting an audio input including a query; in response to detecting the audio input including the query: retrieving contextual data related to the query; in accordance with a determination that the query includes a request of a first type: converting the query to a rewritten query based on the contextual data related to the query; and providing the rewritten query to a first digital assistant component; and in accordance with a determination that the query includes a request of a second type different from the request of the first type, providing the query and the contextual data related to the query to a second digital assistant component different from the first digital assistant component.

An example computer system comprises means for detecting an audio input including a query; means, in response to detecting the audio input including the query, for: retrieving contextual data related to the query; in accordance with a determination that the query includes a request of a first type: converting the query to a rewritten query based on the contextual data related to the query; and providing the rewritten query to a first digital assistant component; and in accordance with a determination that the query includes a request of a second type different from the request of the first type, providing the query and the contextual data related to the query to a second digital assistant component different from the first digital assistant component.

Determining which digital assistant component to route a received query to and how to present contextual data related to the query increases the efficiency of the digital assistant and in turn the computer system. Queries are routed to digital assistant components that are more efficient at processing that specific type of query, reducing the latency and amount of processing that is required to provide a result to the user. This results in less processing and reduced power consumption and in the case of battery powered devices, increases the battery life of the computer system.

An example method includes, at a computer system that is configured to communicate with a display generation component and an input device: providing a query and contextual data related to the query to a large language model; receiving a prompt created by the large language model that includes at least a portion of the contextual data related to the query and a task based on the query; selecting an entity based on a comparison of at least a first portion of the prompt to a plurality of candidate entities available to the computer system; selecting an application intent based on a comparison of at least a second portion of the prompt to a plurality of candidate application intents; executing the application intent using the entity; and providing an output responsive to the query determined from the executed application intent.

Example non-transitory computer-readable media are disclosed herein. An example non-transitory computer-readable storage medium stores one or more programs configured to be executed by one or more processors of a computer system that is in communication with a display generation component and an input device, the one or more programs including instructions for: providing a query and contextual data related to the query to a large language model; receiving a prompt created by the large language model that includes at least a portion of the contextual data related to the query and a task based on the query; selecting an entity based on a comparison of at least a first portion of the prompt to a plurality of candidate entities available to the computer system; selecting an application intent based on a comparison of at least a second portion of the prompt to a plurality of candidate application intents; executing the application intent using the entity; and providing an output responsive to the query determined from the executed application intent.

Example computer systems are disclosed herein. An example computer system comprises one or more processors; wherein the computer system is configured to communicate with a display generation component, an input device, and memory storing one or more programs configured to be executed by the one or more processors, the one or more programs including instructions for: providing a query and contextual data related to the query to a large language model; receiving a prompt created by the large language model that includes at least a portion of the contextual data related to the query and a task based on the query; selecting an entity based on a comparison of at least a first portion of the prompt to a plurality of candidate entities available to the computer system; selecting an application intent based on a comparison of at least a second portion of the prompt to a plurality of candidate application intents; executing the application intent using the entity; and providing an output responsive to the query determined from the executed application intent.

An example computer system comprises means for providing a query and contextual data related to the query to a large language model; means for receiving a prompt created by the large language model that includes at least a portion of the contextual data related to the query and a task based on the query; means for selecting an entity based on a comparison of at least a first portion of the prompt to a plurality of candidate entities available to the computer system; means for selecting an application intent based on a comparison of at least a second portion of the prompt to a plurality of candidate application intents; means for executing the application intent using the entity; and means for providing an output responsive to the query determined from the executed application intent.

Providing a query to a large language model and receiving a prompt used to determine an entity and an application intent to respond to the query allows for efficient processing of complex user queries to provide more accurate and quicker responses. This leads to more enjoyable and efficient interactions between the user and the digital assistant, reducing the processing power required to perform a task and provide a response to the user. In the case of battery powered computer systems this further increases the battery life of the computer system, conserving power.

Example methods are disclosed herein. An example method includes, at a computer system that is configured to communicate with one or more input devices: receiving an audio input; in response to receiving the audio input, obtaining, based on the audio input, a first query; selecting, based on the first query, a first handling agent for the first query, wherein the first handling agent is selected from a plurality of handling agents; generating, based on the first query, first response handling information; obtaining additional context information related to the first query; identifying, based on the additional context information related to the first query, a correction to the first query; and in response to identifying the correction to the first query: selecting, based on the context information, a second handling agent for the first query, wherein the second handling agent is selected from the plurality of handling agents; in accordance with a determination that the second handling agent matches the first handling agent, providing an indication of the correction to the first handling agent; and in accordance with a determination that the second handling agent does not match the first handling agent: generating, based on the first query and the additional context information related to the first query, second response handling information different from the first response handling information; and providing the second response handling information to the second handling agent.

Example non-transitory computer-readable media are disclosed herein. An example non-transitory computer-readable storage medium stores one or more programs configured to be executed by one or more processors of a computer system that is in communication with one or more input devices, the one or more programs including instructions for: receiving an audio input; in response to receiving the audio input, obtaining, based on the audio input, a first query; selecting, based on the first query, a first handling agent for the first query, wherein the first handling agent is selected from a plurality of handling agents; generating, based on the first query, first response handling information; obtaining additional context information related to the first query; identifying, based on the additional context information related to the first query, a correction to the first query; and in response to identifying the correction to the first query: selecting, based on the context information, a second handling agent for the first query, wherein the second handling agent is selected from the plurality of handling agents; in accordance with a determination that the second handling agent matches the first handling agent, providing an indication of the correction to the first handling agent; and in accordance with a determination that the second handling agent does not match the first handling agent: generating, based on the first query and the additional context information related to the first query, second response handling information different from the first response handling information; and providing the second response handling information to the second handling agent.

Example computer systems are disclosed herein. An example computer system comprises one or more processors; wherein the computer system is configured to communicate with one or more input devices and memory storing one or more programs configured to be executed by the one or more processors, the one or more programs including instructions for: receiving an audio input; in response to receiving the audio input, obtaining, based on the audio input, a first query; selecting, based on the first query, a first handling agent for the first query, wherein the first handling agent is selected from a plurality of handling agents; generating, based on the first query, first response handling information; obtaining additional context information related to the first query; identifying, based on the additional context information related to the first query, a correction to the first query; and in response to identifying the correction to the first query: selecting, based on the context information, a second handling agent for the first query, wherein the second handling agent is selected from the plurality of handling agents; in accordance with a determination that the second handling agent matches the first handling agent, providing an indication of the correction to the first handling agent; and in accordance with a determination that the second handling agent does not match the first handling agent: generating, based on the first query and the additional context information related to the first query, second response handling information different from the first response handling information; and providing the second response handling information to the second handling agent.

An example computer system comprises means for receiving an audio input; means for, in response to receiving the audio input, obtaining, based on the audio input, a first query; means for selecting, based on the first query, a first handling agent for the first query, wherein the first handling agent is selected from a plurality of handling agents; means for generating, based on the first query, first response handling information; means for obtaining additional context information related to the first query; means for identifying, based on the additional context information related to the first query, a correction to the first query; and means for, in response to identifying the correction to the first query: selecting, based on the context information, a second handling agent for the first query, wherein the second handling agent is selected from the plurality of handling agents; in accordance with a determination that the second handling agent matches the first handling agent, providing an indication of the correction to the first handling agent; and in accordance with a determination that the second handling agent does not match the first handling agent: generating, based on the first query and the additional context information related to the first query, second response handling information different from the first response handling information; and providing the second response handling information to the second handling agent.

Determining which digital assistant component to route a received query to and how to adjust or correct queries in response to new information increases the efficiency of the digital assistant and in turn the computer system. Queries are routed to digital assistant components that are more efficient at processing that specific type of query, reducing the latency and amount of processing that is required to provide a result to the user. This results in less processing and reduced power consumption and in the case of battery powered devices, increases the battery life of the computer system.

BRIEF DESCRIPTION OF THE DRAWINGS

FIG. 5B illustrates an exemplary user interface for a multifunction device with a touch-sensitive surface that is separate from the display, according to various examples.

FIGS. 10A-10E illustrate examples queries executed by the digital assistant, according to various examples.

FIGS. 11A-11C illustrate examples queries executed by the digital assistant, according to various examples.

FIGS. 12A-12D illustrate examples queries executed by the digital assistant, according to various examples.

FIG. 13 is a block diagram illustrating a process for query execution by the digital assistant, according to various examples.

FIG. 14 is a block diagram illustrating a process for query execution by the digital assistant, according to various examples.

FIGS. 15A-15I illustrate example queries executed by the digital assistant, according to various examples.

FIGS. 16A-16B illustrate a block diagram illustrating a process for query execution by the digital assistant, according to various examples.

DETAILED DESCRIPTION

In the following description of examples, reference is made to the accompanying drawings in which are shown by way of illustration specific examples that can be practiced. It is to be understood that other examples can be used and structural changes can be made without departing from the scope of the various examples.

Integration of complex models such as foundation models (e.g., LLM) into digital assistants is an advantageous way of increasing the capability of digital assistants while requiring less complex training and adjustment of the digital assistant. Additionally, digital assistants can leverage the capabilities of different components to allow LLM's and/or other models to perform certain tasks while relying on other components to execute tasks. Thus, the overall efficiency of digital assistants can be increased, reducing the power consumption of computer systems and in the case of battery powered devices, increasing battery life.

Although the following description uses terms "first," "second," etc. to describe various elements, these elements should not be limited by the terms. These terms are only used to distinguish one element from another. For example, a first input could be termed a second input, and, similarly, a second input could be termed a first input, without departing from the scope of the various described examples. The first input and the second input are both inputs and, in some cases, are separate and different inputs.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

Figure 1:
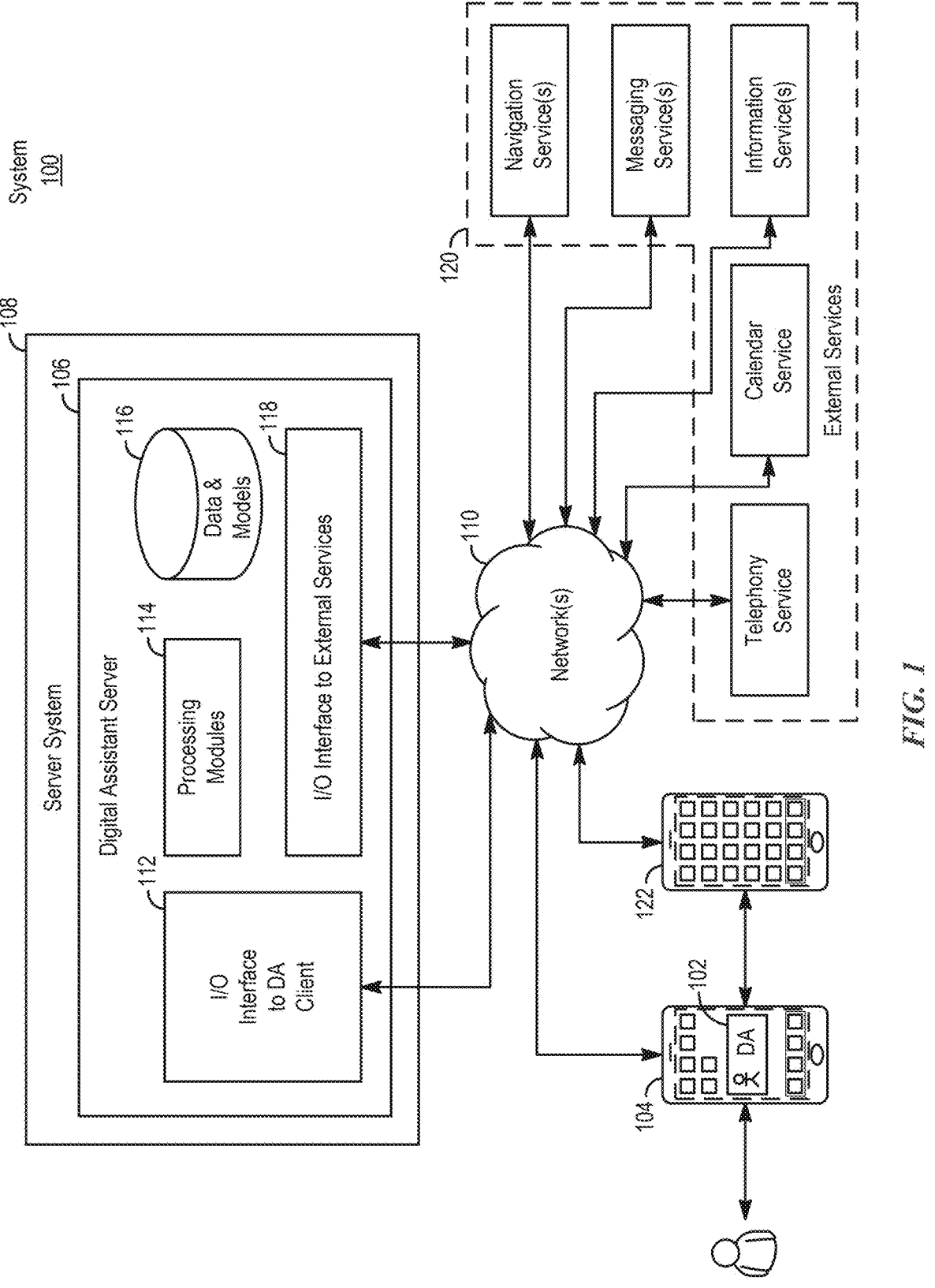
FIG. 1 is a block diagram illustrating a system and environment for implementing a digital assistant, according to various examples.

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device 104 is a portable multifunctional device (e.g., device 200, described below with reference to FIG. 2A), a multifunctional device (e.g., device 400, described below with reference to FIG. 4A), or a personal electronic device (e.g., device 600, described below with reference to FIGS. 6A-6B). A portable multifunctional device is, for example, a mobile telephone that also contains other functions, such as PDA and/or music player functions. Specific examples of portable multifunction devices include the Apple Watch®, iPhone®, iPod Touch®, and iPad® devices from Apple Inc. of Cupertino, California. Other examples of portable multifunction devices include, without limitation, earphones/headphones, speakers, and laptop or tablet computers. Further, in some examples, user device 104 is a non-portable multifunctional device. In particular, user device 104 is a desktop computer, a game console, a speaker, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), WiMAX, or any other suitable communication protocol.

Server system 108 is implemented on one or more standalone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4A, and 6A-6B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and returns relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

Although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
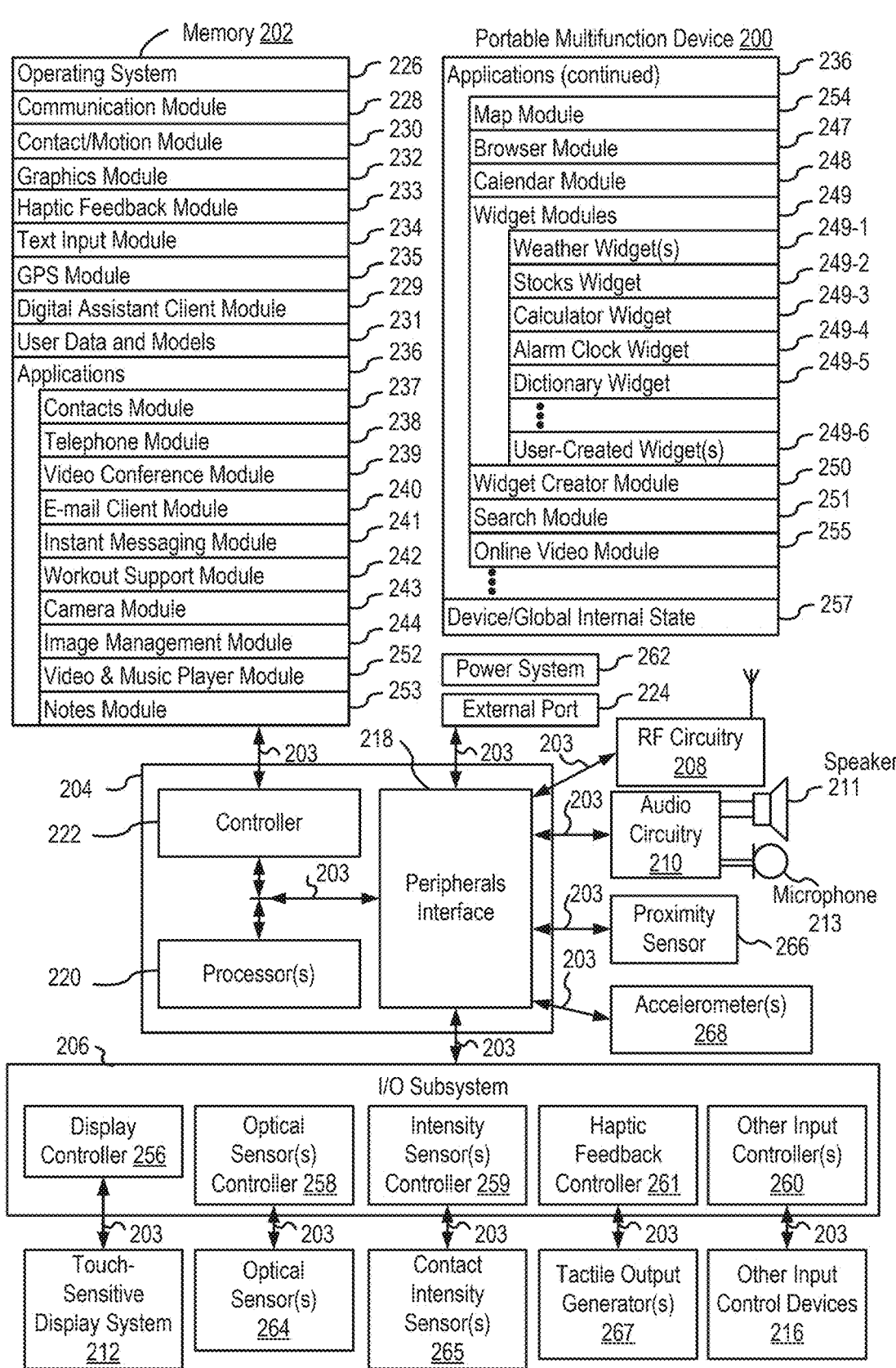
FIG. 2A is a block diagram illustrating a portable multifunction device implementing the client-side portion of a digital assistant, according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4A:
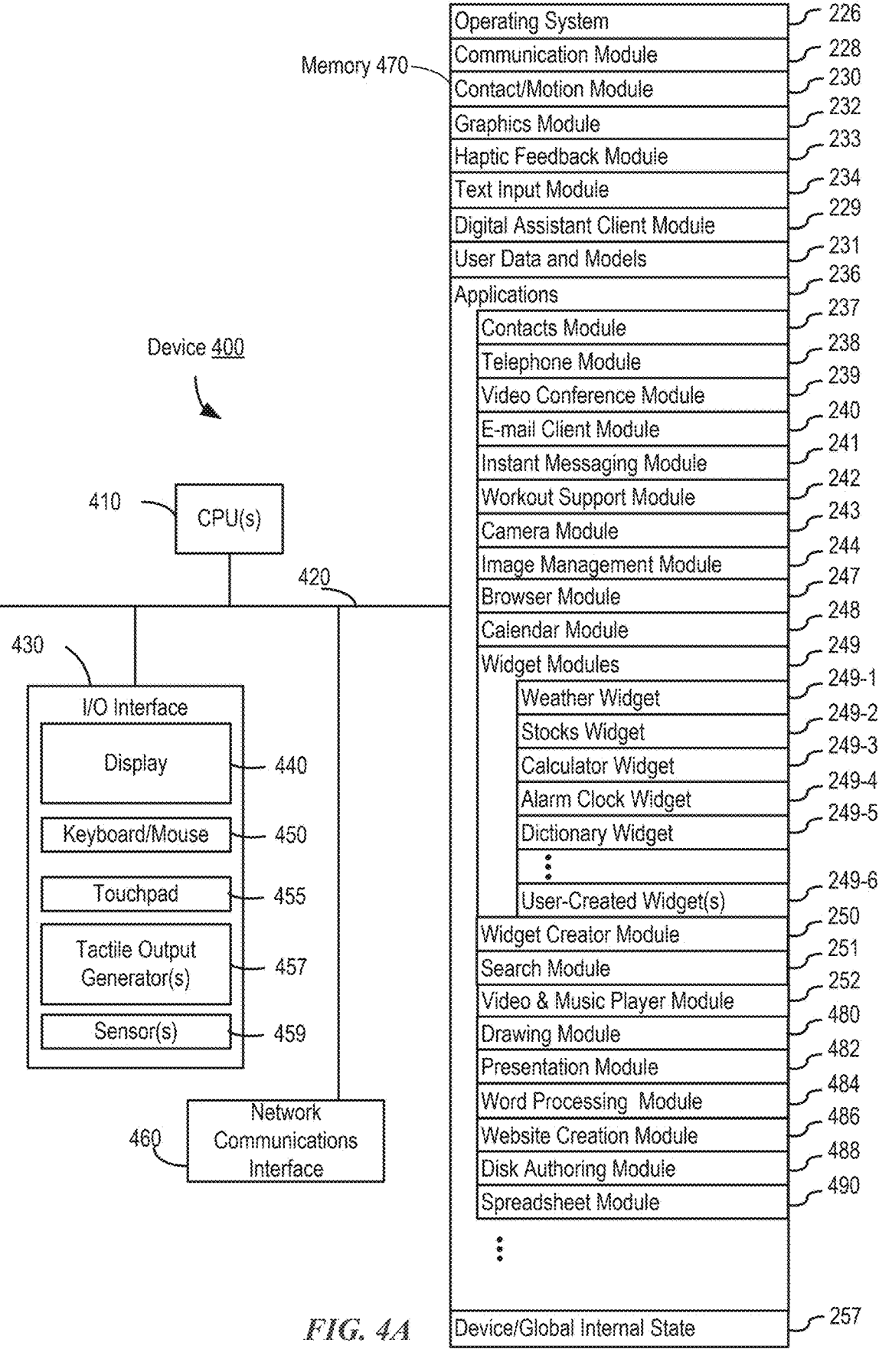
FIG. 4A is a block diagram of an exemplary multifunction device with a display and a touch-sensitive surface, according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4A) stores device/global internal state 257, as shown in FIGS. 2A and 4A. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts module 237, e-mail client module 240, IM module 241, browser module 247, and any other application that needs text input).

GPS module 235 determines the location of the device and provides this information for use in various applications (e.g., to telephone module 238 for use in location-based dialing; to camera module 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also include the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-7C. It should be recognized that digital assistant client module 229 can include any number of the sub-modules of digital assistant module 726 described below.

Applications 236 include the following modules (or sets of instructions), or a subset or superset thereof:

Contacts module 237 (sometimes called an address book or contact list);
Telephone module 238;
Video conference module 239;
E-mail client module 240;
Instant messaging (IM) module 241;
Workout support module 242;
Camera module 243 for still and/or video images;
Image management module 244;
Video player module;
Music player module;
Browser module 247;
Calendar module 248;
Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
Widget creator module 250 for making user-created widgets 249-6;
Search module 251;
Video and music player module 252, which merges video player module and music player module;
Notes module 253;
Map module 254; and/or
Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 238, video conference module 239, e-mail client module 240, or IM module 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
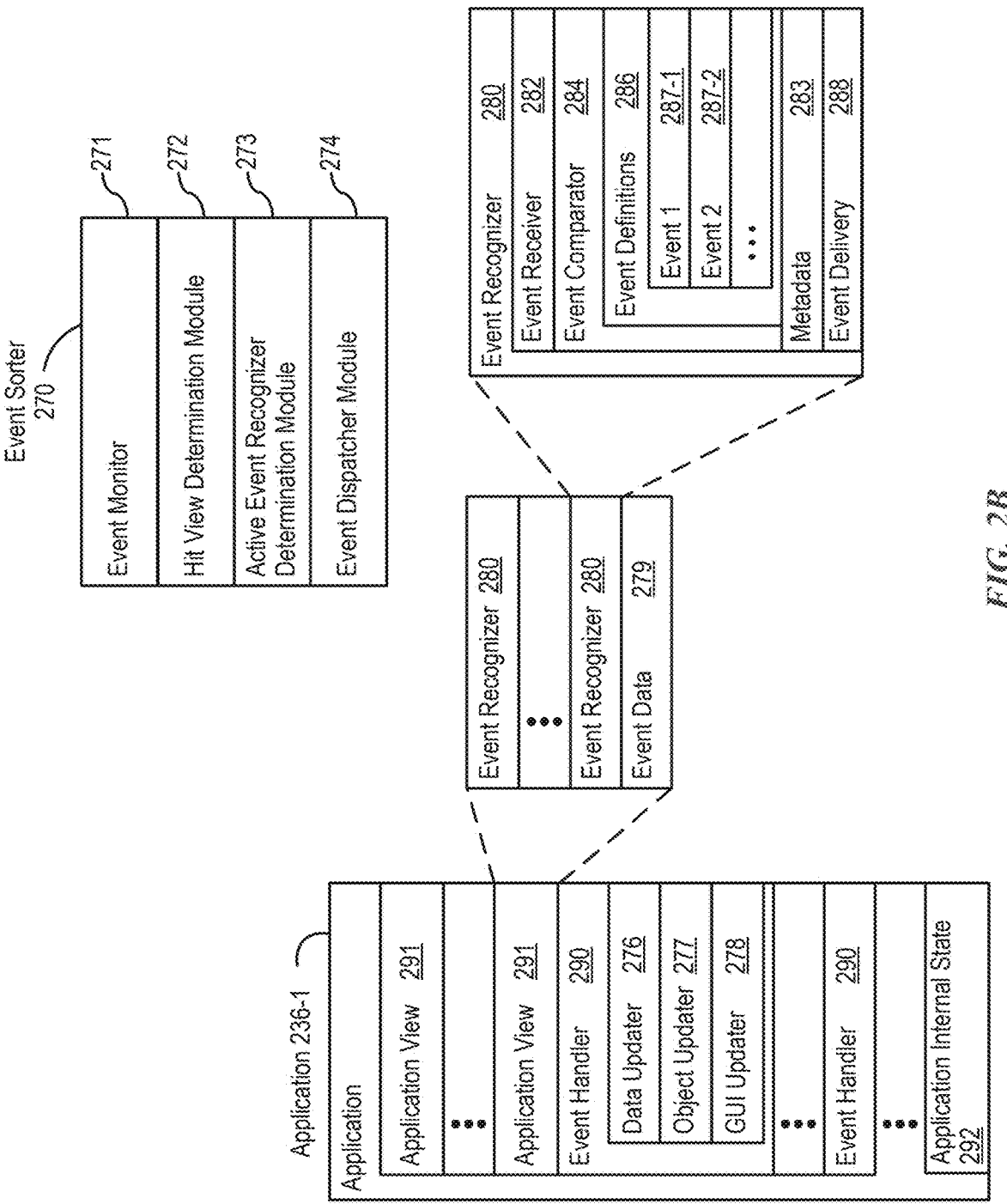
FIG. 2B is a block diagram illustrating exemplary components for event handling, according to various examples.

FIG. 2B is a block diagram illustrating exemplary components for event handling in accordance with some embodiments. In some embodiments, memory 202 (FIG.

2A) or 470 (FIG. 4A) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
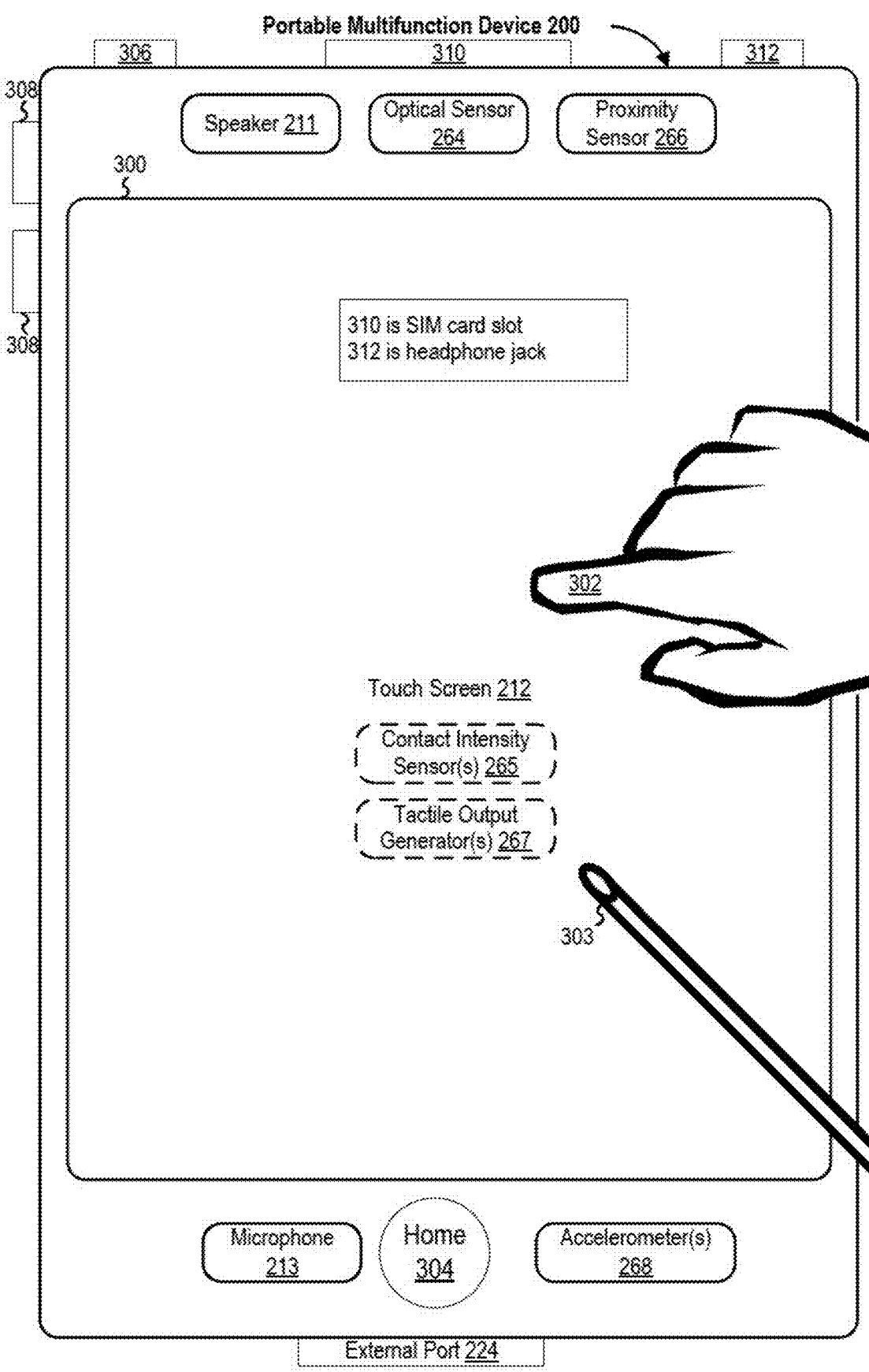
FIG. 3 illustrates a portable multifunction device implementing the client-side portion of a digital assistant, according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4A is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4A is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Implementations within the scope of the present disclosure can be partially or entirely realized using a tangible computer-readable storage medium (or multiple tangible computer-readable storage media of one or more types) encoding one or more computer-readable instructions. It should be recognized that computer-readable instructions can be organized in any format, including applications, widgets, processes, software, and/or components.

Figure 4B:
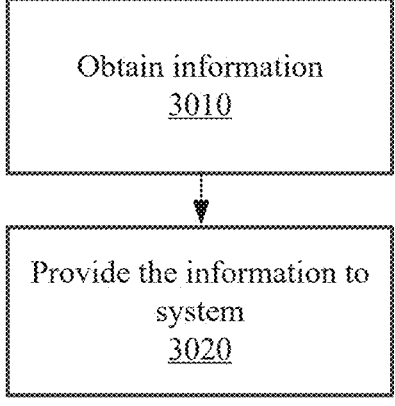
FIGS. 4B-4G illustrate the use of Application Programming Interfaces (APIs) to perform operations.
Figure 4C:
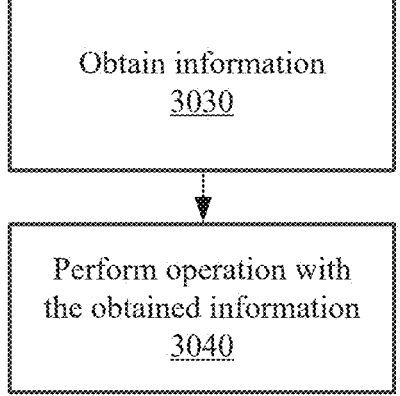

Implementations within the scope of the present disclosure include a computer-readable storage medium that encodes instructions organized as an application (e.g., application 3160) that, when executed by one or more processing units, control an electronic device (e.g., device 3150) to perform the method of FIG. 4B, the method of FIG. 4C, and/or one or more other processes and/or methods described herein.

It should be recognized that application 3160 (shown in FIG. 4D) can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application. In some embodiments, application 3160 is an application that is pre-installed on device 3150 at purchase (e.g., a first-party application). In some embodiments, application 3160 is an application that is provided to device 3150 via an operating system update file (e.g., a first-party application or a second-party application). In some embodiments, application 3160 is an application that is provided via an application store. In some embodiments, the application store can be an application store that is pre-installed on device 3150 at purchase (e.g., a first-party application store). In some embodiments, the application store is a third-party application store (e.g., an application store that is provided by another application store, downloaded via a network, and/or read from a storage device).

Figure 4D:
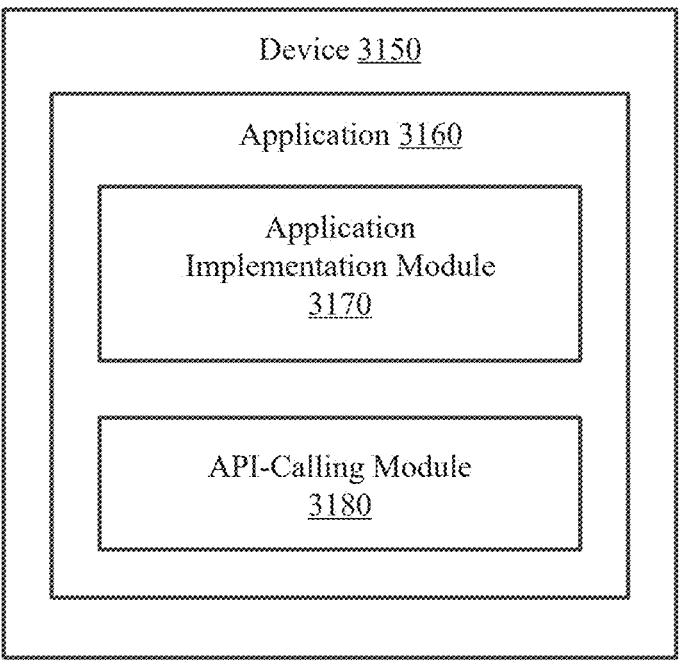
Figure 4E:
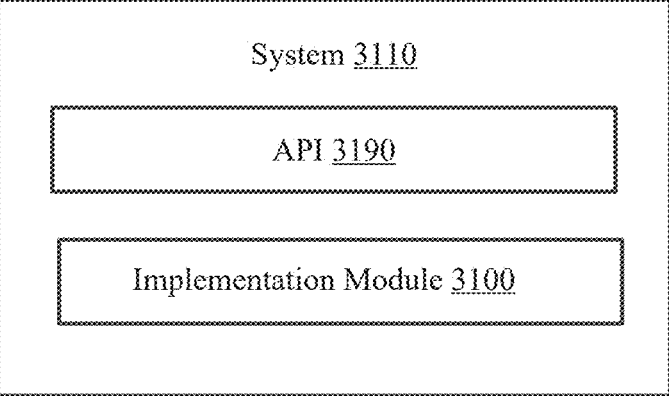
Figure 4F:
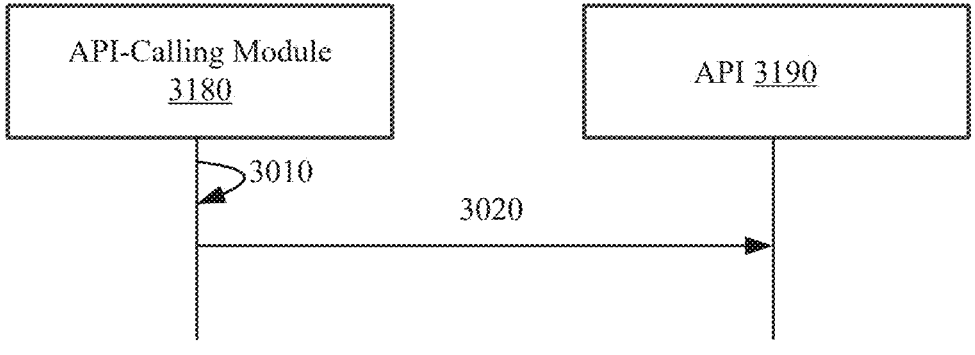

Referring to FIG. 4B and FIG. 4F, application 3160 obtains information (e.g., 3010). In some embodiments, at 3010, information is obtained from at least one hardware component of device 3150. In some embodiments, at 3010, information is obtained from at least one software module of device 3150. In some embodiments, at 3010, information is obtained from at least one hardware component external to device 3150 (e.g., a peripheral device, an accessory device, and/or a server). In some embodiments, the information obtained at 3010 includes positional information, time information, notification information, user information, environment information, electronic device state information, weather information, media information, historical information, event information, hardware information, and/or motion information. In some embodiments, in response to and/or after obtaining the information at 3010, application 3160 provides the information to a system (e.g., 3020).

In some embodiments, the system (e.g., 3110 shown in FIG. 4E) is an operating system hosted on device 3150. In some embodiments, the system (e.g., 3110 shown in FIG. 4E) is an external device (e.g., a server, a peripheral device, an accessory, and/or a personal computing device) that includes an operating system.

Figure 4G:
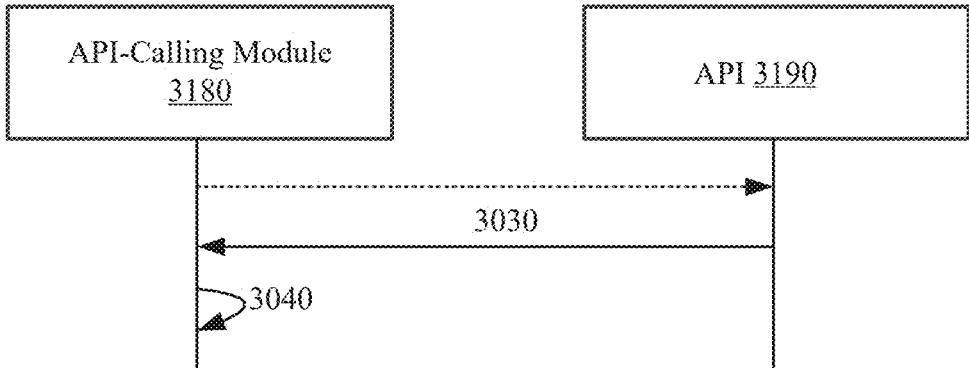

Referring to FIG. 4C and FIG. 4G, application 3160 obtains information (e.g., 3030). In some embodiments, the information obtained at 3030 includes positional information, time information, notification information, user information, environment information electronic device state information, weather information, media information, historical information, event information, hardware information, and/or motion information. In response to and/or after obtaining the information at 3030, application 3160 performs an operation with the information (e.g., 3040). In some embodiments, the operation performed at 3040 includes: providing a notification based on the information, sending a message based on the information, displaying the information, controlling a user interface of a fitness application based on the information, controlling a user interface of a health application based on the information, controlling a focus mode based on the information, setting a reminder based on the information, adding a calendar entry based on the information, and/or calling an API of system 3110 based on the information.

In some embodiments, one or more steps of the method of FIG. 4B and/or the method of FIG. 4C is performed in response to a trigger. In some embodiments, the trigger includes detection of an event, a notification received from system 3110, a user input, and/or a response to a call to an API provided by system 3110.

In some embodiments, the instructions of application 3160, when executed, control device 3150 to perform the method of FIG. 4B and/or the method of FIG. 4C by calling an application programming interface (API) (e.g., API 3190) provided by system 3110. In some embodiments, application 3160 performs at least a portion of the method of FIG. 4B and/or the method of FIG. 4C without calling API 3190.

In some embodiments, one or more steps of the method of FIG. 4B and/or the method of FIG. 4C includes calling an API (e.g., API 3190) using one or more parameters defined by the API. In some embodiments, the one or more parameters include a constant, a key, a data structure, an object, an object class, a variable, a data type, a pointer, an array, a list or a pointer to a function or method, and/or another way to reference a data or other item to be passed via the API.

Referring to FIG. 4D, device 3150 is illustrated. In some embodiments, device 3150 is a personal computing device, a smart phone, a smart watch, a fitness tracker, a head mounted display (HMD) device, a media device, a communal device, a speaker, a television, and/or a tablet. As illustrated in FIG. 4D, device 3150 includes application 3160 and an operating system (e.g., system 3110 shown in FIG. 4E). Application 3160 includes application implementation module 3170 and API-calling module 3180. System 3110 includes API 3190 and implementation module 3100. It should be recognized that device 3150, application 3160, and/or system 3110 can include more, fewer, and/or different components than illustrated in FIGS. 4D and 4E.

In some embodiments, application implementation module 3170 includes a set of one or more instructions corresponding to one or more operations performed by application 3160. For example, when application 3160 is a messaging application, application implementation module 3170 can include operations to receive and send messages. In some embodiments, application implementation module 3170 communicates with API-calling module 3180 to communicate with system 3110 via API 3190 (shown in FIG. 4E).

In some embodiments, API 3190 is a software module (e.g., a collection of computer-readable instructions) that provides an interface that allows a different module (e.g., API-calling module 3180) to access and/or use one or more functions, methods, procedures, data structures, classes, and/or other services provided by implementation module 3100 of system 3110. For example, API-calling module 3180 can access a feature of implementation module 3100 through one or more API calls or invocations (e.g., embodied by a function or a method call) exposed by API 3190 (e.g., a software and/or hardware module that can receive API calls, respond to API calls, and/or send API calls) and can pass data and/or control information using one or more parameters via the API calls or invocations. In some embodiments, API 3190 allows application 3160 to use a service provided by a Software Development Kit (SDK) library. In some embodiments, application 3160 incorporates a call to a function or method provided by the SDK library and provided by API 3190 or uses data types or objects defined in the SDK library and provided by API 3190. In some embodiments, API-calling module 3180 makes an API call via API 3190 to access and use a feature of implementation module 3100 that is specified by API 3190. In such embodiments, implementation module 3100 can return a value via API 3190 to API-calling module 3180 in response to the API call. The value can report to application 3160 the capabilities or state of a hardware component of device 3150, including those related to aspects such as input capabilities and state, output capabilities and state, processing capability, power state, storage capacity and state, and/or communications capability. In some embodiments, API 3190 is implemented in part by firmware, microcode, or other low level logic that executes in part on the hardware component.

In some embodiments, API 3190 allows a developer of API-calling module 3180 (which can be a third-party developer) to leverage a feature provided by implementation module 3100. In such embodiments, there can be one or more API-calling modules (e.g., including API-calling module 3180) that communicate with implementation module 3100. In some embodiments, API 3190 allows multiple API-calling modules written in different programming languages to communicate with implementation module 3100 (e.g., API 3190 can include features for translating calls and returns between implementation module 3100 and API-calling module 3180) while API 3190 is implemented in terms of a specific programming language. In some embodiments, API-calling module 3180 calls APIs from different providers such as a set of APIs from an OS provider, another set of APIs from a plug-in provider, and/or another set of APIs from another provider (e.g., the provider of a software library) or creator of the another set of APIs.

Examples of API 3190 can include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, photos API, camera API, and/or image processing API. In some embodiments, the sensor API is an API for accessing data associated with a sensor of device 3150. For example, the sensor API can provide access to raw sensor data. For another example, the sensor API can provide data derived (and/or generated) from the raw sensor data. In some embodiments, the sensor data includes temperature data, image data, video data, audio data, heart rate data, IMU (inertial measurement unit) data, lidar data, location data, GPS data, and/or camera data. In some embodiments, the sensor includes one or more of an accelerometer, temperature sensor, infrared sensor, optical sensor, heartrate sensor, barometer, gyroscope, proximity sensor, temperature sensor, and/or biometric sensor.

In some embodiments, implementation module 3100 is a system (e.g., operating system and/or server system) software module (e.g., a collection of computer-readable instructions) that is constructed to perform an operation in response to receiving an API call via API 3190. In some embodiments, implementation module 3100 is constructed to provide an API response (via API 3190) as a result of processing an API call. By way of example, implementation module 3100 and API-calling module 3180 can each be any one of an operating system, a library, a device driver, an API, an application program, or other module. It should be understood that implementation module 3100 and API-calling module 3180 can be the same or different type of module from each other. In some embodiments, implementation module 3100 is embodied at least in part in firmware, microcode, or hardware logic.

In some embodiments, implementation module 3100 returns a value through API 3190 in response to an API call from API-calling module 3180. While API 3190 defines the syntax and result of an API call (e.g., how to invoke the API call and what the API call does), API 3190 might not reveal how implementation module 3100 accomplishes the function specified by the API call. Various API calls are transferred via the one or more application programming interfaces between API-calling module 3180 and implementation module 3100. Transferring the API calls can include issuing, initiating, invoking, calling, receiving, returning, and/or responding to the function calls or messages. In other words, transferring can describe actions by either of API-calling module 3180 or implementation module 3100. In some embodiments, a function call or other invocation of API 3190 sends and/or receives one or more parameters through a parameter list or other structure.

In some embodiments, implementation module 3100 provides more than one API, each providing a different view of or with different aspects of functionality implemented by implementation module 3100. For example, one API of implementation module 3100 can provide a first set of functions and can be exposed to third-party developers, and another API of implementation module 3100 can be hidden (e.g., not exposed) and provide a subset of the first set of functions and also provide another set of functions, such as testing or debugging functions which are not in the first set of functions. In some embodiments, implementation module 3100 calls one or more other components via an underlying API and thus is both an API-calling module and an implementation module. It should be recognized that implementation module 3100 can include additional functions, methods, classes, data structures, and/or other features that are not specified through API 3190 and are not available to API-calling module 3180. It should also be recognized that API-calling module 3180 can be on the same system as implementation module 3100 or can be located remotely and access implementation module 3100 using API 3190 over a network. In some embodiments, implementation module 3100, API 3190, and/or API-calling module 3180 is stored in a machine-readable medium, which includes any mechanism for storing information in a form readable by a machine (e.g., a computer or other data processing system). For example, a machine-readable medium can include magnetic disks, optical disks, random access memory; read only memory, and/or flash memory devices.

An application programming interface (API) is an interface between a first software process and a second software process that specifies a format for communication between the first software process and the second software process. Limited APIs (e.g., private APIs or partner APIs) are APIs that are accessible to a limited set of software processes (e.g., only software processes within an operating system or only software processes that are approved to access the limited APIs). Public APIs that are accessible to a wider set of software processes. Some APIs enable software processes to communicate about or set a state of one or more input devices (e.g., one or more touch sensors, proximity sensors, visual sensors, motion/orientation sensors, pressure sensors, intensity sensors, sound sensors, wireless proximity sensors, biometric sensors, buttons, switches, rotatable elements, and/or external controllers). Some APIs enable software processes to communicate about and/or set a state of one or more output generation components (e.g., one or more audio output generation components, one or more display generation components, and/or one or more tactile output generation components). Some APIs enable particular capabilities (e.g., scrolling, handwriting, text entry, image editing, and/or image creation) to be accessed, performed, and/or used by a software process (e.g., generating outputs for use by a software process based on input from the software process). Some APIs enable content from a software process to be inserted into a template and displayed in a user interface that has a layout and/or behaviors that are specified by the template.

Many software platforms include a set of frameworks that provides the core objects and core behaviors that a software developer needs to build software applications that can be used on the software platform. Software developers use these objects to display content onscreen, to interact with that content, and to manage interactions with the software platform. Software applications rely on the set of frameworks for their basic behavior, and the set of frameworks provides many ways for the software developer to customize the behavior of the application to match the specific needs of the software application. Many of these core objects and core behaviors are accessed via an API. An API will typically specify a format for communication between software processes, including specifying and grouping available variables, functions, and protocols. An API call (sometimes referred to as an API request) will typically be sent from a sending software process to a receiving software process as a way to accomplish one or more of the following: the sending software process requesting information from the receiving software process (e.g., for the sending software process to take action on), the sending software process providing information to the receiving software process (e.g., for the receiving software process to take action on), the sending software process requesting action by the receiving software process, or the sending software process providing information to the receiving software process about action taken by the sending software process. Interaction with a device (e.g., using a user interface) will in some circumstances include the transfer and/or receipt of one or more API calls (e.g., multiple API calls) between multiple different software processes (e.g., different portions of an operating system, an application and an operating system, or different applications) via one or more APIs (e.g., via multiple different APIs). For example, when an input is detected the direct sensor data is frequently processed into one or more input events that are provided (e.g., via an API) to a receiving software process that makes some determination based on the input events, and then sends (e.g., via an API) information to a software process to perform an operation (e.g., change a device state and/or user interface) based on the determination. While a determination and an operation performed in response could be made by the same software process, alternatively the determination could be made in a first software process and relayed (e.g., via an API) to a second software process, that is different from the first software process, that causes the operation to be performed by the second software process. Alternatively, the second software process could relay instructions (e.g., via an API) to a third software process that is different from the first software process and/or the second software process to perform the operation. It should be understood that some or all user interactions with a computer system could involve one or more API calls within a step of interacting with the computer system (e.g., between different software components of the computer system or between a software component of the computer system and a software component of one or more remote computer systems). It should be understood that some or all user interactions with a computer system could involve one or more API calls between steps of interacting with the computer system (e.g., between different software components of the computer system or between a software component of the computer system and a software component of one or more remote computer systems).

In some embodiments, the application can be any suitable type of application, including, for example, one or more of: a browser application, an application that functions as an execution environment for plug-ins, widgets or other applications, a fitness application, a health application, a digital payments application, a media application, a social network application, a messaging application, and/or a maps application.

In some embodiments, the application is an application that is pre-installed on the first computer system at purchase (e.g., a first-party application). In some embodiments, the application is an application that is provided to the first computer system via an operating system update file (e.g., a first-party application). In some embodiments, the application is an application that is provided via an application store. In some embodiments, the application store is pre-installed on the first computer system at purchase (e.g., a first-party application store) and allows download of one or more applications. In some embodiments, the application store is a third-party application store (e.g., an application store that is provided by another device, downloaded via a network, and/or read from a storage device). In some embodiments, the application is a third-party application (e.g., an app that is provided by an application store, downloaded via a network, and/or read from a storage device). In some embodiments, the application controls the first computer system to perform processes 1300, 1400, and/or 1600 (FIGS. 13, 14, and/or 16A-16B) by calling an application programming interface (API) provided by the system process using one or more parameters.

In some embodiments, exemplary APIs provided by the system process include one or more of: a pairing API (e.g., for establishing secure connection, e.g., with an accessory), a device detection API (e.g., for locating nearby devices, e.g., media devices and/or smartphone), a payment API, a UIKit API (e.g., for generating user interfaces), a location detection API, a locator API, a maps API, a health sensor API, a sensor API, a messaging API, a push notification API, a streaming API, a collaboration API, a video conferencing API, an application store API, an advertising services API, a web browser API (e.g., WebKit API), a vehicle API, a networking API, a WiFi API, a Bluetooth API, an NFC API, a UWB API, a fitness API, a smart home API, contact transfer API, a photos API, a camera API, and/or an image processing API.

In some embodiments, at least one API is a software module (e.g., a collection of computer-readable instructions) that provides an interface that allows a different module (e.g., API-calling module) to access and use one or more functions, methods, procedures, data structures, classes, and/or other services provided by an implementation module of the system process. The API can define one or more parameters that are passed between the API-calling module and the implementation module. In some embodiments, API 3190 defines a first API call that can be provided by API-calling module 3180. The implementation module is a system software module (e.g., a collection of computer-readable instructions) that is constructed to perform an operation in response to receiving an API call via the API. In some embodiments, the implementation module is constructed to provide an API response (via the API) as a result of processing an API call. In some embodiments, the implementation module is included in the device (e.g., 3150) that runs the application. In some embodiments, the implementation module is included in an electronic device that is separate from the device that runs the application.

Attention is now directed towards embodiments of user interfaces that can be implemented on, for example, portable multifunction device 200.

Figure 5A:
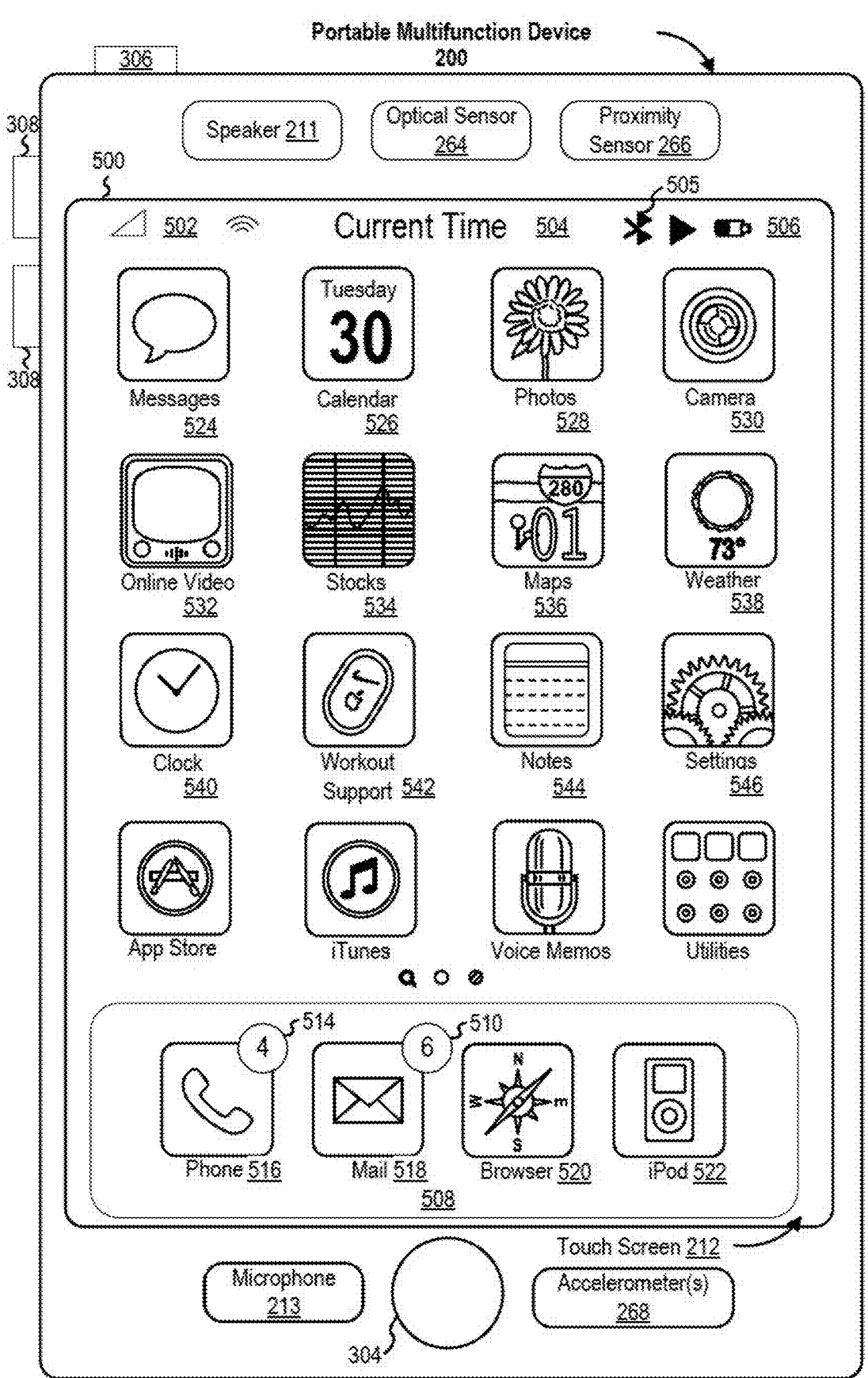
FIG. 5A illustrates an exemplary user interface for a menu of applications on a portable multifunction device, according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;

Time 504;

Bluetooth indicator 505;

Battery status indicator 506;

Tray 508 with icons for frequently used applications, such as:

Icon 516 for telephone module 238, labeled "Phone," which optionally includes an indicator 514 of the number of missed calls or voicemail messages;

Icon 518 for e-mail client module 240, labeled "Mail," which optionally includes an indicator 510 of the number of unread e-mails;

Icon 520 for browser module 247, labeled "Browser;" and

Icon 522 for video and music player module 252, also referred to as iPod (trademark of Apple Inc.) module 252, labeled "iPod;" and Icons for other applications, such as:

Icon 524 for IM module 241, labeled "Messages;"

Icon 526 for calendar module 248, labeled "Calendar;"

Icon 528 for image management module 244, labeled "Photos;"

Icon 530 for camera module 243, labeled "Camera;"

Icon 532 for online video module 255, labeled "Online Video;"

Icon 534 for stocks widget 249-2, labeled "Stocks;"

Icon 536 for map module 254, labeled "Maps;"

Icon 538 for weather widget 249-1, labeled "Weather;"

Icon 540 for alarm clock widget 249-4, labeled "Clock;"

Icon 542 for workout support module 242, labeled "Workout Support;"

Icon 544 for notes module 253, labeled "Notes;" and

Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 5B illustrates an exemplary user interface on a device (e.g., device 400, FIG. 4A) with a touch-sensitive surface 551 (e.g., a tablet or touchpad 455, FIG. 4A) that is separate from the display 550 (e.g., touch screen display 212). Device 400 also, optionally, includes one or more contact intensity sensors (e.g., one or more of sensors 459) for detecting intensity of contacts on touch-sensitive surface 551 and/or one or more tactile output generators 457 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, contact 560 corresponds to 568 and contact 562 corresponds to 570). In this way, user inputs (e.g., contacts 560 and 562, and movements thereof)

detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
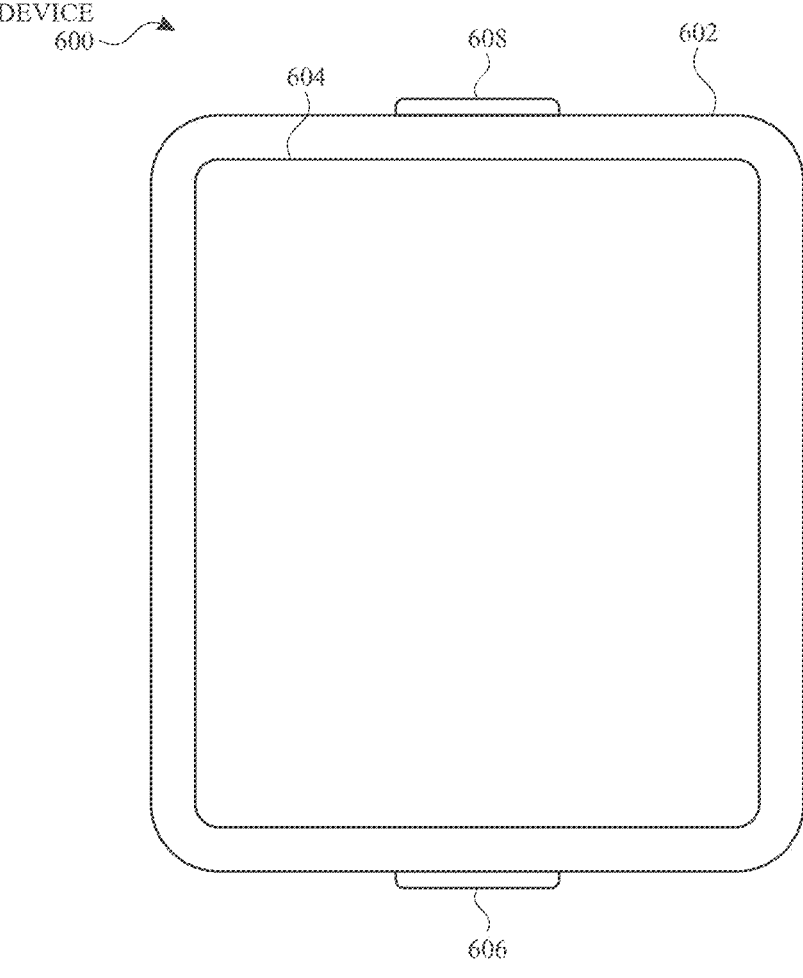
FIG. 6A illustrates a personal electronic device, according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4A). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
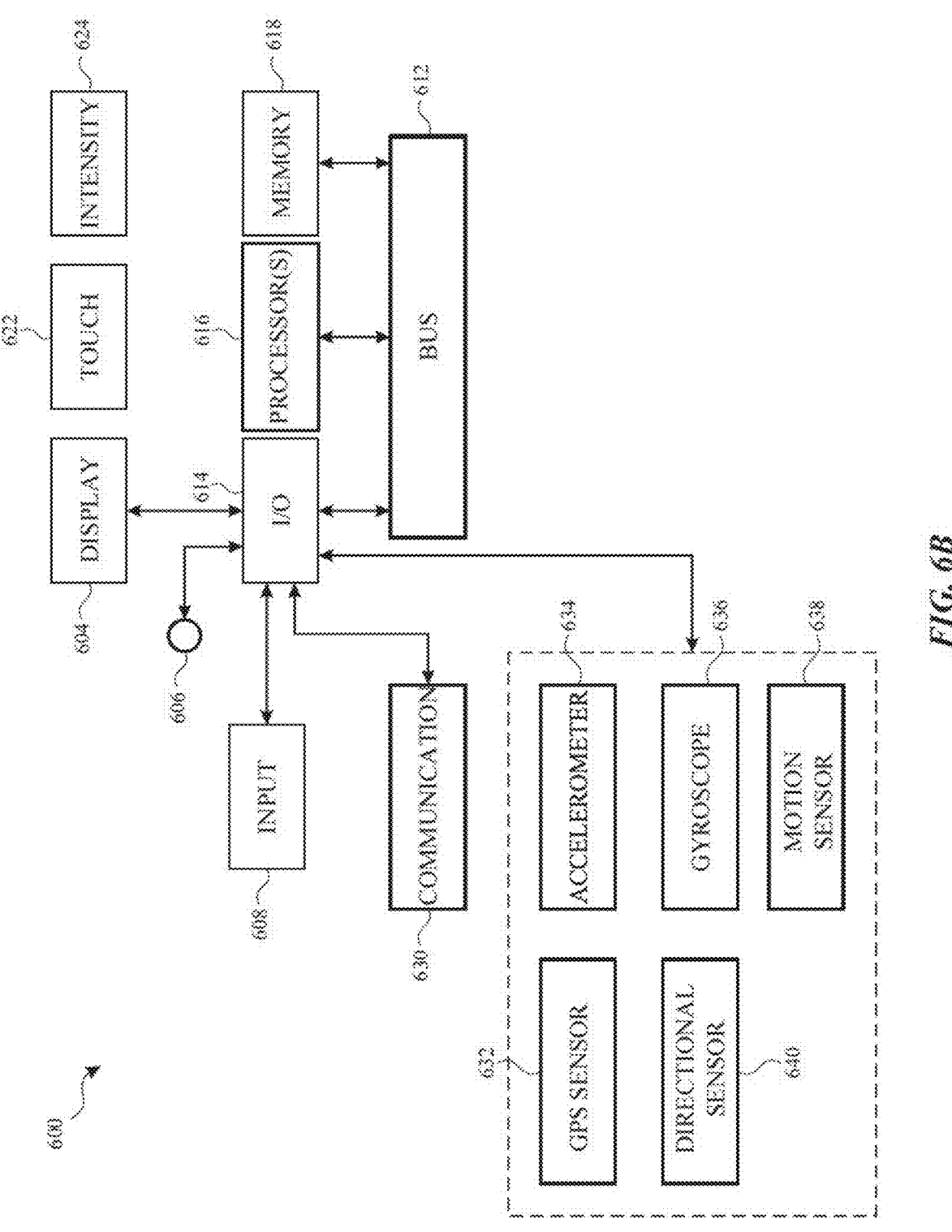
FIG. 6B is a block diagram illustrating a personal electronic device, according to various examples.

FIG. 6B depicts exemplary personal electronic device 600. In some embodiments, device 600 includes some or all of the components described with respect to FIGS. 2A, 2B, and 4A. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, 600, 1000, 1100, and/or 1200 (FIGS. 2A, 4A, 6A-6B, 10A-10C, 11A-11C, and 12A-12D). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4A or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
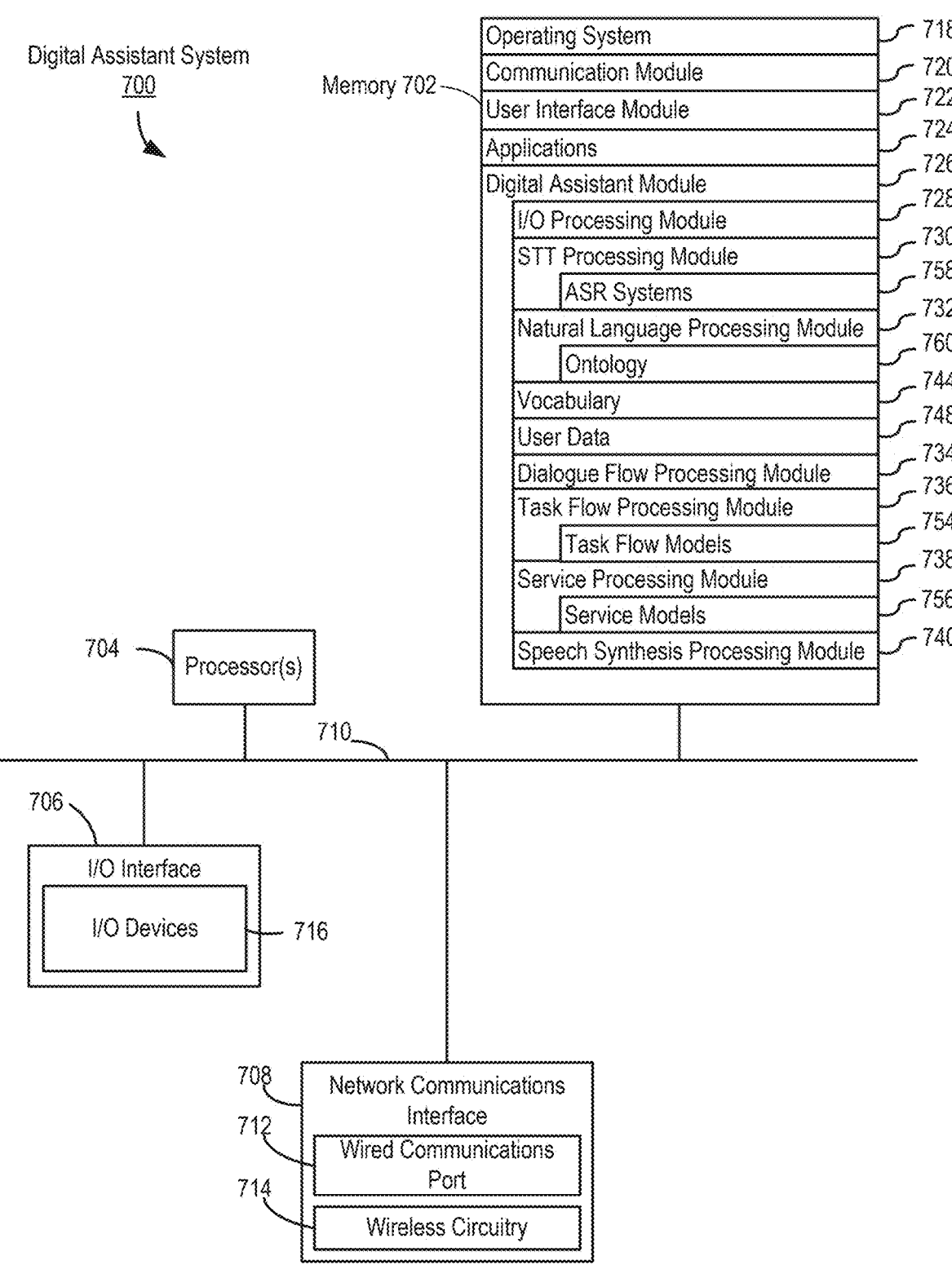
FIG. 7A is a block diagram illustrating a digital assistant system or a server portion thereof, according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, 600, 1000, 1100, and/or 1200) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, 600, 1000, 1100, and/or 1200 in FIGS. 2A, 4A, 6A-6B, 10A-10C, 11A-11C, and 12A-12D, respectively. In some examples, digital assistant system 700 represents the server portion of a digital assistant implementation, and can interact with the user through a client-side portion residing on a user device (e.g., devices 104, 200, 400, 600, 1000, 1100, and/or 1200).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below.

One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIGS. 2A, 4A, 6A-B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis processing module 740. Each of these modules has access to one or more of the following systems or data and models of the digital assistant module 726, or a subset or superset thereof: ontology 760, vocabulary index 744, user data 748, task flow models 754, service models 756, and ASR systems 758.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
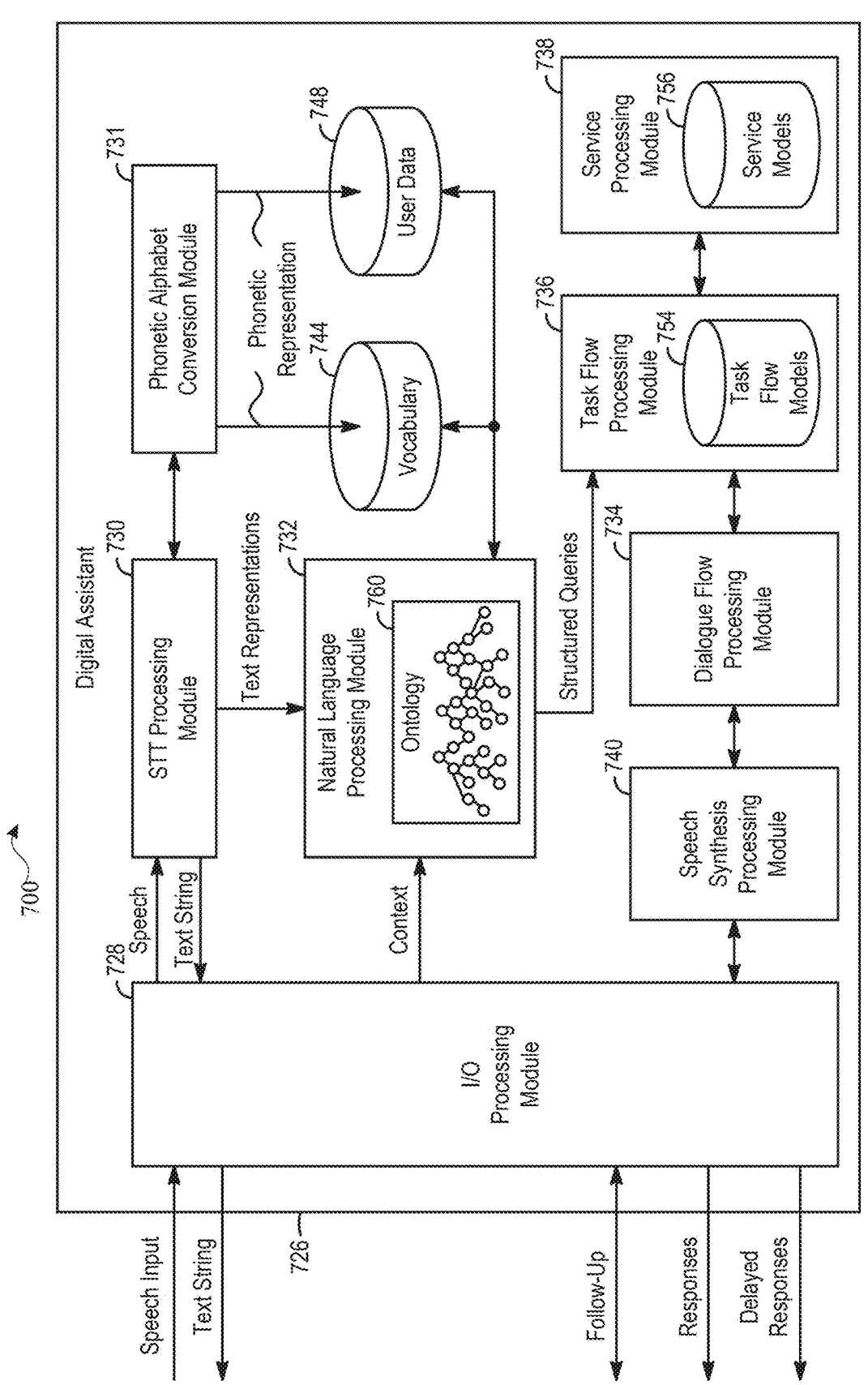
FIG. 7B illustrates the functions of the digital assistant shown in FIG. 7A, according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems 758. The one or more ASR systems 758 can process the speech input that is received through I/O processing module 728 to produce a recognition result. Each ASR system 758 includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system 758 includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction. In some examples, STT processing module 730 produces multiple candidate text representations of the speech input. Each candidate text representation is a sequence of words or tokens corresponding to the speech input. In some examples, each candidate text representation is associated with a speech recognition confidence score. Based on the speech recognition confidence scores, STT processing module 730 ranks the candidate text representations and provides the n-best (e.g., n highest ranked) candidate text representation(s) to natural language processing module 732 for intent deduction, where n is a predetermined integer greater than zero. For example, in one example, only the highest ranked (n=1) candidate text representation is passed to natural language processing module 732 for intent deduction. In another example, the five highest ranked (n=5) candidate text representations are passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /təˈmeɪɾoʊ/ and /təˈmɑtoʊ/ . Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /təˈmeɪɾoʊ/ is ranked higher than /təˈmɑtoʊ/ , because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /təˈmeɪɾoʊ/ is associated with the United States, whereas the candidate pronunciation /təˈmɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /təˈmeɪɾoʊ/ (associated with the United States) is ranked higher than the candidate pronunciation /təˈmɑtoʊ/ (associated with Great Britain). In some examples, one of the ranked candidate /təˈmɑtoʊ/ pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /təˈmeɪɾoʊ/ 60 corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 determines that the sequence of phonemes /təˈmeɪɾoʊ/ corresponds to the word "tomato," even if that particular sequence of phonemes is not one of the candidate sequence of phonemes for that word.

Natural language processing module 732 ("natural language processor") of the digital assistant takes the n-best candidate text representation(s) ("word sequence(s)" or "token sequence(s)") generated by STT processing module 730, and attempts to associate each of the candidate text representations with one or more "actionable intents" recognized by the digital assistant. An "actionable intent" (or "user intent") represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the candidate text representations received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
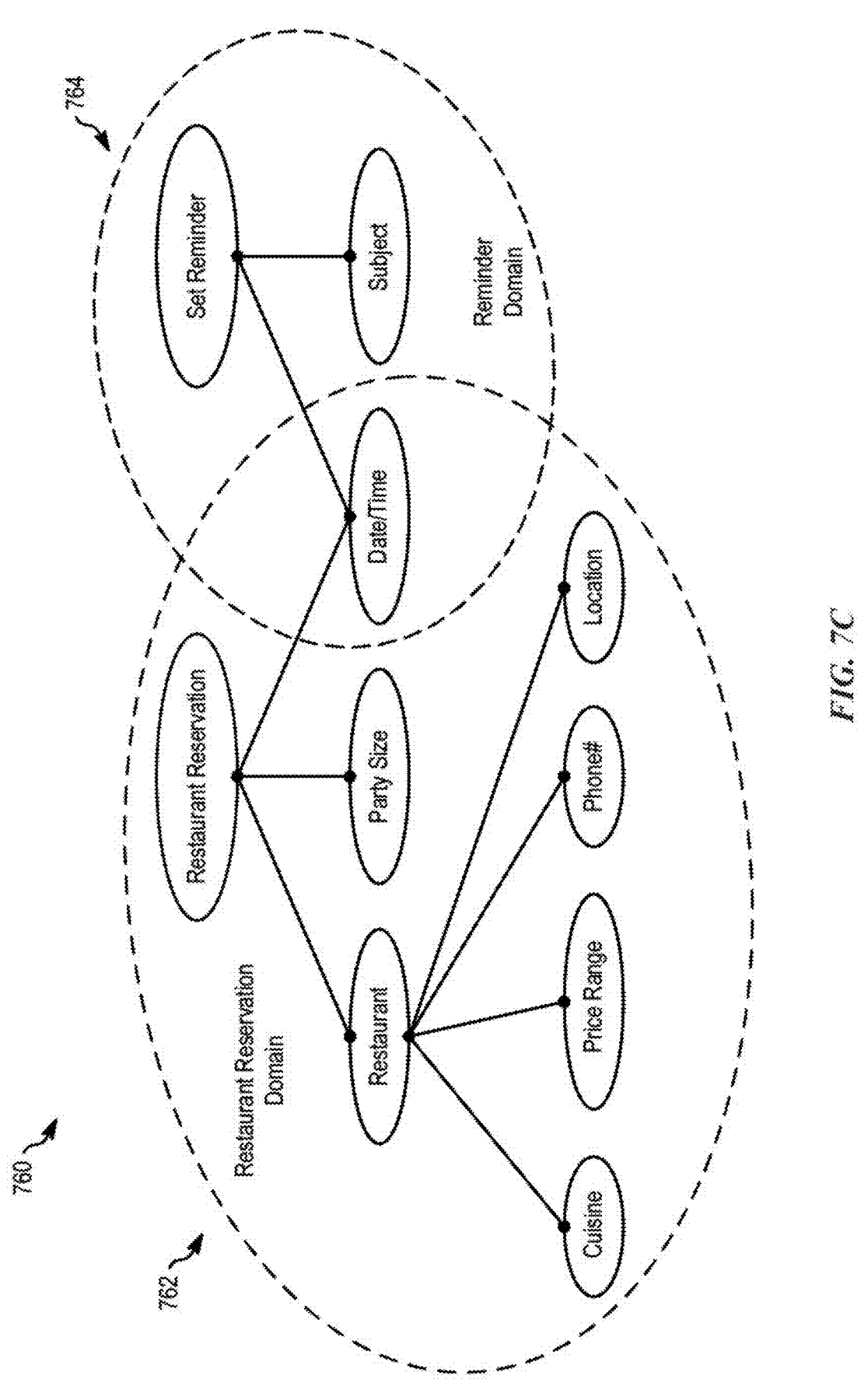
FIG. 7C illustrates a portion of an ontology, according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked property nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the candidate text representations (e.g., text string(s) or token sequence(s)) from STT processing module 730, and for each candidate representation, determines what nodes are implicated by the words in the candidate text representation. In some examples, if a word or phrase in the candidate text representation is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

It should be recognized that in some examples, natural language processing module 732 is implemented using one or more machine learning mechanisms (e.g., neural networks). In particular, the one or more machine learning mechanisms are configured to receive a candidate text representation and contextual information associated with the candidate text representation. Based on the candidate text representation and the associated contextual information, the one or more machine learning mechanisms are configured to determine intent confidence scores over a set of candidate actionable intents. Natural language processing module 732 can select one or more candidate actionable intents from the set of candidate actionable intents based on the determined intent confidence scores. In some examples, an ontology (e.g., ontology 760) is also used to select the one or more candidate actionable intents from the set of candidate actionable intents.

Other details of searching an ontology based on a token string are described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi" } and {Time="7 pm" }. However, in this example, the user's utterance contains insufficient information to complete the structured query associated with the domain. Therefore, other necessary parameters such as {Party Size} and {Date} are not specified in the structured query based on the information currently available. In some examples, natural language processing module 732 populates some parameters of the structured query with received contextual information. For example, in some examples, if the user requested a sushi restaurant "near me," natural language processing module 732 populates a {location} parameter in the structured query with GPS coordinates from the user device.

In some examples, natural language processing module 732 identifies multiple candidate actionable intents for each candidate text representation received from STT processing module 730. Further, in some examples, a respective structured query (partial or complete) is generated for each identified candidate actionable intent. Natural language processing module 732 determines an intent confidence score for each candidate actionable intent and ranks the candidate actionable intents based on the intent confidence scores. In some examples, natural language processing module 732 passes the generated structured query (or queries), including any completed parameters, to task flow processing module 736 ("task flow processor"). In some examples, the structured query (or queries) for the m-best (e.g., m highest ranked) candidate actionable intents are provided to task flow processing module 736, where m is a predetermined integer greater than zero. In some examples, the structured query (or queries) for the m-best candidate actionable intents are provided to task flow processing module 736 with the corresponding candidate text representation(s).

Other details of inferring a user intent based on multiple candidate actionable intents determined from multiple candidate text representations of a speech input are described in U.S. Utility application Ser. No. 14/298,725 for "System and Method for Inferring User Intent From Speech Inputs," filed Jun. 6, 2014, the entire disclosure of which is incorporated herein by reference.

Task flow processing module 736 is configured to receive the structured query (or queries) from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generates requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and sends the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis processing module 740 (e.g., speech synthesizer) where it can be processed to synthesize the dialogue response in speech form. In yet other examples, the generated response is data content relevant to satisfying a user request in the speech input.

In examples where task flow processing module 736 receives multiple structured queries from natural language processing module 732, task flow processing module 736 initially processes the first structured query of the received structured queries to attempt to complete the first structured query and/or execute one or more tasks or actions represented by the first structured query. In some examples, the first structured query corresponds to the highest ranked actionable intent. In other examples, the first structured query is selected from the received structured queries based on a combination of the corresponding speech recognition confidence scores and the corresponding intent confidence scores. In some examples, if task flow processing module 736 encounters an error during processing of the first structured query (e.g., due to an inability to determine a necessary parameter), the task flow processing module 736 can proceed to select and process a second structured query of the received structured queries that corresponds to a lower ranked actionable intent. The second structured query is selected, for example, based on the speech recognition confidence score of the corresponding candidate text representation, the intent confidence score of the corresponding candidate actionable intent, a missing necessary parameter in the first structured query, or any combination thereof.

Speech synthesis processing module 740 is configured to synthesize speech outputs for presentation to the user. Speech synthesis processing module 740 synthesizes speech outputs based on text provided by the digital assistant. For example, the generated dialogue response is in the form of a text string. Speech synthesis processing module 740 converts the text string to an audible speech output. Speech synthesis processing module 740 uses any appropriate speech synthesis technique in order to generate speech outputs from text, including, but not limited, to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis processing module 740 is configured to synthesize individual words based on phonemic strings corresponding to the words. For example, a phonemic string is associated with a word in the generated dialogue response. The phonemic string is stored in metadata associated with the word. Speech synthesis processing module 740 is configured to directly process the phonemic string in the metadata to synthesize the word in speech form.

In some examples, instead of (or in addition to) using speech synthesis processing module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

Figure 8:
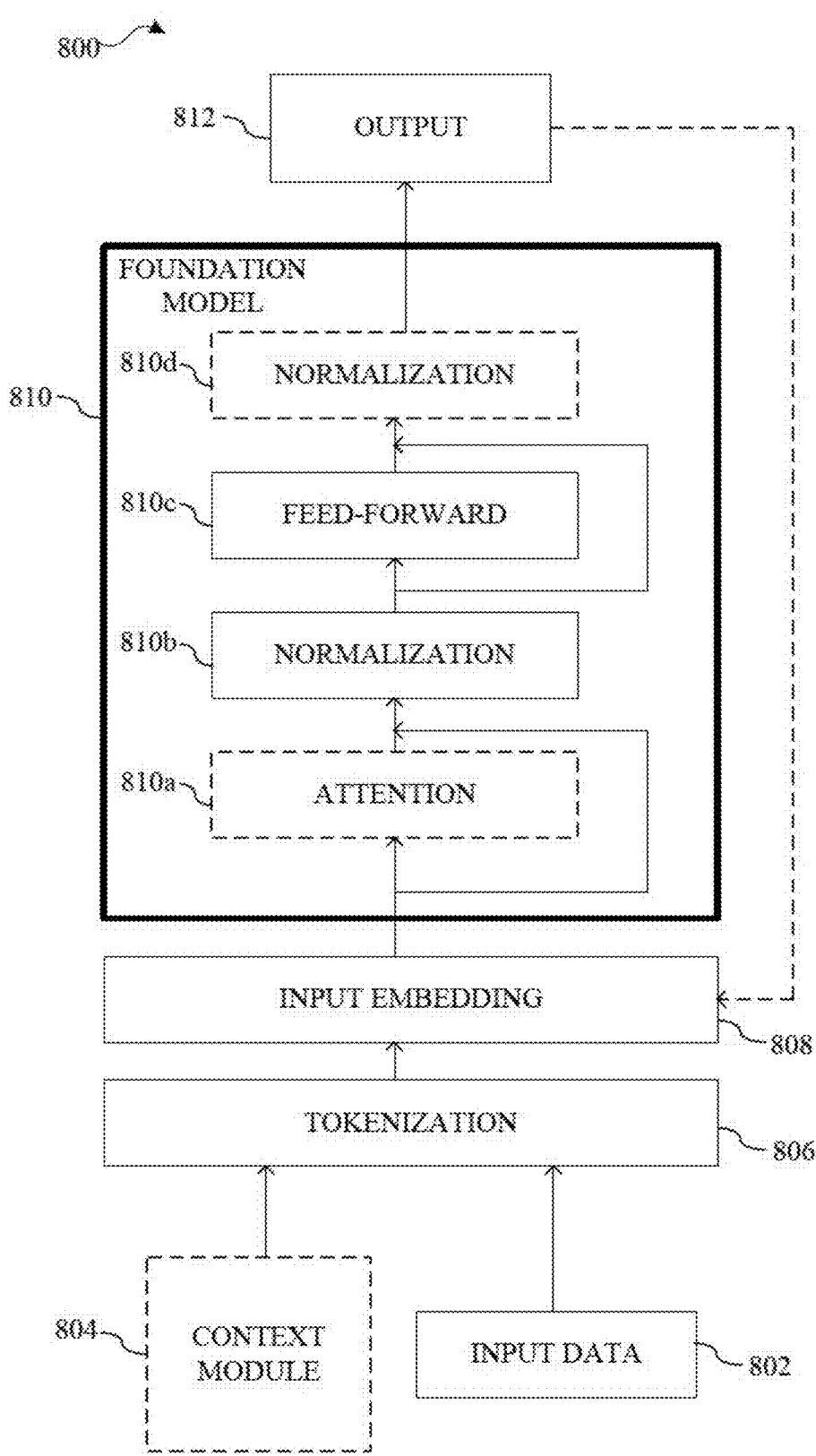
FIG. 8 is a block diagram illustrating a foundation system, according to various examples.

FIG. 8 illustrates exemplary foundation system 800 including foundation model 810, according to various examples. In some examples, the blocks of foundation system 800 are combined, the order of the blocks is changed, and/or blocks of foundation system 800 are removed.

Foundation system 800 includes tokenization module 806, input embedding module 808, and foundation model 810 which use input data 802 and, optionally, context module 804 to train foundation model 810 to process input data 802 to determine output 812.

In some examples, the various components of digital assistant system 700 (e.g., digital assistant module 726, operating system (e.g., 226 or 718), and/or software applications (e.g., 236 and/or 724) installed on device 104, 200, 400, 600, 1000, 1100, 1200, and/or 1500) include and/or are implemented using generative artificial intelligence (AI) such as foundation model 810. In some examples, foundation model 810 include a subset of machine learning models that are trained to generate text, images, and/or other media based on sets of training data that include large amounts of a particular type of data. Foundation model 810 is then integrated into the components of digital assistant system 700 (or otherwise available to digital assistant system 700, e.g., digital assistant module 726, operating system (e.g., 226 or 718), and/or software applications (e.g., 236 and/or 724) installed on device 104, 200, 400, 600, and/or via an API) to provide text, images, and/or other media that digital assistant system 700 uses to determine tasks, perform tasks, and/or provide the outputs of tasks.

Foundation models are generally trained using large sets unlabeled data first and then later adapted to a specific task within the architecture of digital assistant system 700. Thus, a specific task or type of output is not encoded into the foundation models, rather the trained foundation model emerges based on the self-supervised training using the unlabeled data. The trained foundation model is then adapted to a variety of tasks based on the needs of the digital assistant system 700 to efficiently perform tasks for a user.

Generative AI models, such as foundation model 810, are trained on large quantities of data with self-supervised or semi-supervised learning to be adapted to a specific downstream task. For example, foundation model 810 is trained with large sets of different images and corresponding text or metadata to determine the description of newly captured image data as output 812. These descriptions can then be used by digital assistant system 700 to determine user intent, tasks, and/or other information that can be used to perform tasks. For example, generative AI models such as Midjourney, DALL-E, and stable diffusion are trained on large sets of images and are able to convert text to a generated image.

Large language models (LLM) are a type of foundation model that provide text output after being trained on large sets of input text data. As with other foundation models, LLM's can be trained in a self-supervised manner and thus the output of different LLM's trained on the same large set of input text can be different. These LLM's can then be adapted for use with digital assistant system 700 to specific types of text. Thus, in some examples, the LLM is trained to determine a summary of text provided to the LLM as an input while in other examples, the LLM is trained to predict text based on the set of input text. Thus, the LLM can efficiently process large amounts of input text to provide the digital assistant with text that can be used to determine and/or perform tasks. For example, GPT and LLaMA are exemplary large language models that process large amounts of input text and generates text that can be used by a digital assistant, a software application, and/or an operating system.

In some examples, the LLM may be trained in a semi-supervised manner and/or provided human feedback to refine the output of the LLM. In this way, the LLM may be adapted to provide the specific output required for a particular task of digital assistant system 700, such as a summary of large amounts of text or a task for digital assistant system 700 to perform. Further, the input provided to the LLM can be adapted such that the LLM processes data as or more efficiently than digital assistant system 700 could without the use of the LLM.

Once foundation model 810 (e.g., an LLM) has been fully trained, foundation model 810 can process input data 802 as discussed below to determine output 812 which may be used to further train foundation model 810 or can be processed by digital assistant 700 to perform a task and/or provide an output to the user.

Specifically, input data 802 is received and provided to tokenization module 806 which converts input data 802 into a token and/or a series of tokens which can be processed by input embedding module 808 into a format that is understood by foundation model 810. Tokenization module 806 converts input data into a series of characters that has a specific semantic meaning to foundation model 810.

In some examples, tokenization module 806 tokenizes contextual data from context module 804 to add further information to input data 802 for processing by foundation model 810. For example, context module 804 can provide information related to input data 802 such as a location that input data 802 was received, a time that input data 802 was received, other data that was received contemporaneously with input data 802, and/or other contextual information that relates to input data 802. Tokenization module 806 can then tokenize this contextual data with input data 802 to be provided to foundation model 810.

After input data 802 has been tokenized, input data 802 is provided to input embedding module 808 to convert the tokens to a vector representation that can be processed by foundation model 810. In some examples, the vector representation includes information provided by context module 804. In some examples, the vector representation includes information determined from output 812. Accordingly, input embedding module 808 converts the various data provided as an input into a format that foundation model 810 can parse and process.

For example, when foundation model 810 is a large language model (LLM) tokenization module 806 converts input data 802 into text which is then converted into a vector representation by input embedding module 808 that can be processed by foundation model 810 to determine a response to input data 802 as output 812 or to determine a summary of input data 802 as output 812. As another example, when foundation model 810 is a model that has been trained to determine descriptions of images, input data 802 of images can be tokenized into characters and then converted into a vector representation by input embedding module 808 that is processed by foundation model 810 to determine a description of the images as output 812.

Foundation model 810 processes the received vector representation using a series of layers including, in some embodiments, attention layer 810a, normalization layer 810b, feed-forward layer 810c, and/or normalization layer 810d. In some examples, foundation model 810 includes additionally layers similar to these layers to further process the vector representation. Accordingly, foundation model 810 can be customized based on the specific task that foundation model 810 has been trained to perform. Each of the layers of foundation model 810 perform a specific task to process the vector representation into output 812.

Attention layer 810a provides access to all portions of the vector representation at the same time, increasing the speed at which the vector representation can be processed and ensuring that the data is processed equally across the portions of the vector representation. Normalization layer 810b and normalization layer 810d scale the data that is being processed by foundation model 810 up or down based on the needs of the other layers of foundation model 810. This allows foundation model 810 to manipulate the data during processing as needed. Feed-forward layer 810c assigns weights to the data that is being processed and provides the data for further processing within foundation model 810. These layers work together to process the vector representation provided to foundation model 810 to determine the appropriate output 812.

For example, as discussed above, when foundation model 810 is a large language model (LLM) foundation model 810 processes input text to determine a summary and/or further follow-up text as output 812. As another example, as discussed above, when foundation model 810 is a model trained to determine descriptions of images, foundation model 810 processes input images to determine a description of the image and/or tasks that can be performed based on the content of the images as output 812.

In some examples, output 812 is further processed by digital assistant system 700 (e.g., digital assistant module

726, operating system (e.g., 226 or 718), and/or software applications (e.g., 236 and/or 724) installed on device 104, 200, 400, 600, 1000, 1100, 1200, and/or 1500) to provide an output or execute a task. For example, when output 812 is a sentence describing a task that digital assistant system 700 has performed, digital assistant system 700 can use the text to create a visual or audio output to be provided to a user. As another example, when output 812 is text that includes a function and a parameter for the function, digital assistant system 700 can perform a function call to execute the function with the provided parameter.

In some examples, digital assistant system 700 includes multiple generative AI (e.g., foundation) models that work together to process data in an efficient manner. In some examples, components of digital assistant system 700 may be replaced with generative AI (e.g., foundation) models trained to perform the same function as the component. In some examples, these generative AI models are more efficient than traditional components and/or provide more flexible processing and/or outputs for digital assistant system 700 to utilize.

As described herein, content is automatically generated by one or more computers in response to a request to generate the content. The automatically-generated content is optionally generated on-device (e.g., generated at least in part by a computer system at which a request to generate the content is received) and/or generated off-device (e.g., generated at least in part by one or more nearby computers that are available via a local network or one or more computers that are available via the internet). This automatically-generated content optionally includes visual content (e.g., images, graphics, and/or video), audio content, and/or text content.

In some embodiments, novel automatically-generated content that is generated via one or more artificial intelligence (AI) processes (e.g., such as the processes described herein) is referred to as generative content (e.g., generative images, generative graphics, generative video, generative audio, and/or generative text). Generative content is typically generated by an AI process based on a prompt that is provided to the AI process. An AI process typically uses one or more AI models (e.g., as described with respect to FIGS. 8 and 9) to generate an output based on an input. An AI process optionally includes one or more pre-processing steps to adjust the input before it is used by the AI model to generate an output (e.g., adjustment to a user-provided prompt, creation of a system-generated prompt, and/or AI model selection). An AI process optionally includes one or more post-processing steps to adjust the output by the AI model (e.g., passing AI model output to a different AI model, upscaling, downscaling, cropping, formatting, and/or adding or removing metadata) before the output of the AI model used for other purposes such as being provided to a different software process for further processing or being presented (e.g., visually or audibly) to a user. An AI process that generates generative content is sometimes referred to as a generative AI process.

A prompt for generating generative content can include one or more of: one or more words (e.g., a natural language prompt that is written or spoken), one or more images, one or more drawings, and/or one or more videos. AI processes can include machine learning models including neural networks. Neural networks can include transformer-based deep neural networks such as large language models (LLMs). Generative pre-trained transformer models are a type of LLM that can be effective at generating novel generative content based on a prompt. Some AI processes use a prompt that includes text to generate either different generative text, generative audio content, and/or generative visual content. Some AI processes use a prompt that includes visual content and/or an audio content to generate generative text (e.g., a transcription of audio and/or a description of the visual content). Some multi-modal AI processes use a prompt that includes multiple types of content (e.g., text, images, audio, video, and/or other sensor data) to generate generative content. A prompt sometimes also includes values for one or more parameters indicating an importance of various parts of the prompt. Some prompts include a structured set of instructions that can be understood by an AI process that include phrasing, a specified style, relevant context (e.g., starting point content and/or one or more examples), and/or a role for the AI process.

Generative content is generally based on the prompt but is not deterministically selected from pre-generated content and is, instead, generated using the prompt as a starting point. In some embodiments, pre-existing content (e.g., audio, text, and/or visual content) is used as part of the prompt for creating generative content (e.g., the pre-existing content is used as a starting point for creating the generative content). For example, a prompt could request that a block of text be summarized or rewritten in a different tone, and the output would be generative text that is summarized or written in the different tone. Similarly a prompt could request that visual content be modified to include or exclude content specified by a prompt (e.g., removing an identified feature in the visual content, adding a feature to the visual content that is described in a prompt, changing a visual style of the visual content, and/or creating additional visual elements outside of a spatial or temporal boundary of the visual content that are based on the visual content). In some embodiments, a random or pseudo-random seed is used as part of the prompt for creating generative content (e.g., the random or pseud-random seed content is used as a starting point for creating the generative content). For example, when generating an image from a diffusion model, a random noise pattern is iteratively denoised based on the prompt to generate an image that is based on the prompt. While specific types of AI processes have been described herein, it should be understood that a variety of different AI processes could be used to generate generative content based on a prompt.

4. Process for Query Execution by a Digital Assistant

Figure 9:
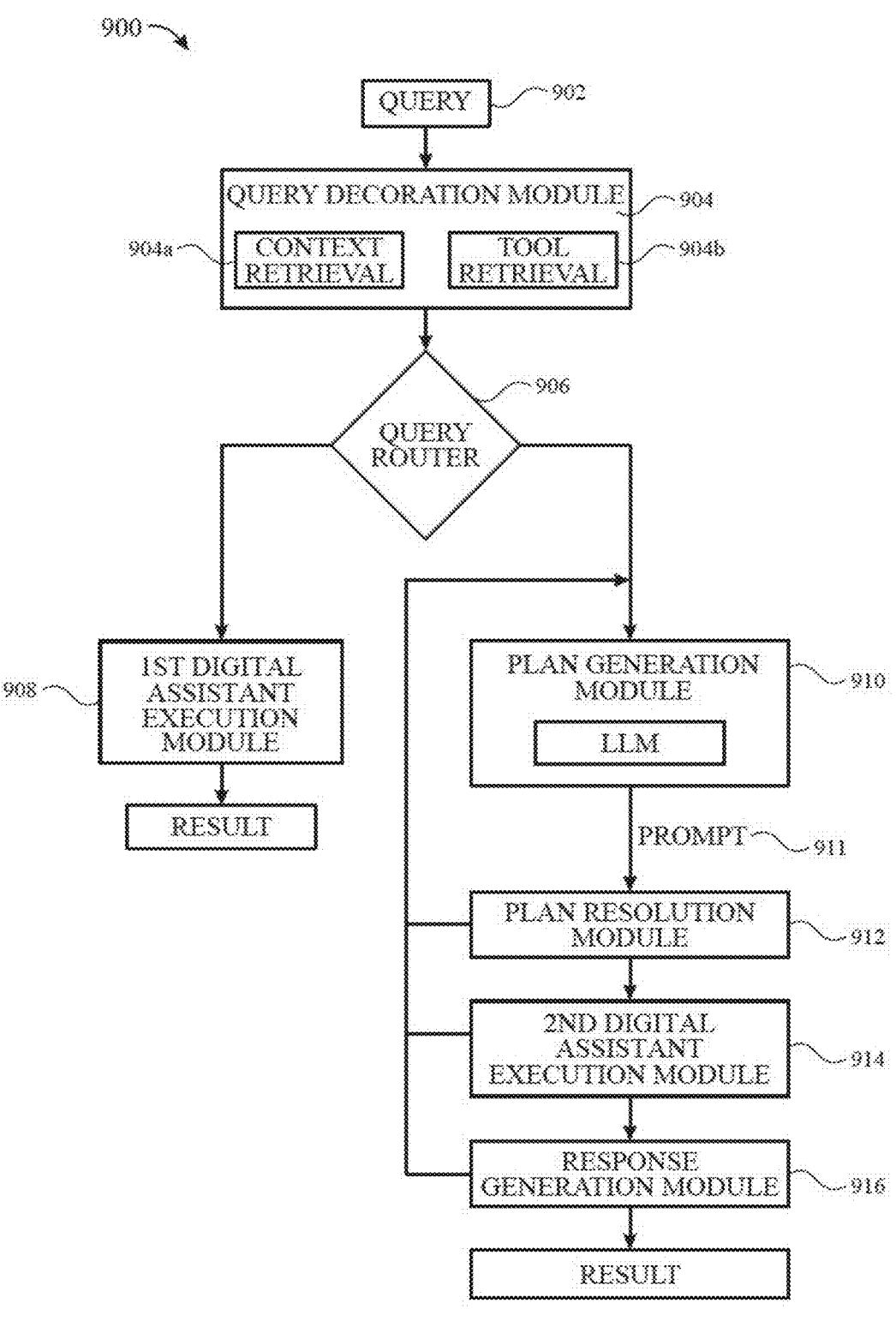
FIG. 9 is a block diagram illustrating a digital assistant, according to various examples.

FIG. 9 is a block diagram illustrating digital assistant 900, according to various examples. Digital assistant 900 includes query decoration module 904, query router 906, first digital assistant execution module 908, plan generation module 910, plan resolution module 912, second digital assistant execution module 914, and response generation module 916. The various components of FIG. 9 and the functions of those components are discussed below, followed by examples (the descriptions of FIGS. 10A-10E, 11A-11C, 12A-12D, and/or 15A-15I) which describe possible inputs and outputs digital assistant 900.

Digital assistant 900 receives query 902 and processes query 902 with the modules discussed below to determine which components (e.g., modules) of digital assistant 900 are able to execute tasks of query 902 and provide a result to a user. For example, query 902 includes an initial and/or user-provided prompt.

In some examples, query 902 is detected (e.g., received) by a computer system which stores digital assistant 900. In some examples, the computer system provides (e.g., sends and/or transfers) query 902 and/or audio data representing query 902 to digital assistant 900. In some examples, digital assistant 900 creates and/or extracts query 902 from audio data detected at a microphone of the computer system.

After receiving and/or extracting the data representing query 902, digital assistant 900 begins processing query 902 to execute a task and determine a response for the user. In particular, digital assistant 900 processes query 902 to determine which components of digital assistant 900 can and/or should execute a task of query 902 to increase the efficiency of digital assistant 900.

After receiving query 902, digital assistant 900 provides query 902 to query decoration module 904. Query decoration module 904 gathers data from the computer system (e.g., computer system 1000, 1100, and/or 1200) on which digital assistant 900 resides that is related to query 902 and/or will help digital assistant 900 execute tasks of query 902 and provide a response to query 902.

Query decoration module 904 includes context retrieval module 904a and tool retrieval module 904b, which are used to gather information and/or data related to query 902 from the computer system storing digital assistant 900. Context retrieval module 904a gathers contextual data related to query 902 such as locations, applications, contacts, people, places, things, and/or targets that can be used to execute a task or determine a task of query 902. In some examples, the contextual data includes an application being displayed by the computer system (e.g., computer system 1000, 1100, and/or 1200) that stores and/or executes digital assistant 900. In some examples, context retrieval module 904a gathers contextual data from various sensors, subsystems, and peripheral devices of the computer system (e.g., as described with respect to FIGS. 2A-2B and 7A-7C).

In some examples, the contextual data includes entities (e.g., locations, contacts, people, places, photographs, videos, objects, things, etc.) that are being displayed by the computer system (e.g., computer system 1000, 1100, and/or 1200) that stores and/or executes digital assistant 900. In some examples, the contextual data includes entities included in query 902, such as a title, name, deictic reference, and/or other identifier. In some examples, the contextual data includes conversation history and/or interaction history between a user of the computer system and digital assistant 900, such as other queries that the user has recently provided to digital assistant 900 and/or applications that the user has recently and/or frequently invoked when using digital assistant 900. In some examples, the contextual data includes relationships between a user of the computer system and other users, locations, and/or things (e.g., people related to the user, the user's home, the user's place of work, and/or the user's pets). In some examples, the contextual data includes applications that are installed and/or are available to the computer system which stores and/or executes digital assistant 900. In some examples, the contextual data includes a state of the computer system (e.g., a power state of the computer system such as on, off, lower power (e.g., sleep), and/or normal power. In some examples, the contextual data includes applications that are open (e.g., launched and/or active) on the computer system. In some examples, the contextual data includes applications that are in focus (e.g., being displayed) on the computer system. In some examples, the contextual data includes a mode of the computer system such as a do-not-disturb mode, a driving mode, and/or a focus mode.

Tool retrieval module 904b gathers tools (e.g., application intents, intents, protocols, processes, executable tasks, and/or functions) related to query 902 that are available to digital assistant 900. In some examples, the tools that are available to query 902 include the functions of applications that are installed on and/or are available to the computer system (e.g., computer system 1000, 1100, and/or 1200) which stores and/or executes digital assistant 900. In some examples, the tools include application intents and/or functions of applications included in query 902. In some examples, the tools include application intents and/or functions of applications related to a task include in query 902 (e.g., protocols for sending emails when query 902 includes the term "email"). In some examples, the tools include application intents and/or functions of an application that is currently displayed by the computer system (e.g., when query 902 is detected). In some examples, the tools include functions of user interface elements of an application that is currently displayed by the computer system (e.g., when query 902 is detected).

In some examples, the tools include application intents and/or functions that are provided by developers and/or creators of applications that are available to digital assistant 900. Thus, developers and/or creators may provide application intents with their applications when they are submitted to digital assistant 900 to ensure that the new applications will be integrated into the described process. In this way, digital assistant 900 can add applications and their associated application intents over time when provided the information from application developers and/or creators.

In some examples, tool retrieval module 904b includes a semantic matching module that compares query 902 to descriptions of tools available to the computer system and/or digital assistant 900. In some examples, tool retrieval module 904b includes a heuristic that retrieves application intents and/or functions of applications mentioned in query 902 and/or displayed by the computer system when query 902 is detected. In some examples, tool retrieval module 904b includes a machine learning model, neural network, and/or other generative AI that compares a representation of query 902 to representations of the tools.

In some examples, tool retrieval module 904b creates and/or retrieves embeddings that represent the tools that are possibly related to query 902. Thus, when query 902 is received by tool retrieval module 904b, tool retrieval module 904b calculates the distance between an embedding representing query 902 and the embeddings that represent the tools. Tool retrieval module 904b then selects a predetermined number of tools (e.g., 3, 5, 7, and/or 10) that have a distance to the embedding representing query 902 within (e.g., above and/or below) a threshold. In this way, tool retrieval module 904b selects tools that are relevant to query 902 from the collection of all tools available to digital assistant 900.

In some examples, tool retrieval module 904b gathers information related to the tools (e.g., in addition to the tools), such as descriptions of the tools and/or examples of using the tools. In some examples, the tools include application intents and/or functions of applications that have not been previously integrated with digital assistant 900. Thus, applications that are newly installed on the computer system and have not previously been called and/or interacted with by digital assistant 900 can contribute application intents and/or functions that can be further used, as discussed below, to determine how to respond to query 902.

In some examples, gathering information related to the tools includes example inputs that a user may provide when trying to call or invoke a particular tool or application. In some examples, the descriptions of the tools and the example inputs that the user may provide are created and provided by a developer when the tool and/or application is provided to the system to be integrated with digital assistant

900. For example, a developer may include several example inputs with different parameters the tool and/or application intent accepts with the application intent as a package to be integrated with digital assistant 900. In this way, digital assistant 900 is provided natural language descriptions of the application intent and/or tool as well as examples to be accessed when determining which application intent will satisfy a user request.

In some examples, the description of the tools and the example inputs are automatically generated based on the capabilities of the tool and/or the application intent when the tool and/or application intent are provided to the system. For example, the application intent and/or the tool can be provided to a machine learning model trained to develop a description of the application intent and/or the tool based on the parameters the application intent and/or tool accepts, the output the application intent and/or tool provides, and/or other capabilities of the application intent and/or tool. In this way, natural language descriptions of application intents and/or tools and possible examples can be automatically generated for digital assistant 900 to later reference when searching for application intents that will satisfy a particular user input.

Query decoration module 904 then provides query 902 and the gathered contextual data and relevant tools to query router 906. Query router 906 determines whether to provide query 902 to first digital assistant execution module 908 or to plan generation module 910 based on query 902 and the contextual information and/or tools retrieved by query decoration module 904. Query router 906 determines to provide query 902 to first digital assistant execution module 908 when first digital assistant execution module 908 is capable of executing a task and providing a response to query 902 based on the contextual information and/or tools provided by query decoration module 904. Alternatively, when first digital assistant execution module 908 is not capable of executing the task and/or further resolution is required to determine an entity and/or an actionable intent to use to provide a response to query 902, digital assistant 900 provides query 902 and the information retrieved by query decoration module 904 to plan generation module 910.

In some examples, query router 906 determines whether first digital assistant execution module 908 is capable of executing a task and providing a response to query 902 based on whether more contextual data is required (e.g., a parameter for a task cannot be determined based on the contextual data provided by query decoration module 904). In some examples, query router 906 determines whether first digital assistant execution module 908 is capable of executing a task and providing a response to query 902 based on the task and/or function to be executed. In some examples, first digital assistant execution module 908 is capable of performing a predetermined set of tasks and/or functions such as sending a text message, retrieving basic information, and/or changing the state of a connected device. Accordingly, when query 902 requires a task that is not included in the predetermined set of tasks that first digital assistant execution module 908 is capable of performing, query router 906 does not provide query 902 (or a rewritten query) to first digital assistant execution module 908.

In some examples, query router 906 determines that first digital assistant execution module 908 is not capable of executing a task and providing a response to query 902 when query 902 includes a conjunction, a composite request, and/or multiple queries. In some examples, query router 906 determines that first digital assistant execution module 908 is capable of executing a task and providing a response to query 902 when query 902 includes multiple queries of the same domain (e.g., weather, home automation, messaging, etc.) and/or a related function. In some examples, query router 906 determines that first digital assistant execution module 908 is not capable of executing a task and providing a response to query 902 when query 902 includes a conjunction, a composite request, and/or multiple queries of unrelated domains and/or tasks (e.g., setting a timer and creating an alarm or retrieving an address and sending an email). In some examples, query router 906 determines that first digital assistant execution module 908 is capable of executing the task when query 902 includes a request for first digital assistant execution module 908 and/or a digital assistant component associated with first digital assistant execution module 908 (e.g., that can be called and/or accessed by first digital assistant execution module 908).

In some examples, query router 906 determines that first digital assistant execution module 908 is capable of executing a first task of query 902 but not a second task of query 902. Accordingly, query router 906 splits query 902 into two separate queries (e.g., by rewriting at least a portion of query 902 as discussed below) and provides the first query to first digital assistant execution module 908 for execution and the second query to plan generation module 910 for further processing. In some examples, query router 906 causes first digital assistant execution module 908 to provide an output of a task and/or a result to plan generation module 910.

In some examples, query router 906 determines how to route query 902 based on whether query 902 includes a knowledge seeking intent. When query 902 includes a knowledge seeking intent then query router 906 determines whether first digital assistant execution module 908 is capable of answering and/or providing a response to query 902. When first digital assistant execution module 908 is not capable of answering and/or providing a response to query 902 (e.g., because query 902 is too complex) then query router 906 provides query 902 to plan generation module 910 and/or another component of digital assistant 900. For example, complex queries include queries that require the output(s) of one task to be used as the input(s) for another task or queries that require disambiguation and/or context retrieval beyond that performed by query decoration module 904 (e.g., as described with respect to FIGS. 11A-11C and/or 12A-12C).

In some examples, query router 906 determines whether query 902 is a follow-up query. When query 902 is a follow-up query then query router 906 provides query 902 to the component which processed the preceding query. In some examples, when query 902 is a follow-up query, query router 906 rewrites query 902 to include information and/or context from the preceding query, as discussed further below.

In some examples, query router 906 determines whether query 902 includes or relates to personal or private information, such as intents, parameters, context, and/or tools associated with a medical domain (e.g., logging health information or checking biometric data), a financial domain (e.g., accessing bank or credit account information or performing financial transactions), and/or a particular user's identity (e.g., personal information of the user making the query and/or another user, such as the user's family members or contacts). In some examples, when query 902 does not include personal or private information, query router 906 determines that query 902 (e.g., along with the contextual data and tools retrieved by query decoration module 904 and/or rewritten query 902, as described below) is permitted to be provided to plan generation module 910, which, in some examples, is implemented at least in part on a computer system that is different from the computer system on which digital assistant 900 operates (e.g., while first digital assistant execution module 908 is implemented and/or stored on the computer system that stores digital assistant 900), as described in further detail below.

In some examples, rather than providing query 902 to first digital assistant execution module 908 and/or plan generation module 910, query router 906 and digital assistant 900 rewrite (e.g., edit, amend, and/or change) query 902 to include at least a portion of the contextual information and/or tools retrieved by query decoration module 904. In some examples, rewriting query 902 includes adding at least a portion of a subsequently and/or previously received query to query 902 (e.g., user speech input that is detected before and/or after the user speech that is included in query 902). In some examples, rewriting query 902 includes replacing information of query 902 with contextual data. In some examples, rewriting query 902 includes adding contextual information such as an entity to query 902.

In some examples, rewriting query 902 includes rewriting query 902 to improve fluency, for instance, removing pauses, stutters, repeated words, and/or fillers (e.g., hesitation markers, such as "um," "ah," "like," or "okay"), resolving redundancies, and/or adjusting grammar, structure, or organization (e.g., in a way that does not change the intent of rewritten query 902). In some examples, when query 902 includes a conjunction, a composite request, and/or multiple queries, rewriting query 902 includes decomposing query 902 into multiple rewritten queries, which may be routed to one or both of first digital assistant execution module 908 and plan generation module 910, e.g., routing the multiple rewritten queries to the same module and/or different modules.

In some examples, first digital assistant execution module 908 includes a large language model, a machine learning model, a neural network, and/or another type of generative AI model, such as the model described in FIG. 8 above. In some examples, first digital assistant execution module 908 includes multiple large language models, machine learning models, and/or neural networks. In some examples, first digital assistant execution module 908 includes one or more models trained to direct and/or rewrite received queries like query 902 to different digital assistant components. In some examples, first digital assistant execution module 908 is implemented and/or stored on the computer system that stores digital assistant 900. In some examples, first digital assistant execution module 908 is implemented and/or stored on the computer system on which digital assistant 900 was invoked by the user. In some examples, first digital assistant execution module 908 is not implemented and/or stored on a different computer system (e.g., a server) that the user did not invoke digital assistant 900 on.

After first digital assistant execution module 908 receives query 902 and/or a rewritten version of query 902, first digital assistant execution module 908 uses the contextual data and/or the tools retrieved by query decoration module 904 to execute a task and determine result 920. Digital assistant 900 then provides an output (e.g., an audio output and/or an output on a display of the computer system) including information about result 920 to the user.

When digital assistant 900 determines that first digital assistant execution module 908 is not able to determine a result and/or provide an output responsive to query 902 (e.g., based on the analysis discussed above), digital assistant 900 provides query 902 along with the contextual data and tools retrieved by query decoration module 904 to plan generation module 910. In some examples, digital assistant 900 and/or query router 906 provides rewritten query 902 to plan generation module 910. In some examples, query router 906 is trained and/or adapted in a different manner (e.g., using different techniques, data sets, and/or numbers of parameters) than plan generation module 910 and/or the LLM of plan generation module 910. For example, query router 906 can include a finely-tuned language model for re-writing queries as described above (e.g., incorporating the contextual information and/or tools retrieved by query decoration module 904 and/or improving fluency), while the LLM of plan generation module 910 is trained/adapted for plan generation as described below.

Plan generation module 910 creates a prompt (e.g., a plan, strategy, and/or file) including application intents and entities that can be used to determine a result for query 902. For example, a prompt includes one or more inputs for a generative AI and/or machine-learning process (e.g., a prompt for generating generative content). Plan generation module 910 includes a large language model (LLM) that is trained to use query 902, the contextual data, and the tools provided by query router 906 to create (e.g., write, develop, generate, and/or produce) prompt 911 which is resolved by plan resolution module 912 and then executed using second digital assistant execution module 914 (e.g., as described below) to determine the result (e.g., response) to query 902. Accordingly, in some examples, plan generation module 910 pre-processes query 902 based on the contextual data and tools provided by query router 906 to create prompt 911 to use as an input for the AI processes (e.g., LLMs) of plan resolution module 912 and/or response generation module 916.

Plan generation module 910 writes the prompt in a way to include possible tools and/or actionable intents and entities that can be used by the tools and/or actionable intents to determine a response to query 902 based on the content of query 902. Thus, prompt 911 includes a plan of tasks to be executed to satisfy the user's request (and/or requests) of query 902. Prompt 911 can be further processed, as discussed further below, to select application intents and entities that match prompt 911 to determine which applications to call and tasks to execute.

In some examples, plan generation module 910 determines multiple tasks need to be executed to satisfy query 902 and creates prompt 911 to include possible application intents and entities for each of the multiple tasks. In some examples, plan generation module 910 creates prompt 911 to include multiple tasks to be executed in parallel. Thus, when plan resolution module 912 evaluates prompt 911, plan resolution module 912 evaluates the possible application intents and entities at the same time.

In some examples, plan generation module 910 creates prompt 911 to include multiple tasks to be executed in series (e.g., when query 902 includes a composite request). In some examples, multiple tasks are to be executed in series when the output of a first task is the input of a second task. When plan generation module 910 creates prompt 911 to include multiple tasks to be executed in series, prompt 911 includes a flag to return the outputs of a first task to plan generation module 910 so that plan generation module 910 can adjust prompt 911 and/or write a second plan to execute the second task (and/or other tasks to be performed in series) using the results of the earlier executed tasks.

In some examples, plan generation module 910 creates prompt 911 to include a search request by calling a search tool. When calling a search tool, rather than create a natural language prompt, plan generation module 910 creates a structured query including the search function and the parameters required for the search. For example, when a user request includes a reference to the user's mother, plan generation module 910 recognizes that a search of information related to the suer is required. Plan generation module 910 creates a structured query calling the search function with the parameter "mother_name" as part of prompt 911 to ensure that the correct search is performed when the prompt is executed. In this way, plan generation module 910 ensures that a search for the parameter is performed even when the natural language portions of prompt 911 may be interpreted by other portions of the system to perform other tasks.

In some examples, plan generation module 910 and/or the LLM of plan generation module 910 are implemented on a computer system that is different from the computer system on which digital assistant 900 operates. In some examples, digital assistant 900 operates on a computer system associated with a user such as a smartphone, tablet, computer, and/or wearable device and plan generation module 910 and/or the LLM of plan generation module 910 operate on a server separate from the computer system associated with the user. In some examples, digital assistant 900 operates on a first server and plan generation module 910 and/or the LLM of plan generation module 910 operate on a second server separate from the first server. In some examples, plan generation module 910 and/or the LLM of plan generation module 910 are implemented partially on the computer system associated with the user (e.g., the same computer system which operates digital assistant 900) and partially on a server separate from the computer system associated with the user.

In some examples, plan generation module 910 and/or the LLM of plan generation module 910 are trained using natural language descriptions of available application intents and/or examples of user inputs that are related to the application intents. In this way, plan generation module 910 and/or the LLM of plan generation module 910 are trained to include application intents and the parameters required for the application intents based on the description of those application intents and the tasks that they are capable of executing when generating prompt 911.

Prompt 911 includes one or more application intents and/or one or more entities that could be used to perform a task to determine the result (e.g., response) to query 902. The application intents and entities included in prompt 911 are taken from the contextual data and tools that are provided to plan generation module 910 and written into a prompt that includes possible application intents that could be executed to perform one or more tasks. Accordingly, prompt 911 is received from plan generation module 910 (e.g., the LLM of plan generation module 910) and is processed with plan resolution module 912 to determine which of the possible application intents and entities included in prompt 911 to execute with second digital assistant execution module 914 to best respond to query 902.

Plan resolution module 912 compares portions of prompt 911 to candidate entities and application intents that are available to digital assistant 900 and in turn, the computer system (e.g., computer system 1000, 1100, and/or 1200). Plan resolution module 912 selects a candidate entity and an application intent by searching the candidate entities and application intents that are available to digital assistant 900 that match portions of prompt 911. For example, when prompt 911 includes a tool for sending a message, plan resolution module 912 can determine which applications installed on the computer system are capable of sending a message.

In some examples, plan resolution module 912 selects an entity and an application intent based on user data available to (e.g., stored on) the computer system (e.g., computer system 1000, 1100, and/or 1200) and/or behavioral signals (e.g., conversation history, interaction history, and/or user preference). In some examples, plan resolution module 912 selects an entity that a user has indicated the user prefers (e.g., selects an address that the user has previously indicated as their home address). In some examples, plan resolution module 912 selects an entity that a user typically uses (e.g., selects a contact for John C. instead of John S. when the user says "Call John" because the user typically calls John C.). In some examples, plan resolution module 912 selects an entity that a user invoked recently (e.g., selects John C. because the user interacted with a contact for John C. earlier in the day).

In some examples, plan resolution module 912 selects an application intent for an application that a user has indicated they would prefer to use for the particular task (e.g., selects a particular email application for sending emails). In some examples, plan resolution module 912 selects an application intent for an application that a user typically uses (e.g., selects the email application that the user typically uses to send emails). In some examples, plan resolution module 912 selects an application intent for an application that a user invoked recently (e.g., selects the email application that the user installed and/or accessed earlier the same day).

In some examples, plan resolution module 912 selects an application intent based on a natural language description of the application intent and/or examples of user inputs that are related to the application intent. In some examples, the natural language description of the application intent and/or examples of user inputs that are related to the application intent are included in a system dictionary that includes descriptions of the capabilities of digital assistant 900 and the computer system. In some examples, the system dictionary is developed independently of the performance of the plan resolution module 912. In this way, plan resolution module 912 and digital assistant 900 can access various types of information available to the system to determine the application intents that will help to satisfy a current user request, including information that digital assistant 900 and/or plan resolution module 912 have not previously accessed.

In some examples, plan resolution module 912 is unable to select an application intent and/or an entity for execution. In some examples, when this occurs, digital assistant 900 provides an output requesting input from a user of digital assistant 900 to clarify and/or select which application intent and/or intent should be selected.

In some examples, plan resolution module 912 is unable to select an application intent and/or an entity because an application and/or entity that will satisfy the user's request is unavailable. In this case, plan resolution module 912 determines that there is no matching tool available to plan resolution module 912 and/or the system as a whole and determines that an error message is to be provided. Digital assistant 900 then provides an output indicating the error to the user of digital assistant 900 and in some examples, requesting further input to try and process the previous user request.

In some examples, digital assistant 900 provides an audio output (e.g., with computer system 1000, 1100, and/or 1200) requesting an entity to use when executing a task such as "which John would you like to call?" In some examples, the audio output does not include specific choices for the user to select from. In some examples, the audio output asks an open-ended question. When digital assistant 900 provides an audio output and receives an audio input in response from the user, digital assistant 900 (e.g., plan resolution module 912) provides the received audio input to plan generation module 910 so that plan generation module 910 can adjust (e.g., edit) prompt 911 based on the received input. Thus, when an open-ended question such as "which John would you like to call?" is provided without options for the user to select from, the user input is provided back to plan generation module 910 so that possible entities that match the audio input are included in prompt 911. Plan resolution module 912 will then select an entity based on the new information included in prompt 911.

In some examples, digital assistant 900 provides a visual output on a screen of the computer system (e.g., computer system 1000, 1100, and/or 1200) which received query 902 requesting clarification and/or disambiguation from the user. In some examples, the visual output includes a predetermined and/or preselected set of options for the user to select from, such as three John's that the user has previously sent messages to when query 902 includes the request "send an email to John." Thus, the visual output can include John A, John B, and John C who's contact information is already stored on the computer system that received query 902. The computer system and/or digital assistant 900 then detects selection of one of the options provided in the visual output (e.g., with a touch input, tap input, press input, etc.). In response to detecting selection of one of the options provided in the visual output, digital assistant 900 provides the selected entity to plan resolution module 912, which uses the entity selected by the user to resolve the plan and provides the entity to second digital assistant execution module 914. Thus, when a touch input is used to select an option provided in a visual output, the selected option is used immediately and is not provided to plan generation module 910 to use in an edited and/or adjusted version of prompt 911.

In some examples, digital assistant 900 provides an audio output requesting clarification and/or disambiguation and a visual output requesting clarification and/or disambiguation simultaneously (e.g., with computer system 1000, 1100, and/or 1200). When digital assistant 900 provides the audio output requesting clarification and/or disambiguation and the visual output requesting clarification and/or disambiguation simultaneously, digital assistant 900 does not restrict how a user can respond and will detect (e.g., accept and/or receive) audio input and/or input on a display of the computer system in response. Thus, the user may choose to provide one of the predetermined options provided in the visual output or a more open-ended response in an audio input. When a predetermined option from a visual output is selected the entity is selected by plan resolution module 912, as discussed above. When an audio input is received from the user, the data corresponding to the audio input is provided to plan generation module 910 for updating prompt 911, as discussed above.

After plan resolution module 912 selects an entity and an application intent for performing the task, the entity and the application intent are provided to second digital assistant execution module 914. Second digital assistant execution module 914 then executes and/or attempts to execute the application intent using the entity. In some examples, second digital assistant execution module 914 executes the application intent using the entity by invoking a tool that is specified with the application intent and/or provided by plan resolution module 912. In some examples, second digital assistant execution module 914 executes the application intent by invoking a tool associated with first digital assistant execution module 908 and/or another component of digital assistant 900. Thus, second digital assistant execution module 914 utilizes the capabilities of other portions of digital assistant 900 to perform the tasks included in prompt 911.

In some examples, second digital assistant execution module 914 is unable to execute the application intent because a parameter is missing. When second digital assistant execution module 914 determines that a parameter is missing, digital assistant 900 provides an audio and/or visual output requesting the missing parameter (e.g., with computer system 1000, 1100, and/or 1200). Digital assistant 900 then utilizes received input indicating the missing parameter in a similar and/or the same manner as responses to visual and/or audio outputs described above. In particular, when an audio input is received, digital assistant 900 provides data corresponding to the audio input to plan generation module 910 so that prompt 911 can be modified with the data. Conversely, when an input on a display of the computer system is detected, digital assistant 900 uses the entity selected by the input to execute the application intent.

In some examples, query 902 includes a composite request and prompt 911 includes multiple tasks, possible application intents, and/or functions that need to be executed in series to satisfy the composite request. When prompt 911 includes this type of request, after second digital assistant execution module 914 executes a first application intent and determines a result for the first application intent, second digital assistant execution module 914 provides the result to plan generation module 910. Plan generation module 910 then edits prompt 911 and/or creates a second prompt using the result of the first application intent as an input for a second application intent. This process is repeated for the number of application intents required to perform composite request and determine a response to query 902. Thus, digital assistant 900 iteratively processes application intents to perform complex requests that require the outputs of tasks to be used as the inputs of other tasks.

In some examples, rather than prompt 911 including multiple tasks, possible application intents, and/or functions to be executed in series, prompt 911 includes a single task to be performed and then returns the result of the task to plan generation module 910. Plan generation module 910 then generates a new prompt 911 to perform any other tasks that may need to be executed after the result of the first task is determined. Thus, rather than plan generation module 910 considering each task that needs to be completed to provide a request to the user prior to execution of any task, plan generation module 910 can consider the first task that needs to be completed, receive a result of that task, and then determine which, if any, other tasks need to be completed to provide a result.

In some examples, plan generation module 910 includes a single task in prompt 911 and performs that task when the task is a search for a specific property or parameter. By processing the search task for a specific property or parameter individually before determining and/or executing other tasks, the system ensures that a result for the search request is determined and then determines next steps based on the parameter returned by the search. This allows the system to determine if further user input is required more quickly when the search provides no usable results, or determine the correct next step when a search result is returned.

After successfully executing the application intent using the entity, second digital assistant execution module 914 provides the result, the executed application intent, the entity, query 902, and prompt 911 to response generation component 916. Response generation component 916 then uses the result, the executed application intent, the entity, query 902, and/or prompt 911 to generate a response to query 902 which can be provided to the user. In some examples, the response to query 902 includes an audio output (e.g., automatically-generated audio content and or generative audio content). In some examples, the response to query 902 includes a visual output (e.g., automatically-generated text and/or visual content and or generative text and/or visual content). In some examples, the response to query 902 includes the application intent and/or the entity that was used to execute the application intent. In some examples, the response to query 902 mirrors and/or emulates query 902.

In some examples, response generation component 916 is invoked to generate and provide requests for clarification and/or disambiguation to the user by other components of digital assistant 900 (e.g., plan resolution module 912 and/or second digital assistant execution module 914).

In some examples, response generation component 916 includes an LLM trained to generate outputs based on data including the result, the executed application intent, the entity, query 902, and/or prompt 911. In some examples, the LLM of response generation component 916 is the same type of LLM included in plan generation module 910. In some examples, the LLM of response generation component 916 is stored and/or hosted on the computer system that stores and/or hosts digital assistant 900 (e.g., the computer system that receives query 902). In some examples, the LLM of response generation component 916 is stored and/or hosted on a different computer system from the computer system that stores and/or hosts digital assistant 900 (e.g., a server that is in communication with the computer system that stores and/or hosts digital assistant 900).

Figures 10B, 10C:
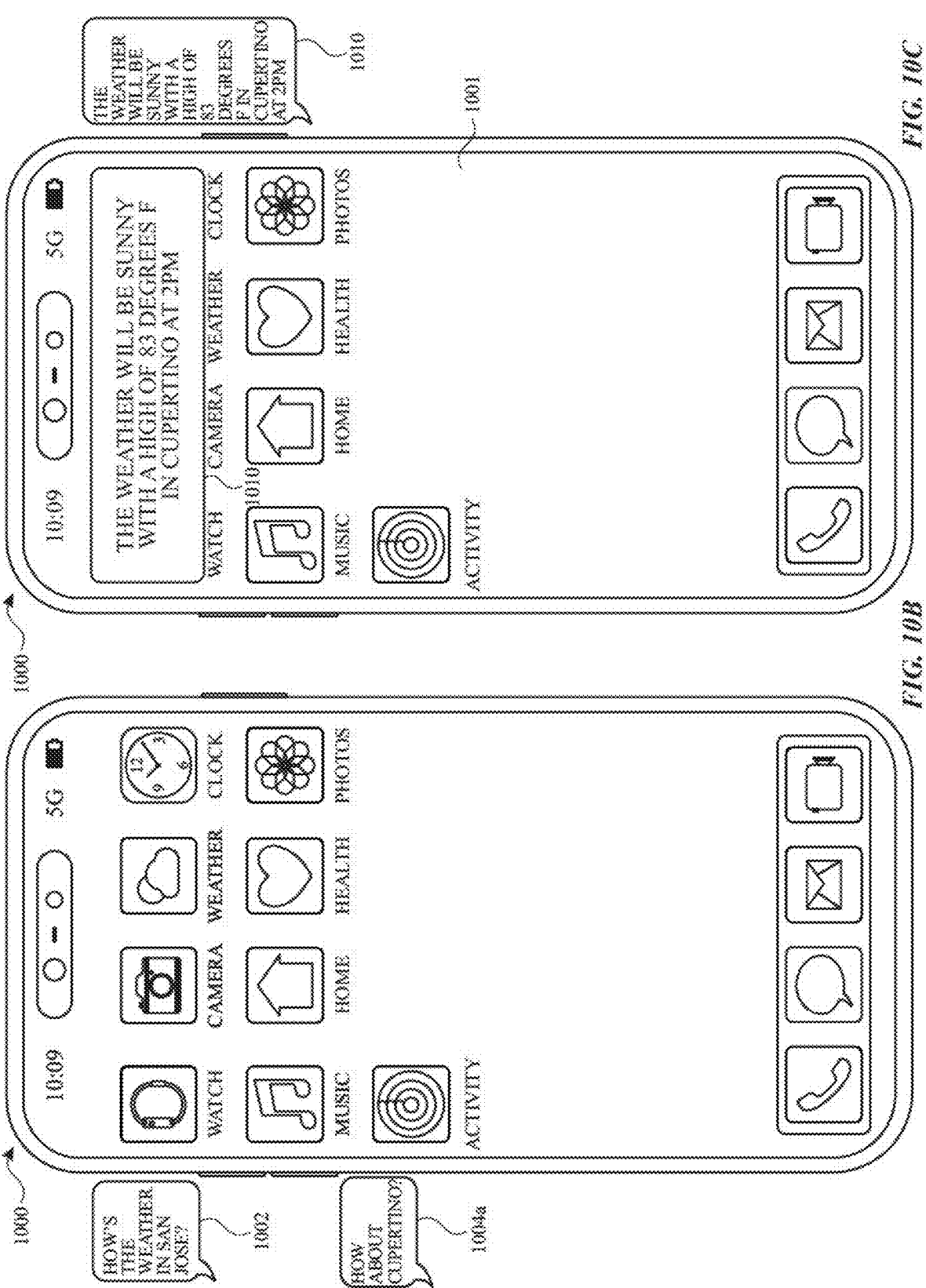

FIGS. 10A-10E illustrate example queries executed by digital assistant 900, according to various examples. The examples discussed below utilize the components of digital assistant 900 discussed above. At FIG. 10A, digital assistant 900 receives query 1002 of "How's the weather in San Jose?" Digital assistant 900 receives query 1002 after query 1002 is detected by computer system 1000 (e.g., smartphone, tablet, computer, and/or wearable device), as shown in FIG. 10B. In some examples, query 1002 is detected by one or more microphones of computer system 1000. As discussed above, computer system 1000 stores and/or hosts digital assistant 900 (in some examples at least a portion of digital assistant 900). Thus digital assistant 900 has access to query 1002 (or a representation of query 1002) once it is detected by computer system 1000.

Digital assistant 900 provides query 1002 to query decoration module 904. Query decoration module 904 utilizes context retrieval module 904a to determine that context data 1004 includes second input 1004a that was detected by computer system 1000 after query 1002 was received. In particular, second input 1004a includes the second query "how about Cupertino?" Context retrieval module 904a further determines that context data 1004 includes that user meeting 1004b scheduled in Cupertino at 2 PM on the same day. Query decoration module 904 also uses tool retrieval module 904b to determine that a possible tool that could be used to satisfy query 1002a is protocol 1006 for getting the current weather of "get weather." In some examples, tool retrieval module 904b determines that a weather application with the "get weather" protocol is registered and/or installed on computer system 1000.

Query decoration module 904 provides context data 1004 and protocol 1006 to query router 906. Query router 906 determines that based on the requested task of providing the weather and the available context data 1004 that first digital assistant execution module 908 is capable of performing the task and providing a response to query 1002. Query router 906 also determines that in order to provide a more accurate response to query 1002, the query should be rewritten to include context data 1004. Thus, query router 906 creates rewritten query 1008 of "How's the weather in Cupertino at 2 PM?" which encapsulates the original query 1002 and second input 1004a provided by the user as well as user meeting 1004b that the user has this afternoon.

Query router 906 then provides rewritten query 1008 to first digital assistant execution module 908. First digital assistant execution module 908 calls the appropriate application (e.g., a weather application installed on computer system 1000) using the "get weather" protocol and the entities (e.g., parameters) "Cupertino" and "2 PM." The application and/or the application intent then returns the result that the forecast in Cupertino at 2 PM is sunny with a high of 83 degrees. First digital assistant execution module 908 and/or a response generation component then creates result 1010 of "The weather will be sunny with a high of 83 degrees F. in Cupertino at 2 PM." Result 1010 is then provided as an audio output and/or visual output (e.g., including automatically-generated visual, text, and/or audio content, and/or generative visual, text, and/or audio content) on display 1001 of computer system 1000 to the user, as shown in FIG. 10C.

In some examples, response generation module 916 is provided the result of first digital assistant execution module 908 to determine the output to provide to the user. Thus, an LLM of response generation module 916 can utilize query 1002, contextual data 1004, and tools 1006 to determine result 1010 which includes details of the query and the related contextual data to provide the user with a more complete response. This allows digital assistant 900 to provide the user with the details of the location Cupertino and 2 PM (e.g., based on additional input 1004a and user meeting 1004b) that were not included in query 1002, creating a more natural and meaningful interaction.

FIGS. 10C-10D illustrate example query rewriting executed by digital assistant 900, according to various examples. At FIG. 10D, digital assistant 900 receives query 1012, "How's um . . . [pause] what's it gonna be over there in ah over in Cupertino?," and provides query 1012 to query decoration module 904, for example, as described with respect to query 1002. For example, query decoration module 904 determines context 1014 and tools for query 1012, including previously-received query 1014A, "How's the weather in San Jose," user meeting 1014B scheduled in Cupertino at 2 PM on the same day, and protocol 1016 for getting the weather.

In addition to determining that query 1012 should be rewritten to include context data 1014, query router 906 determines that query 1012 includes disfluencies that could be improved by rewriting, such as the overlapping introductions "How's um" and "What's it gonna be," filler such as "over there" and "ah," redundancies such as the repetition of "over there in" and "over in," the informality of "gonna," and/or the pauses or hesitations (e.g., which may cause "How's um . . . " to initially register as a separate input or query from the remainder). Thus, query router 906 creates rewritten query 1018 of "How's the weather in Cupertino at 2 PM?," which encapsulates the original intent of query 1012 in view of context 1014 while improving the linguistic fluency before providing query 1012 and/or rewritten query 1018 to first digital assistant execution module 908 and plan generation module 910.

At FIG. 10E, digital assistant 900 receives query 1020, "How's the weather in Cupertino, oh and the commute?" and provides query 1020 to query decoration module 904 (e.g., as described above). For example, query decoration module 904 determines context 1022 and tools for query 1020, including user meeting 1014A scheduled in Cupertino at 2 PM on the same day, current location 1014B, protocol 1024A for getting the weather, and protocol 1024B for getting directions (e.g., routing a path) to the meeting. In addition to determining that query 1020 should be rewritten to include context data 1022 and/or determining that query 1020 includes disfluencies that could be improved by rewriting, query router 906 determines that query 1020 is a compound query that could be decomposed, for instance, based on the conjunction "and," the hesitation marker "oh," and/or the different domains of "How's the weather" and "the commute." Thus, query router 906 creates rewritten query 1026A, "How's the weather in Cupertino at 2 PM?," and rewritten query 1026B, "What's the expected commute time to arrive in Cupertino by 2 PM?" For example, if first digital assistant execution module 908 is capable of providing weather information, rewritten query 1026A is provided to first digital assistant execution module 908, and if first digital assistant execution module 908 is not capable of getting directions, rewritten query 1026B is provided to plan generation module 910.

Figures 11B, 11C:
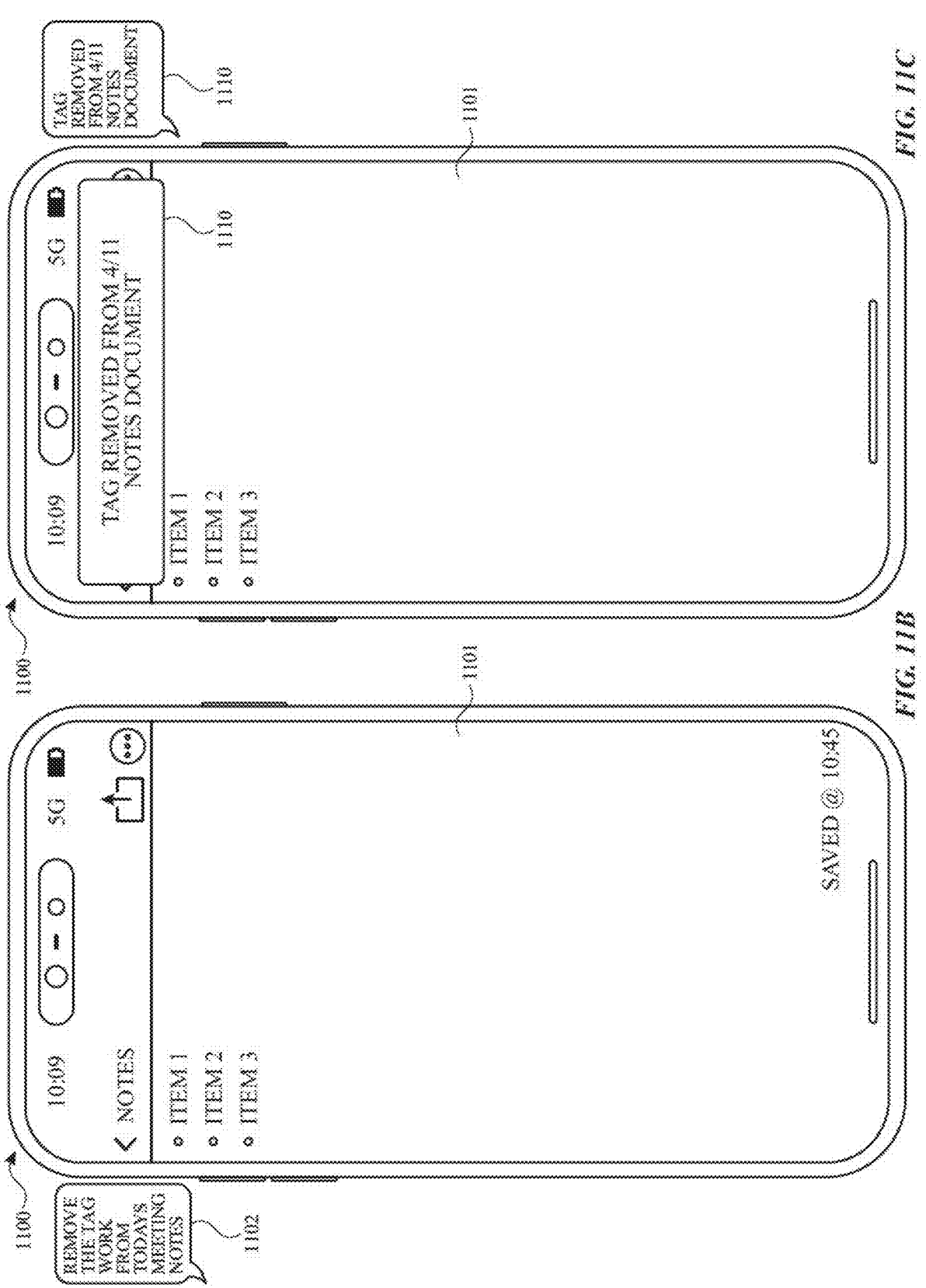

FIGS. 11A-11C illustrate example queries executed by digital assistant 900, according to various examples. The examples discussed below utilize the components of digital assistant 900 discussed above. At FIG. 11A, digital assistant 900 receives query 1102 of "remove the tag work from todays meeting notes." Digital assistant 900 receives query 1102 after query 1102 is detected by computer system 1100 (e.g., smartphone, tablet, computer, and/or wearable device), as shown in FIG. 11B. In some examples, query 1102 is detected by one or more microphones of computer system 1100. As discussed above, computer system 1100 stores and/or hosts digital assistant 900 (in some examples at least a portion of digital assistant 900). Thus digital assistant 900 has access to query 1102 (or a representation of query 1102) once it is detected by computer system 1100.

Digital assistant 900 provides query 1102 to query decoration module 904. Query decoration module 904 utilizes context retrieval module 904a to determine that context data 1104 includes that the user has an event calendar for a meeting at 10 AM, the notes application is currently being displayed on display 1101 of computer system 1100, and that the document displayed by the notes application was saved at 10:45 AM. Query decoration module 904 also uses tool retrieval module 904b to determine that possible tools that could be used to satisfy query 1102 include tools 1106 of "get_document," "get_calendar_event," "get email," and "remove_tag."

Query decoration module 904 provides query 1102, context data 1104, and tools 1106 to query router 906. Query router 906 determines that based on the requested task and the available context data 1104 that first digital assistant execution module 908 is not capable of performing the task and providing a response to query 1102. In particular, query router 906 determines that there are several possible tools that could be used, some of which are not compatible with first digital assistant execution module 908 and that context 1104 does not provide clear parameters to be used in a possible application intent. Accordingly, query router 906 provides query 1102, context data 1104, and tools 1106 to plan generation module 910.

Plan generation module 910 uses query 1102, context data 1104, and tools 1106 to create plan 1112. In particular, the LLM of plan generation module 910 creates plan 1112 to include prompts with tools 1106 that utilize parameters determined from query 1102 and/or context data 1104. Thus, plan 1112 includes possible application intents of "get_document" using the parameter "todays.meeting.notes" and "remove_tag" using the parameter "work." Digital assistant 900 then provides plan 1112 to plan resolution module 912.

Plan resolution module 912 resolves plan 1112 by comparing the application intents and entities (e.g., parameters) included in plan 1112 to applications and entities available to computer system 1100. For example, plan resolution module 912 compares the application intent of "get_document" to a file manager of computer system 1100 and/or a notes application of computer system 1100 to determine that either and/or both are able to execute the application intent. Then, plan resolution module 912 selects the notes application because digital assistant 900 determines that the notes application is currently displayed on display 1101 of computer system 1100. Similarly, plan resolution module 912 compares the application intent of "remove_tag" to the capabilities of the notes application and determines that the notes application of computer system 1100 can perform the task.

Plan resolution module 912 then makes similar comparisons for the parameters of the application intents. In particular, plan resolution module 912 (and/or digital assistant 900) determines that the document "4/11 meeting notes" is being displayed by display 1101 of computer system 1100 and was saved recently (e.g., today). Further, plan resolution module 912 (and/or digital assistant 900) determines that the displayed document currently has a tag matching the tag included in query 1102 (e.g., work). Thus, plan resolution module 912 uses the 4/11 meeting notes document that is being displayed as the entity for the parameter of the application intents.

Digital assistant 900 then provides the filled and resolved application intents with the parameters to second digital assistant execution module 914 which calls the notes application to execute the application intent and receives the result of that execution. In particular, second digital assistant execution module 914 receives an indication that the 4/11 notes document no longer has the work tag. Digital assistant 900 then provides query 1102, context data 1104, tools 1106, plan 1112, and the results of the executed application intent to response generation module 916.

Response generation module 916 then determines the output to provide to the user. In particular, an LLM included in response generation module 916 utilizes query 1102, context data 1104, tools 1106, plan 1112, and the results of the executed application intent to determine result 1110 which includes details of the query and the related contextual data to provide the user with a more complete response. This allows digital assistant 900 to provide the user with the details of the document that was changed (e.g., the title of 4/11 meeting notes), creating a more natural and meaningful interaction. Result 1110 is then provided as an audio output and/or visual output (e.g., including automatically-generated visual, text, and/or audio content, and/or generative visual, text, and/or audio content) on display 1101 of computer system 1100 to the user, as shown in FIG. 11C.

Figures 12B, 12C:
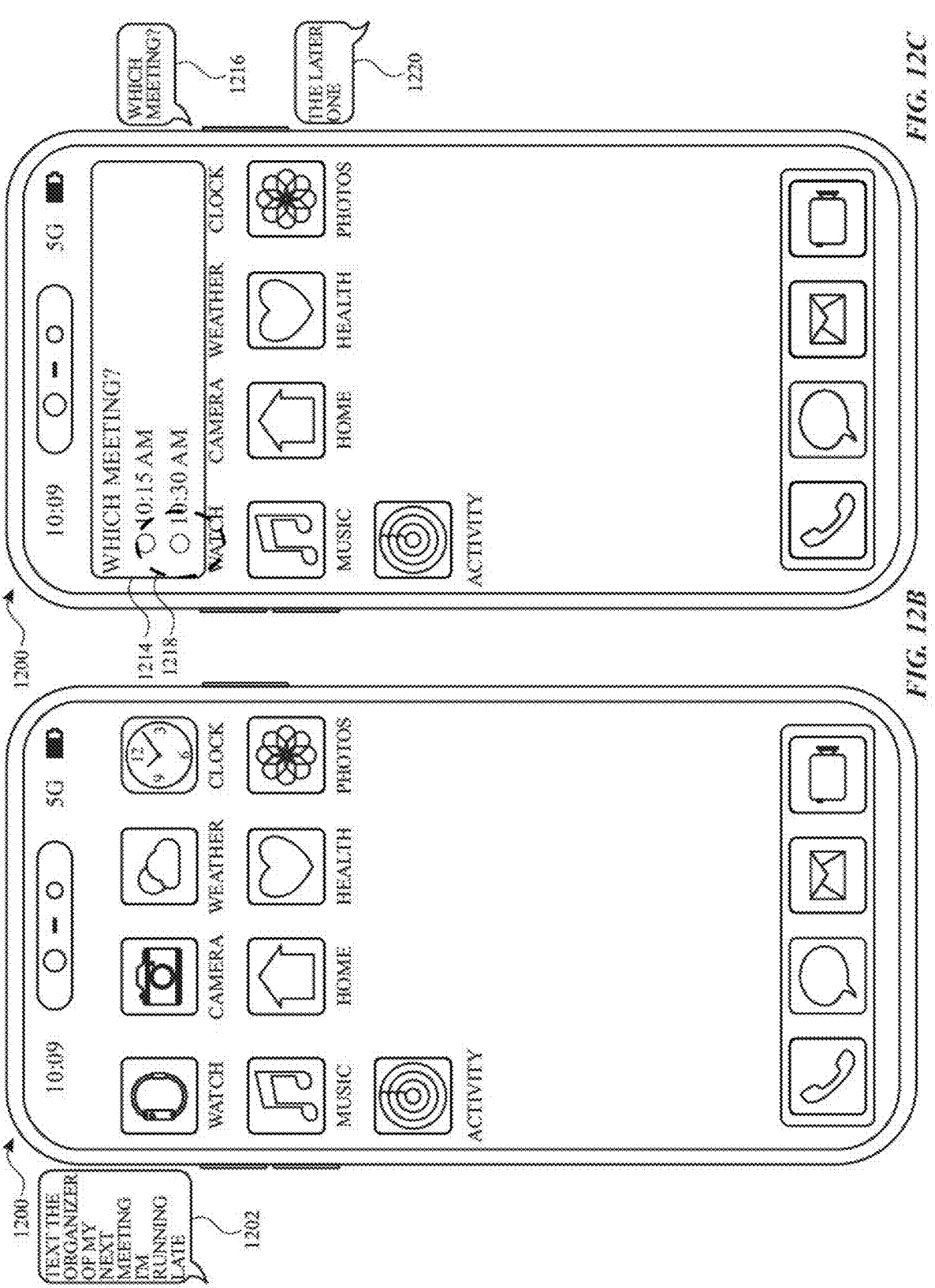

FIGS. 12A-12C illustrate example queries executed by digital assistant 900, according to various examples. The examples discussed below utilize the components of digital assistant 900 discussed above. At FIG. 12A digital assistant 900 receives query 1202 of "text the organizer of my next meeting I'm running late." Digital assistant 900 receives query 1202 after query 1202 is detected by computer system 1200 (e.g., smartphone, tablet, computer, and/or wearable device), as shown in FIG. 12B. In some examples, query 1202 is detected by one or more microphones of computer system 1200. As discussed above, computer system 1200 stores and/or hosts digital assistant 900 (in some examples at least a portion of digital assistant 900). Thus digital assistant 900 has access to query 1202 (or a representation of query 1202) once it is detected by computer system 1200.

Digital assistant 900 provides query 1202 to query decoration module 904. Query decoration module 904 utilizes context retrieval module 904a to determine that context data 1204 includes that the user has two upcoming calendar events, one that is scheduled by the user with no other attendees at 10:15 AM and another that is scheduled by John with three other attendees at 10:30 AM. Query decoration module 904 also uses tool retrieval module 904b to determine that possible tools that could be used to satisfy query 1202 include tools 1206 of "get_calendar_event," "get_meeting_organzier," and "send_message."

Query decoration module 904 provides query 1202, context data 1204, and tools 1206 to query router 906. Query router 906 determines that based on the requested task and the available context data 1204 that first digital assistant execution module 908 is not capable of performing the task and providing a response to query 1202. In particular, query router 906 determines that there are several possible tools that could be used, some of which are not compatible with first digital assistant execution module 908 and that context 1204 does not provide clear parameters to be used in a possible application intent. Accordingly, query router 906 provides query 1202, context data 1204, and tools 1206 to plan generation module 910.

Plan generation module 910 uses query 1202, context data 1204, and tools 1206 to create plan 1212a. In particular, the LLM of plan generation module 910 recognizes that to determine an appropriate response to query 1202 multiple tasks will need to be performed and thus creates plan 1212a to include prompts for retrieving the correct event which can then be provided to plan generation module 910 to create second plan 1212b. Thus, plan 1212a includes possible application intents of "get_calendar_event" using the parameter "event" and "get_meeting_org" using the parameter "calendar_event," which is the return of the "get_calendar_event" application intent, as well as an indication to provide the results to plan generation for the next plan and/or task. Digital assistant 900 then provides plan 1212a to plan resolution module 912.

Plan resolution module 912 resolves plan 1212a by comparing the application intents and entities (e.g., parameters) included in plan 1212a to applications and entities available to computer system 1200. For example, plan resolution module 912 compares the application intent of "get_calendar_event" to a calendar application of computer system 1200 and determines that the calendar application has a protocol to execute the application intent. Similarly, plan resolution module 912 compares the application intent of "get_meeting_org" to the capabilities of the same calendar application and determines that the application can perform the task.

Plan resolution module 912 then makes similar comparisons for the parameters of the application intents. In particular, plan resolution module 912 (and/or digital assistant 900) examines the two calendar events included in plan 1212*a* from context 1204 to determine which calendar even the user intended with query 1202. In particular, plan resolution module 912 determines that the user is the organizer of the first event and thus, even though the first event is the user's next meeting the user is unlikely to intend to send a text message to themselves about running late. Accordingly, plan resolution module 912 determines that it is more likely that the user intends for digital assistant 900 to determine who the organizer of the second meeting (e.g., the meeting at 10:30 AM) is and let that organizer know that the user is running late. Plan resolution module 912 therefore selects the second meeting as the entity and/or parameter for the "get_calendar_event" application intent.

In some examples, plan resolution module 912 is unable to determine which event the user intends to reference and provides the information to response generation module 916, which creates a prompt requesting clarification and/or disambiguation from the user. Computer system 1200 then provides the prompt as visual output 1214 and audio output 1216, as shown in FIG. 12C. Computer system 1200 will then detect a response from the user and provide the response to digital assistant 900. When computer system 1200 detects touch response 1218 (e.g., a tap and/or press) on the choice for the 10:30 AM meeting, digital assistant 900 provides the parameter of the 10:30 AM meeting to plan resolution module 912 which passes this parameter and the other information to second digital assistant execution module 914. When computer system 1200 detects audio input response 1220, digital assistant 900 provides the response of "the later one" to plan generation module 910, which edits plan 1212*a* to include this information. Plan resolution module 912 then determines based on this input that the second meeting should be used as the parameter and passes the information to second digital assistant execution module 914.

Second digital assistant execution module 914 then calls the calendar application to execute the application intent and receives the result of that execution. In particular, second digital assistant execution module 914 receives an indication that the organizer of the second meeting is John B. Digital assistant 900 then provides this result back to plan generation module 910 which creates second plan 1212*b* in a similar manner to plan 1212*a* as discussed above. Thus, digital assistant 900 iteratively processes tasks of the plan with plan generation module 910.

Digital assistant 900 provides second plan 1212*a* to plan resolution module 916 which determines that the "send_message" application intent should be used to send a text message based on query 1202. Plan resolution module 916 further determines that the text messaging domain and/or application is associated with first digital assistant execution module 908 and provides this information to second digital assistant execution module 914 along with the parameter John B.

Second digital assistant execution module 914 receives this information and invokes first digital assistant execution module 908 to perform the "send_message" application intent with the text messaging capabilities to send a text message to John B. Thus, second digital assistant execution module 914 invokes tools of other digital assistant components (e.g., shim tools) to perform the tasks. Second digital assistant execution module 914 then receives result 1210 that the text message "Hey John, I'm running late for our 10:30" has been sent to a contact John B.

In some examples, when plan resolution module 912 determines that there is no matching tool available to plan resolution module 912, plan resolution module 912 can provide the user request to second digital assistant execution module 914 and/or invoke a tool of other digital assistant components (e.g., a shim tool) in an attempt to provide an answer to the user request. Second digital assistant execution module 914 can then proceed as described above and below to determine a response to the user input when a tool of a different digital assistant component is available to provide a response to the user.

In some examples, second digital assistant execution module 914 processes the user input and/or calls applications and/or tools in parallel to plan resolution module 912 in order to increase the efficiency of processing user requests. In this way, when tools and/or application intents are not available to plan resolution module 912, the processing of the user request is handed off to second digital assistant execution module 914 in an efficient manner to provide a useful and quick response to the user.

Figure 12D:
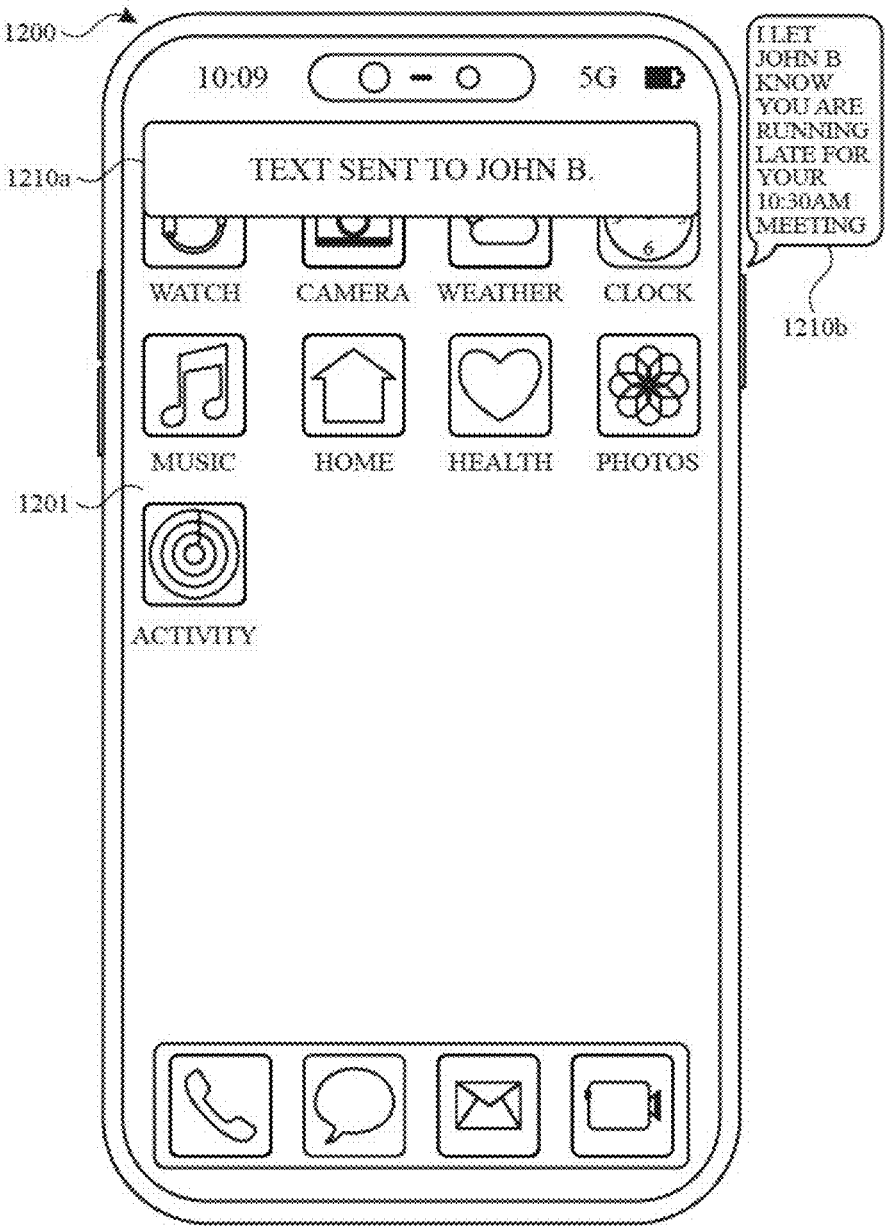

Digital assistant 900 then provides query 1202, context data 1204, tools 1206, plans 1212*a* and 1212*b*, and the results of the executed application intent to response generation module 916. Response generation module 916 then determines the output to provide to the user. In particular, an LLM of response generation module 916 utilizes query 1202, context data 1204, tools 1206, plans 1212*a* and 1212*b*, and the results of the executed application intent to determine result 1210*b* which includes details of the query and the related contextual data (e.g., including automatically-generated visual, text, and/or audio content, and/or generative visual, text, and/or audio content) to provide the user with a more complete response. Result 1210*b* is then provided as an audio output while visual output 1210*a* with a simpler message is provided on display 1201 of computer system 1200 to the user, as shown in FIG. 12D.

FIG. 13 illustrates block diagram of process 1300 for query execution by the digital assistant, according to various examples. Process 1300 is performed, for example, using one or more electronic devices implementing a digital assistant. In some examples, process 1300 is performed using a client-server system (e.g., system 100), and the blocks of process 1300 are divided up in any manner between the server (e.g., DA server 106) and a client device. In other examples, the blocks of process 1300 are divided up between the server and multiple client devices (e.g., a mobile phone and a smart watch). Thus, while portions of process 1300 are described herein as being performed by particular devices of a client-server system, it will be appreciated that process 1300 is not so limited. In other examples, process 1300 is performed using only a client device (e.g., user device 104) or only multiple client devices. In process 1300, some blocks are, optionally, combined, the order of some blocks is, optionally, changed, and some blocks are, optionally, omitted. In some examples, additional steps may be performed in combination with the process 1300.

Process 1300 is performed, for example, using one or more computer systems (e.g., 100, 300, 500, 1000, 1100, and/or 1200) (e.g., a smartphone, a desktop computer, a laptop, a tablet, and/or a wearable electronic device) that is in communication with a display generation component (e.g., a display controller and/or a touch-sensitive display system) and an input device (e.g., a button, a motion detector (e.g., an accelerometer and/or gyroscope), a location sensor (e.g., GPS, Wi-Fi, and/or a radio that indicates a location of the computer system), a microphone, and/or a touch sensitive surface).

The computer system (e.g., 1000, 1100, and/or 1200) detects (1302) an audio input including a query (e.g., query 902, 1002, 1102, and/or 1202). In response to detecting the audio input including the query (1304): the computer system retrieves (1306) contextual data (e.g., 1004, 1104, and/or 1204) related to the query (e.g., on-screen context, historical interactions between user and digital assistant, personal knowledge graph, conversational context, discourse, and/or environmental context such as device location and/or connected devices) (in some examples, contextual data is retrieved by a third digital assistant component (e.g., query decoration component)); in accordance with a determination that the query includes a request of a first type (1308) (e.g., a request that is capable of being executed by a first digital assistant component, a request that is less complex, and/or a request that does not require extensive contextual information): the computer system converts (1310) the query to a rewritten query (e.g., 1008) based on the contextual data related to the query (e.g., rewriting the query to include a correction and/or clarification by the user); and provides (1312) the rewritten query to a first digital assistant component (e.g., 908) (e.g., the portion of the digital assistant that performs tasks associated with a first digital assistant component, a portion of the digital assistant that is capable of performing less complex tasks, and/or a portion of the digital assistant that does not include an LLM/planner); and in accordance with a determination that the query includes a request of a second type different from the request of the first type (e.g., a more complex request, a request that requires extensive knowledge of the contextual information, and/or a request that is to be performed by the LLM/planner), the computer system provides (1314) the query and the contextual data related to the query to a second digital assistant component (e.g., 910) different from the first digital assistant component (e.g., wherein the second digital assistant component includes a LLM). In some examples, the computer system provides a rewritten query to the second digital assistant component (e.g., 910).

In some examples, the contextual data (e.g., 1004, 1104, and/or 1204) related to the query (e.g., query 902, 1002, 1102, and/or 1202) includes a set of possible entities (e.g., locations, applications, contacts, people, places, things, and/or targets for a task) available to the computer system (e.g., 1000, 1100, and/or 1200) (e.g., stored on the computer system or available for the computer system to access over a network such as the internet and/or a local area network) that match (e.g., are the same or substantially similar as) the query (and/or a portion of the query).

In some examples, the set of possible entities includes an entity being displayed via a display generation component of the computer system (e.g., 1000, 1100, and/or 1200). In some examples, the entity being displayed via the generation component of the computer system includes an application being displayed via the generation component of the computer system. In some examples, the entity being displayed via the generation component of the computer system includes a contact being displayed via the generation component of the computer system. In some examples, the entity being displayed via the generation component of the computer system includes a location being displayed via the generation component of the computer system. In some examples, the entity being displayed via the generation component of the computer system includes an entity being displayed within an application.

In some examples, the contextual data (e.g., 1004, 1104, and/or 1204) includes an application intent related to the query. In some examples, the application intent related to the query (e.g., query 902, 1002, 1102, and/or 1202) is determined from the query. In some examples, the application intent related to the query includes possible actions and/or processes that can be called by the computer system to perform a task of the query.

In some examples, the computer system (e.g., 1000, 1100, and/or 1200) determines a semantic comparison between the query (e.g., query 902, 1002, 1102, and/or 1202) and a set of possible application intents; and selects the application intent related to the query from the set of possible application intents. In some examples, the semantic comparison between the query and the set of possible application intents includes a score indicating the semantic similarity between the query and each of the possible application intents. In some examples, the semantic comparison is performed by a digital assistant component for determining context related to received queries. In some examples, the digital assistant component is a different digital assistant component from the first digital assistant component and the second digital assistant component. In some examples, the application intent is selected based on a score that indicates the semantic similarity between the query and each of the possible application intents of the set of possible application intents.

In some examples, determining the semantic comparison between the query (e.g., query 902, 1002, 1102, and/or 1202) and the set of possible application intents includes: comparing the query to a set of descriptions corresponding to the set of possible application intents; and comparing the query (e.g., query 902, 1002, 1102, and/or 1202) to a set of examples corresponding to the set of possible application intents. In some examples, comparing the query to the set of descriptions corresponding to the set of possible application intents includes calculating the distance between a vector representing the query and a vector representing the set of descriptions corresponding to the set of possible application intents. In some examples, comparing the query to the set of descriptions corresponding to the set of possible application intents is performed by a first machine learning model. In some examples, the first machine learning model is hosted and/or stored on the computer system. In some examples, comparing the query to a set of examples corresponding to the set of possible application intents includes calculating the distance between a vector representing the query and a vector representing the set of examples corresponding to the set of possible application intents. In some examples, comparing the query to set of examples corresponding to the set of possible application intents is performed by a second machine learning model. In some examples, the second machine learning model is hosted and/or stored on the computer system. In some examples, the first machine learning model and the second machine learning model are the same machine learning model.

In some examples, the computer system (e.g., 1000, 1100, and/or 1200) selects the application intent from a list of application intents associated with an application included in the query (e.g., query 902, 1002, 1102, and/or 1202). In some examples, the list of application intents includes actions and/or processes that can be called by a digital assistant and/or the computer system to complete a task of the query. In some examples, the list of application intents is determined by querying and/or requesting information (e.g., data) from the application included in the query.

In some examples, the computer system (e.g., 1000, 1100, and/or 1200) selects the application intent from a list of application intents associated with an application displayed via a display generation component of the computer system. In some examples, the list of application intents includes actions and/or processes that can be called by a digital assistant and/or the computer system to complete a task of the query. In some examples, the list of application intents is determined by querying and/or requesting information (e.g., data) from the application displayed via the display generation component of the computer system.

In some examples, the contextual data (e.g., 1004, 1104, and/or 1204) includes conversational history (e.g., queries received prior to the query and/or queries received after the query) between a user and a digital assistant (e.g., digital assistant 900). In some examples, the conversational history includes interactions between the user and the digital assistant from a current digital assistant session. In some examples, the conversational history includes interactions between the user and the digital assistant from a previous digital assistant session. In some examples, the conversational history includes interactions between the user and the digital assistant within a predetermined time (e.g., within the last hour, the last day, the last week, the last year, and/or since the user began using the computer system and/or an affiliated computer system).

In some examples, determining that the query (e.g., query 902, 1002, 1102, and/or 1202) includes the request of the first type further comprises: determining whether a domain of the query corresponds to a domain associated with the request of the first type. In some examples, the domain associated with the request of the first type is one of a plurality of domains associated with the request of the first type. In some examples, the plurality of domains associated with the request of the first type include domains for tasks that a first digital assistant component is capable of performing. In some examples, the plurality of domains associated with the request of the first type include domains for requests that a first digital assistant component is capable of parsing to determine a task to perform to satisfy the request. In some examples, determining whether the query includes the request of the first type of the second types is performed by a component of the digital assistant that is hosted and/or stored locally on the computer system. In some examples, determining whether the query includes the request of the first type of the second types is performed by a component of the digital assistant that includes a machine learning model that is stored locally on the computer system.

In some examples, determining that the query (e.g., query 902, 1002, 1102, and/or 1202) includes the request of the first type further comprises: determining a type of contextual data (e.g., 1004, 1104, and/or 1204) required to respond to the query; and determining whether the type of contextual data required to respond to the query is a type of contextual data for the first digital assistant component (e.g., that the first digital assistant component is capable of processing). In some examples, the type of contextual data for the first digital assistant component includes a limited amount of types of contextual data. In some examples, in accordance with a determination that the type of contextual data required to respond to the query is the type of contextual data for the first digital assistant component, the computer system determines that the query includes the request of the first type. In some examples, in accordance with a determination that the type of contextual data required to respond to the query is not the type of contextual data for the first digital assistant component, the computer system determines that the query includes the request of the second type. In some examples, the computer system determines an amount of contextual data required to respond to the query and determines whether the amount of contextual data required to respond to the query exceeds a threshold associated with the first digital assistant component. In some examples, in accordance with a determination that the amount of contextual data required to respond to the query exceeds the threshold associated with the first digital assistant component, the computer system determines that the query does not include the request of the first type. In some examples, in accordance with the determination that the amount of contextual data required to respond to the query exceeds the threshold associated with the first digital assistant component, the computer system determines that the query includes the request of the second type. In some examples, in accordance with a determination that the first type of contextual data resolves an ambiguity of the query without further processing, the computer system determines that the query includes the request of the first type. In some examples, in accordance with a determination that the first type of contextual data does not resolve an ambiguity of the query without further processing (e.g., the contextual data may resolve the ambiguity but further searching and processing of the contextual data in comparison to the query is required), the computer system determines that the query includes the request of the second type.

In some examples, determining that the query (e.g., query 902, 1002, 1102, and/or 1202) includes the request of the first type further comprises: determining a task specified in the query; and in accordance with a determination that the task specified in the query is a task associated with the first digital assistant component, determining that the query includes the request of the first type. In some examples, in accordance with a determination that the task specified in the query is a task associated with the second digital assistant component, the digital assistant determines that the query includes the request of the second type. In some examples, the task specified in the query is determined based on a semantic analysis of the query. In some examples, a predetermined set of tasks are associated with the first digital assistant component based on the capabilities of the first digital assistant component, some examples, a predetermined set of tasks are associated with the second digital assistant component based on the capabilities of the second digital assistant component. In some examples, the set of tasks associated with the first digital assistant component are different from the set of tasks associated with the second digital assistant component. In some examples, the set of tasks associated with the first digital assistant component overlap in part with the set of tasks associated with the second digital assistant component. In some examples, a portion of the set of tasks associated with the first digital assistant component is the same as a portion of the set of tasks associated with the second digital assistant component.

In some examples, determining that the query (e.g., query 902, 1002, 1102, and/or 1202) includes the request of the first type further comprises: in accordance with a determination that the query specifies the first digital assistant component (e.g., 908), determining that the query includes the request of the first type. In some examples, in accordance with a determination that the query specifies the second digital assistant component, the computer system determines that the query includes the request of the second type.

In some examples, converting the query (e.g., query 902, 1002, 1102, and/or 1202) to the rewritten query (e.g., 1008, 1018, 1026A, and/or 1026B) based on the contextual data (e.g., 1004, 1104, and/or 1204) related to the query (e.g., rewriting the query to include a correction and/or clarification by the user) further comprises: adding information from a subsequently received query (e.g., 1004*a*) to the query to create the rewritten query. In some examples, the information from the subsequently received query resolves an ambiguity of the query. In some examples, the information from the subsequently received query includes an entity, application, and/or application intent for performing a task of the query. In some examples, adding information from the subsequently received query includes replacing information of the query with the information from the subsequently received query. In some examples, a portion of the information from the subsequently received query is ignored and/or not added to create the rewritten query. In some examples, converting the query to the rewritten query based on the contextual data related to the query is performed by a component of the digital assistant that is hosted and/or stored locally on the computer system. In some examples, converting the query to the rewritten query based on the contextual data related to the query is performed by a component of the digital assistant that includes a machine learning model that is stored locally on the computer system. In some examples, converting the query to the rewritten query includes improving query fluency and/or reorganizing the query, e.g., as described with respect to FIGS. 10D-10E.

In some examples, after providing the rewritten query (e.g., 1008, 1018, 1026A, and/or 1026B) to the first digital assistant component (e.g., 908): the computer system (e.g., 1000, 1100, and/or 1200) causes the first digital assistant component to perform a task determined from the rewritten query; and provides an output (e.g., 1010, 1110, and/or 1210) of the task. In some examples, providing the rewritten query to the first digital assistant component includes providing the rewritten query to a portion of a digital assistant that is hosted and/or stored locally at the computer system. In some examples, causing the first digital assistant component to perform the task determined from the rewritten query includes performing the task with the computer system.

In some examples, after providing the query (e.g., query 902, 1002, 1102, and/or 1202; in some examples, the rewritten query 1008, 1018, 1026A, and/or 1026B) and the contextual data (e.g., 1004, 1104, and/or 1204) related to the query to the second digital assistant component (e.g., 910) different from the first digital assistant component: the computer system (e.g., 1000, 1100, and/or 1200) causes the second digital assistant component to perform a task determined from the query; and provides an output of the task. In some examples, providing the query and the contextual data to the second digital assistant component includes providing query and the contextual data to a portion of a digital assistant that is hosted and/or stored remotely to the computer system. In some examples, the portion of the digital assistant is stored on a server that the computer system connects to and/or contacts through a network such as the internet, a local area network, and/or another network. In some examples, the second digital assistant component is partially stored on the computer system and partially stored on a server connected to the computer system. In some examples, the second digital assistant is stored entirely on the computer system. In some examples, causing the second digital assistant component to perform the task determined from the query includes performing the task with the computer system.

In some examples, in response to detecting the audio input including the query (e.g., 902, 1002, 1102, and/or 1202) and after retrieving contextual data (e.g., 1004, 1104, and/or 1204) related to the query (e.g., on-screen context, historical interactions between user and digital assistant, personal knowledge graph, conversational context, discourse, and/or environmental context such as device location and/or connected devices) (In some examples, contextual data is retrieved by a third digital assistant component (e.g., query decoration component)): the computer system (e.g., 1000, 1100, and/or 1200) separates the query into a first query and a second query (e.g., a conjunction). In some examples, the first query and the second query each include a task to be performed. In some examples, an output of the first query is an input to the second query. In some examples, the first query is provided to the first digital assistant component and the second query is provided to the second digital assistant component. In some examples, the second query is provided to the first digital assistant component and the first query is provided to the second digital assistant component. In some examples, the first query and the second query are processed in parallel. In some examples, the first query and the second query are processed in sequence.

In some examples, the first query is determined based on a first domain associated with a first request of the query and the second query is determined based on a second domain associated with a second request of the query. In some examples, the first query is determined based on a first set of contextual data required to respond to the first request. In some examples, the second query is determined based on a second set of contextual data required to respond to the second request.

In some examples, after separating the query (e.g., query 902, 1002, 1102, and/or 1202) into the first query and the second query: in accordance with a determination that the first query includes the request of the first type (e.g., a request that is capable of being executed by a first digital assistant component, a request that is less complex, and/or a request that does not require extensive contextual information): the computer system (e.g., 1000, 1100, and/or 1200) converts the first query to the rewritten query (e.g., 1008, 1018, and/or 1026A) based on the contextual data (e.g., 1004, 1104, and/or 1204) related to the query (e.g., rewriting the query to include a correction and/or clarification by the user); and provides the rewritten query to the first digital assistant component (e.g., the portion of the digital assistant that performs tasks associated with the first digital assistant component, a portion of the digital assistant that is capable of performing less complex tasks, and/or a portion of the digital assistant that does not include an LLM/planner); and in accordance with a determination that the the first query includes the request of the second type different from the request of the first type (e.g., a more complex request, a request that requires extensive knowledge of the contextual information, and/or a request that is to be performed by the LLM/planner), the computer system provides the first query and the contextual data related to the query to the second digital assistant component different from the first digital assistant component (e.g., wherein the second digital assistant component includes a LLM).

In some examples, in accordance with a determination that the second query includes the request of the first type (e.g., a request that is capable of being executed by a first digital assistant component, a request that is less complex, and/or a request that does not require extensive contextual information): the computer system (e.g., 1000, 1100, and/or 1200) converts the second query to the rewritten query (e.g., 1008, 1018, and/or 1026B) based on the contextual data (e.g., 1004, 1104, and/or 1204) related to the query (e.g., rewriting the query to include a correction and/or clarification by the user); and provides the rewritten query to the first digital assistant component (e.g., the portion of the digital assistant that performs tasks associated with Siri X, a portion of the digital assistant that is capable of performing less complex tasks, and/or a portion of the digital assistant that does not include an LLM/planner); and in accordance with a determination that the the second query includes the request of the second type different from the request of the first type (e.g., a more complex request, a request that requires extensive knowledge of the contextual information, and/or a request that is to be performed by the LLM/planner), the computer system provides the second query and the contextual data related to the query to the second digital assistant component different from the first digital assistant component (e.g., wherein the second digital assistant component includes a LLM).

In some examples, after separating the query (e.g., query 902, 1002, 1102, and/or 1202) into the first query and the second query: the computer system (e.g., 1000, 1100, and/or 1200) provides the first query to the first digital assistant component (e.g., 908) (e.g., the portion of the digital assistant that performs tasks associated with the first digital assistant component, a portion of the digital assistant that is capable of performing less complex tasks, and/or a portion of the digital assistant that does not include an LLM/planner); and provides the second query to the second digital assistant component different from the first digital assistant component. In some examples, the first query and the second query are processed in parallel. In some examples, the first query and the second query are processed in sequence. In some examples, an output of performing a task with the first query is provided with the second query to the second digital assistant component. In some examples, providing the first query to the first digital assistant component includes providing first query to a portion of a digital assistant that is hosted and/or stored locally at the computer system. In some examples, providing the second query to the second digital assistant component includes providing the second query and to a portion of a digital assistant that is hosted and/or stored remotely to the computer system. In some examples, the portion of the digital assistant is stored on a server that the computer system connects to and/or contacts through a network such as the internet, a local area network, and/or another network. In some examples, providing the second query to the second digital assistant component includes providing the contextual data with the second query. In some examples, the second digital assistant component is partially stored on the computer system and partially stored on a server connected to the computer system. In some examples, the second digital assistant is stored entirely on the computer system.

In some examples, the computer system (e.g., 1000, 1100, and/or 1200) causes the first digital assistant component to perform a first task determined from the first query; causes the second digital assistant component to perform a second task determined from the second query; and provides an output including results of the first task and the second task. In some examples, an output of the first query is an input to the second query. In some examples, causing the first digital assistant component to perform the first task determined from the first query includes performing the task with the computer system. In some examples, causing the second digital assistant component to perform the second task determined from the second query includes performing the second task with the computer system. In some examples, both the first task and the second task are performed with the computer system after receiving the first task and the second task from the first digital assistant component and the second digital assistant component, respectively.

The operations described above with reference to FIG. 13 are optionally implemented by components depicted in FIGS. 1-4A, 6A-6B, 7A-7C, 8, 9, 10A-10C, 11A-11C, and 12A-12D. For example, the operations of process 1300 may be implemented by digital assistant 900 residing on computer systems 1000, 1100, and/or 1200. It would be clear to a person having ordinary skill in the art how other processes are implemented based on the components depicted in FIGS. 1-4A, 6A-6B, 7A-7C, 8, 9, 10A-10C, 11A-11C, and 12A-12D.

FIG. 14 illustrates block diagram of process 1400 for query execution by the digital assistant, according to various examples. Process 1400 is performed, for example, using one or more electronic devices implementing a digital assistant. In some examples, process 1400 is performed using a client-server system (e.g., system 100), and the blocks of process 1400 are divided up in any manner between the server (e.g., DA server 106) and a client device. In other examples, the blocks of process 1400 are divided up between the server and multiple client devices (e.g., a mobile phone and a smart watch). Thus, while portions of process 1400 are described herein as being performed by particular devices of a client-server system, it will be appreciated that process 1400 is not so limited. In other examples, process 1400 is performed using only a client device (e.g., user device 104) or only multiple client devices. In process 1400, some blocks are, optionally, combined, the order of some blocks is, optionally, changed, and some blocks are, optionally, omitted. In some examples, additional steps may be performed in combination with the process 1400.

Process 1400 is performed, for example, using one or more computer systems (e.g., 100, 300, 500, 1000, 1100, and/or 1200) (e.g., a smartphone, a desktop computer, a laptop, a tablet, and/or a wearable electronic device) that is in communication with a display generation component (e.g., a display controller and/or a touch-sensitive display system) and an input device (e.g., a button, a motion detector (e.g., an accelerometer and/or gyroscope), a location sensor (e.g., GPS, Wi-Fi, and/or a radio that indicates a location of the computer system), a microphone, and/or a touch sensitive surface).

The computer system (e.g., 1000, 1100, and/or 1200) provides (1402) a query (e.g., query 902, 1002, 1102, and/or 1202; in some examples, rewritten query 1008, 1018, 1026A, and/or 1026B) and contextual data (e.g., 1004, 1104, and/or 1204) related to the query to a large language model (e.g., after passing through query decorator) (In some examples, the query and the contextual data are transmitted to a server that stores the large language model); receives (1404) a prompt (e.g., 911, 1112, 1212a, and/or 1212b) created by the large language model that includes at least a portion of the contextual data related to the query and a task based on the query; (e.g., wherein the portion of the contextual data and the task based on the query are provided as one or more strings output of the large language model) (in some examples, the prompt is created by a large language model stored on a server in communication with the computer system; in some examples, the prompt is received from the server); selects (1406) an entity (e.g., which Bob) based on a comparison of at least a first portion of the prompt (e.g., a portion of the string that includes a target entity and/or a portion of the string that includes contextual data about likely entities that are targets of the query) to a plurality of candidate entities available to the computer system (e.g., entities that are stored on the device, included in the contextual data, and/or accessible through spotlight and/or another form of search) (in some examples, the entity is selected with a machine learning model stored on the computer system); selects (1408) an application intent (e.g., the executable task, tool, protocols, and/or function for performing a task and/or a portion of a task) based on a comparison of at least a second portion of the prompt (e.g., a portion of the string that includes a task and/or protocol that is most likely to be helpful in executing the task) to a plurality of candidate application intents (e.g., tools, protocols, and/or functions available to the computer system) (in some examples, the candidate application intents are included in the contextual data; in some examples, the candidate application intents include a set of application intents that is determined to be most relevant to the query); executes (1410) the application intent using the entity; and provides (1412) an output (e.g., 1010, 1110, and/or 1210) (e.g., providing an audio output and/or displaying an affordance, banner, and/or user interface object) (e.g., including automatically-generated visual, text, and/or audio content, and/or generative visual, text, and/or audio content) responsive to the query determined from the executed application intent.

In some examples, the contextual data (e.g., 1004, 1104, and/or 1204) related to the query (e.g., query 902, 1002, 1102, and/or 1202) includes a set of possible entities (e.g., locations, applications, contacts, people, places, things, and/or targets for a task) available to the computer system (e.g., stored on the computer system or available for the computer system to access over a network such as the internet and/or a local area network) that match (e.g., are the same or substantially similar as) the query (and/or a portion of the query).

In some examples, the set of possible entities includes an entity being displayed via a display generation component of the computer system (e.g., 1000, 1100, and/or 1200). In some examples, the entity being displayed via the generation component of the computer system includes an application being displayed via the generation component of the computer system. In some examples, the entity being displayed via the generation component of the computer system includes a contact being displayed via the generation component of the computer system. In some examples, the entity being displayed via the generation component of the computer system includes a location being displayed via the generation component of the computer system. In some examples, the entity being displayed via the generation component of the computer system includes an entity being displayed within an application.

In some examples, the contextual data (e.g., 1004, 1104, and/or 1204) related to the query (e.g., query 902, 1002, 1102, and/or 1202) includes a preliminary application intent related to the query. In some examples, the preliminary application intent related to the query is determined from the query. In some examples, the preliminary application intent related to the query includes possible actions and/or processes that can be called by the computer system to perform a task of the query.

In some examples, the computer system (e.g., 1000, 1100, and/or 1200) determines a semantic comparison between the query (e.g., query 902, 1002, 1102, and/or 1202) and a set of preliminary application intents; and selects the preliminary application intent related to the query from the set of preliminary application intents. In some examples, the semantic comparison between the query and the set of preliminary application intents includes a score indicating the semantic similarity between the query and each of the preliminary application intents. In some examples, the semantic comparison is performed by a digital assistant component for determining context related to received queries. In some examples, the digital assistant component is a different digital assistant component from the first digital assistant component and the second digital assistant component. In some examples, the preliminary application intent is selected based on a score that indicates the semantic similarity between the query and each of the preliminary application intents of the set of preliminary application intents.

In some examples, determining the semantic comparison between the query (e.g., query 902, 1002, 1102, and/or 1202) and the set of preliminary application intents includes: comparing the query to a set of descriptions corresponding to the set of preliminary application intents; and comparing the query to a set of examples corresponding to the set of preliminary application intents. In some examples, comparing the query to the set of descriptions corresponding to the set of preliminary application intents includes calculating the distance between a vector representing the query and a vector representing the set of descriptions corresponding to the set of preliminary application intents. In some examples, comparing the query to the set of descriptions corresponding to the set of preliminary application intents is performed by a first machine learning model. In some examples, the first machine learning model is hosted and/or stored on the computer system. In some examples, comparing the query to a set of examples corresponding to the set of preliminary application intents includes calculating the distance between a vector representing the query and a vector representing the set of examples corresponding to the set of preliminary application intents. In some examples, comparing the query to set of examples corresponding to the set of preliminary application intents is performed by a second machine learning model. In some examples, the second machine learning model is hosted and/or stored on the computer system. In some examples, the first machine learning model and the second machine learning model are the same machine learning model.

In some examples, the computer system (e.g., 1000, 1100, and/or 1200) selects the preliminary application intent from a list of preliminary application intents associated with an application included in the query. In some examples, the list of preliminary application intents includes actions and/or processes that can be called by a digital assistant and/or the computer system to complete a task of the query. In some examples, the list of preliminary application intents is determined by querying and/or requesting information (e.g., data) from the application included in the query.

In some examples, the computer system (e.g., 1000, 1100, and/or 1200) selects the preliminary application intent from a list of preliminary application intents associated with an application displayed via a display generation component of the computer system. In some examples, the list of preliminary application intents includes actions and/or processes that can be called by a digital assistant and/or the computer system to complete a task of the query. In some examples, the list of preliminary application intents is determined by querying and/or requesting information (e.g., data) from the application displayed via the display generation component of the computer system.

In some examples, in accordance with a determination that the task is a search task, the prompt includes on-screen context, the query (e.g., query 902, 1002, 1102, and/or 1202), and a rewritten query based on the query (e.g., the contextual information always provided when this is a search task). In some examples, a different digital assistant component determines that the task is a search task (e.g., a component that pre-processes and/or analyzes the input to determine information that should be provided to the LLM). In some examples, the LLM determines that the task is a search task. In some examples, the LLM creates the prompt after determining that the task is the search task. In some examples, the rewritten query is created by a different digital assistant component and provided to the LLM prior to the LLM determining the task.

In some examples, selecting the entity (e.g., which Bob) based on the comparison of at least the first portion of the prompt (e.g., 911, 1112, 1212*a*, and/or 1212*b*) (e.g., a portion of the string that includes a target entity and/or a portion of the string that includes contextual data about likely entities that are targets of the query) to the plurality of candidate entities available to the computer system (e.g., 1000, 1100, and/or 1200) includes performing a search of the computer system and/or an application of the computer system for an entity that matches the first portion of the prompt. In some examples, the plurality of candidate entities available to the computer system is previously determined by a different digital assistant component. In some examples, the plurality of candidate entities available to the computer system is provided to the LLM and/or the component of the computer system and/or the digital assistant that is performing the search of the computer system and/or the application of the computer system. In some examples, the plurality of candidate entities available to the computer system is determined by the component of the computer system and/or the digital assistant that is performing the search of the computer system and/or the application of the computer system. In some examples, the plurality of candidate entities available to the computer system are determined based on a list of stored and/or installed applications. In some examples, the plurality of candidate entities available to the computer system is determined based on user data available to the computer system.

In some examples, in accordance with a determination that results of the search include a plurality of entities that match the first portion of the prompt (e.g., 911, 1112, 1212*a*, and/or 1212*b*), the computer system (e.g., 1000, 1100, and/or 1200) selects the entity from the plurality of entities that match the first portion of the prompt based on user data available to (e.g., stored on) the computer system and/or behavioral signals (e.g., conversation history, interaction history, and/or user preference). In some examples, selecting based on user data and/or behavioral signals is performed with a machine learning model stored on the computer system. In some examples the user data available to the computer system includes installed applications, contact information for other user's that the user interacts with, relationships between the user and other users, location information of the computer system and/or the user, media that the user has previously interacted with, and/or any other information indicative of user preferences and/or interests. In some examples, behavioral signals of the user includes interaction history between the user and the digital assistant and/or a likelihood of the user making a specific choice.

In some examples, in accordance with a determination that the entity cannot be selected, the computer system (e.g., 1000, 1100, and/or 1200) provides a prompt (e.g., 1214 and/or 1216) (e.g., as an audio output and/or an output on a display generation component of the computer system) requesting a user selection of a possible entity. In some examples, the prompt includes a plurality of possible entities for the user to select from. In some examples, the prompt is provided as both an audio and a visual output. In some examples, the same plurality of possible entities is provided in the audio and the visual output. In some examples, less possible entities are provided in the audio output than the visual output (e.g., "Please choose an entity," while the visual output includes three possibilities). In some examples, the prompt does not specify how the user is to respond to the prompt. In some examples, the prompt includes a description that multiple entities match the query. In some examples, the prompt includes a description that clarification is required from the user.

In some examples, in response to detecting a touch input (e.g., 1218) on a user interface object corresponding to a possible entity, the computer system (e.g., 1000, 1100, and/or 1200) selects the possible entity as the entity. In some examples the possible entity is one of a predetermined list of possible entities (e.g., two, three, and/or four entities). In some examples, the prompt includes a user interface object for each possible entity of the predetermined list of possible entities. In some examples, the user interface object corresponding to the possible entity does not correspond to any other possible entities.

In some examples, in response to detecting an audio input (e.g., 1220) responding to the prompt: the computer system (e.g., 1000, 1100, and/or 1200) provides the audio input to the large language model; receives, from the large language model, an updated prompt (e.g., 911, 1112, 1212*a*, and/or 1212*b*), wherein the updated prompt includes information corresponding to the audio input; and selects the entity based on a first portion of the updated prompt (e.g., that includes the information corresponding to the audio input). In some examples, the updated prompt is created by a large language model stored on a server in communication with the computer system. In some examples, the updated prompt is received from the server. In some examples, the updated prompt is created by the same large language model that created the original prompt. In some examples, the updated prompt is created by adding information corresponding to the audio input to the original prompt. In some examples, the updated prompt is created by replacing information in the original prompt with information from the audio input. In some examples, the updated prompt is created by removing data from the original prompt.

In some examples, selecting the application intent (e.g., the executable task, tool, protocols, and/or function for performing a task and/or a portion of a task) based on the comparison of at least the second portion of the prompt (e.g., 911, 1112, 1212*a*, and/or 1212*b*) (e.g., a portion of the string that includes a task and/or protocol that is most likely to be helpful in executing the task) to the plurality of candidate application intents includes selecting an application intent from a plurality of application intents based on user data available to (e.g., stored on) the computer system (e.g., 1000, 1100, and/or 1200) and/or behavioral signals (e.g., conversation history, interaction history, and/or user preference). In some examples, selecting based on user data and/or behavioral signals is performed with a machine learning model stored on the computer system. In some examples the user data available to the computer system includes installed applications, contact information for other user's that the user interacts with, relationships between the user and other users, location information of the computer system and/or the user, media that the user has previously interacted with, and/or any other information indicative of user preferences and/or interests. In some examples, behavioral signals of the user includes interaction history between the user and the digital assistant and/or a likelihood of the user making a specific choice.

In some examples, after executing the application intent using the entity: in accordance with a determination that a parameter for the application intent is missing: the computer system (e.g., 1000, 1100, and/or 1200) provides a prompt (e.g., 1214 and/or 1216) requesting the parameter; in response to detecting a response to the prompt including the parameter, selects a second entity that corresponds to the parameter; and executes the application intent using the first entity and the second entity. In some examples, the prompt requesting the parameter is an audio output. In some examples, the prompt requesting the parameter is a visual output that includes user interface objects corresponding to possible parameters. In some examples, the response to the prompt is an audio input including the parameter. In some examples, the response to the prompt is an input on a user interface object corresponding to the parameter. In some examples, possible parameters are determined by the computer system prior to providing the prompt. In some examples, the possible parameters are based on user data and/or behavioral signals associated with the computer system and/or the user. In some examples the user data available to the computer system includes installed applications, contact information for other user's that the user interacts with, relationships between the user and other users, location information of the computer system and/or the user, media that the user has previously interacted with, and/or any other information indicative of user preferences and/or interests. In some examples, behavioral signals of the user includes interaction history between the user and the digital assistant and/or a likelihood of the user making a specific choice.

In some examples, prior to providing the output (e.g., 1110, 1210*a*, and/or 1210*b*) (e.g., providing an audio output and/or displaying an affordance, banner, and/or user interface object) responsive to the query determined from the executed application intent, the computer system (e.g., 1000, 1100, and/or 1200) generates the output based on the application intent, the entity, the query, and/or the prompt (e.g., all of the information for the entire process and/or the transcript of the process). In some examples, the type of output provided is determined on a type of interaction received from the user (e.g., interacting with the display generation component and/or providing audio inputs).

In some examples, in accordance with a determination that the query (e.g., 902, 1002, 1102, and/or 1202) includes a composite request (e.g., a request that includes at least two tasks where the output of one task is an input for another task), the prompt (e.g., 911, 1112, 1212*a*, and/or 1212*b*) includes at least two tasks, wherein the output of a first task is an input of a second task. In some examples, the LLM determines that the query includes the composite request. In some examples, a different component of the digital assistant determines that the query includes the composite request and provides a flag and/or other indication to the LLM that the query includes the composite request. In some examples, in accordance with the determination that the query includes the composite request, the LLM creates the prompt that includes the at least two tasks. In some examples, in accordance with the determination that the query includes the composite request, the digital assistant provides a first task to a different component of the digital assistant and receives an output. In some examples, the digital assistant adds the output to the input of the LLM and the LLM determines a prompt including the second task based on the output received from the different component of the digital assistant.

In some examples, in accordance with a determination that the prompt (e.g., 911, 1112, 1212*a*, and/or 1212*b*) includes at least two tasks: the computer system (e.g., 1000, 1100, and/or 1200) selects a first entity and a first application intent; executes the first application intent using the first entity; and provides the results of the execution of the first application intent to the LLM.

In some examples, in accordance with the determination that the prompt (e.g., 911, 1112, 1212*a*, and/or 1212*b*) includes at least two tasks and after providing the results of the execution of the first application intent to the LLM: the computer system (e.g., 1000, 1100, and/or 1200) receives a second prompt (e.g., 911, 1112, 1212*a*, and/or 1212*b*) from the LLM, wherein the second prompt includes the second task of the at least two tasks and information corresponding to the results of the execution of the first application intent; selects a second entity and a second application intent based on the second prompt; executes the second application intent using the second entity; and provides an output response to the query determined from the executed second application intent. In some examples, the output includes information determined from the executed first application intent. In some examples, in accordance with a determination that the second task is to be completed by a different digital assistant component, the results of the first task are provided to the different digital assistant component (e.g., using a shim to perform the task with previously incorporated portions of the digital assistant). In some examples, the prompt includes more than two tasks and the process of selecting an entity and an application intent to perform the task is repeated iteratively for each task of the more than two tasks (e.g., three tasks, four tasks, etc.). In some examples, the LLM integrates information from each previously performed task in the chain of tasks that are to be performed to accomplish the composite request.

The operations described above with reference to FIG. 14 are optionally implemented by components depicted in FIGS. 1-4A, 6A-6B, 7A-7C, 8, 9, 10A-10C, 11A-11C, and 12A-12D. For example, the operations of process 1400 may be implemented by digital assistant 900 residing on computer systems 1000, 1100, and/or 1200. It would be clear to a person having ordinary skill in the art how other processes are implemented based on the components depicted in FIGS. 1-4A, 6A-6B, 7A-7C, 8, 9, 10A-10C, 11A-11C, and 12A-12D.

Figures 15B, 15C:
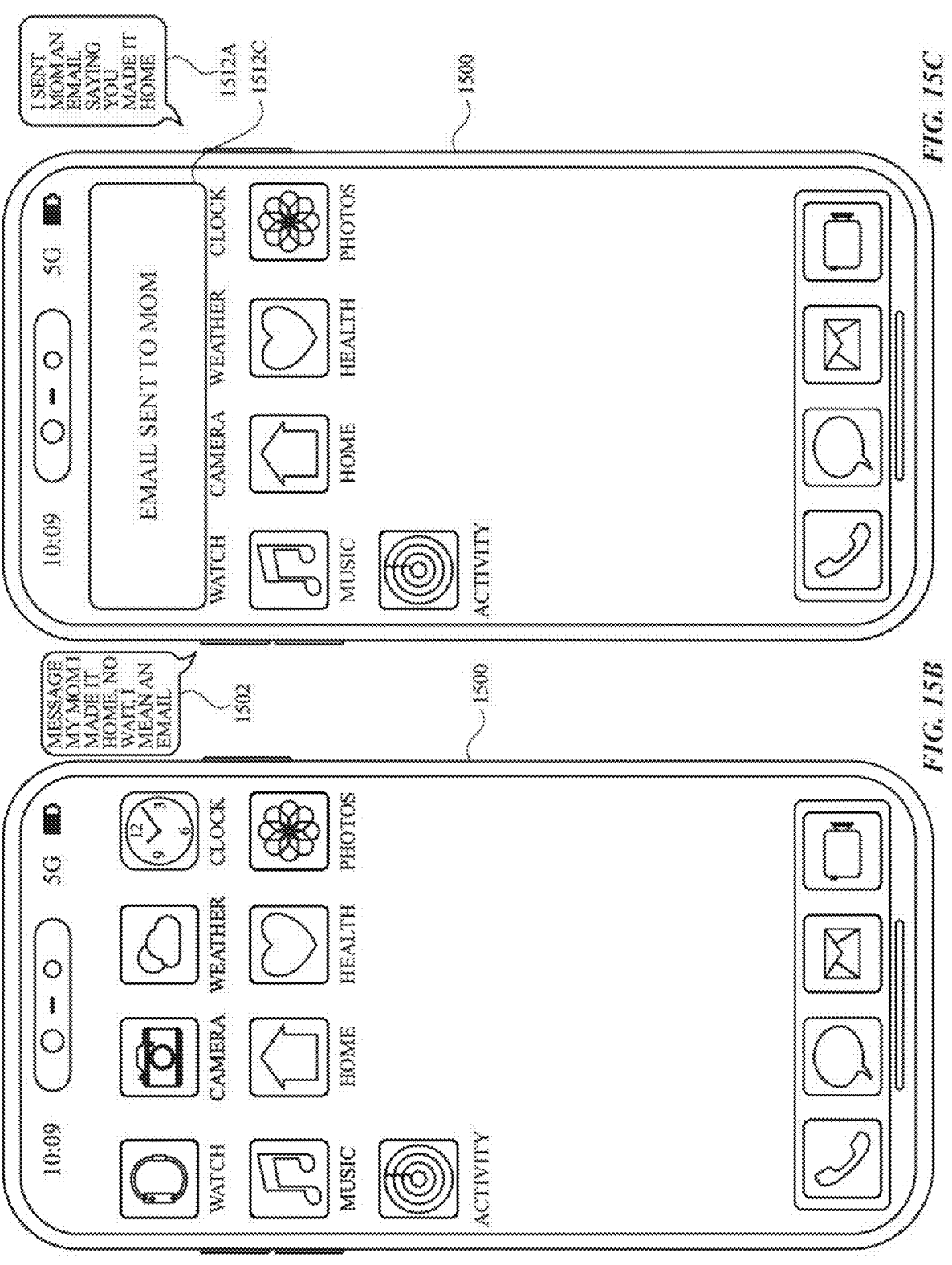

FIGS. 15A-15I illustrate example queries executed by digital assistant 900, according to various examples. The examples discussed below utilize the components of digital assistant 900 discussed above. At FIG. 15A, digital assistant 900 receives query 1502 of "Message my mom I made it home, no wait, I mean an email." Digital assistant 900 receives query 1502 when query 1502 is detected by computer system 1500 (e.g., smartphone, tablet, computer, and/or wearable device), as shown in FIG. 15B. In some examples, query 1502 is detected by one or more microphones of computer system 1500. As discussed above, computer system 1500 stores and/or hosts digital assistant 900 (in some examples at least a portion of digital assistant 900). Thus, digital assistant 900 has access to query 1502 (or a representation of query 1502) once it is detected by computer system 1500. As illustrated in FIG. 15A, query 1502 includes a first-in-time portion 1502A, "Message my mom I made it home," and a second-in-time portion 1052B, "No wait, I mean an email."

Digital assistant 900 provides first-in-time portion 1502A of query 1502 to query decoration module 904 to obtain context data related to query 1502 and possible tools that could be used to satisfy the query, as described above. In particular, context retrieval module 904a obtains context data 1504A that includes that identifies the contact "Mom," and tool retrieval module 904b obtains the candidate protocol 1506A of "send_message." In some examples, tool retrieval module 904b determines that a text messaging application with the "send_message" protocol (e.g., a send message application intent) is registered and/or installed on computer system 1500.

Query decoration module 904 provides context data 1504A and protocol 1506A to query router 906. Query router 906 determines that protocol 1506A belongs to an intent domain handled by first digital assistant execution module 908 (e.g., determining that first digital assistant execution module 908 is capable of performing the task and providing a response to query 1502). In some embodiments, the tools available to tool retrieval module 904b are classified into domains handled by different execution modules (e.g., handling agents) such as first digital assistant execution module 908 and plan generation module 910 and/or second digital assistant execution module 914 (e.g., based on the respective capabilities of each agent). For example, first digital assistant execution module 908 handles text messaging, telephone, and calendar intents, and second digital assistant module 914 handles email, dictation, and media playback intents. Some intents or domains are exclusive to one execution module, while others (such as knowledge seeking intents, as discussed above) are shared.

Based on the routing decision to handle query 1502 using first digital assistant execution module 908, query router 906 compiles response information to provide to first digital assistant execution module 908 to use in fulfilling the request, including rewritten query 1508. For example, query router 906 rewrites first-in-time portion 1504 to create rewritten query 1508, "Send a message to Mom saying I made it home," in order to provide first digital assistant execution module 908 with a more grammatically-fluent request. In some embodiments, query router 906 provides or prepares to provide rewritten query 1508, context data 1504A, and protocol 1506A to first digital assistant execution module 908.

Digital assistant 900 then provides second-in-time portion 1502B ("no wait, I mean an email") of query 1502 to query decoration module 904, which determines that second-in-time portion 1502B provides additional context for query 1502. For example, query decoration module 904 determines, based on the language of query 1502 and/or the initially-determined response information (e.g., context data 1504A and/or candidate protocol 1506A) that second-in-time portion 1502B does not represent a separate request. Query decoration module 904 uses tool retrieval module 904b to determine that, based on second-in-time portion 1502B, candidate protocol 1506B ("send_email") for sending an email is a possible tool that could be used to satisfy query 1502.

Query decoration module 904 provides additional context data 1504B, representing second-in-time portion 1502B, and protocol 1506B to query router 906 in connection with query 1502. Because the intent identified for query 1502 changes from protocol 1506A to 1506B based on second-in-time portion 1502B, second-in-time portion 1502B is identified as a correction to first-in-time portion 1502A (e.g., a corrective disfluency in query 1502). As additional context data 1504B represents a correction to first-in-time portion 1502A, query router 906 re-checks the routing decision based on the new query decoration information. Query router 906 determines that protocol 1506B belongs to an intent domain handled by second digital assistant module 914 (e.g., determining that second digital assistant module 914 is capable of performing the updated task and providing a response to query 1502 and/or determining that first digital assistant execution module 908 is not capable of performing the updated task).

Because the routing decision for query 1502 changes based on additional context data 1504B, query router 906 compiles new response information to provide to plan generation module 910 to use in fulfilling the request. As described above with respect to FIGS. 11A-11C, query router 906 provides plan generation module 910 with query 1502, context data 1504A-1504B, and protocol 1506B (e.g., and/or any other identified candidate protocols) to plan generation module 910. As described above, in some embodiments, query 1502 is not rewritten for plan generation module 910 (e.g., allowing plan generation module 910 to process the raw query 1502 using the information from query decoration module 904), although the original rewritten query 1508 may be provided to plan generation module 910 as context data. In some embodiments, query router 906 does rewrite query 1502 (e.g., a second time) based on context data 1504B, for instance, replacing the word "message" with "email," and provides the updated query rewrite to plan generation module 910 as a pre-processed input. In some embodiments, if rewritten query 1508 was provided to first digital assistant execution module 908 prior to identifying the correction provided in second-in-time portion 1502B, query router 906 additionally sends a cancel signal to first digital assistant execution module 908 to prevent first digital assistant execution module 908 from executing any actions based on rewritten query 1508.

Plan generation module 910, plan resolution module 912, second digital assistant execution module 914, and response generation module 916 (e.g., as described with respect to FIGS. 11A-14) process query 1502 to determine plan 1510, which is executed to produce result 1512 of sending an email to the contact Mom, per the overall query 1502. Result 1512 includes an audio component 1512A and a visual component 1512B (e.g., including automatically-generated visual, text, and/or audio content, and/or generative visual, text, and/or audio content), as illustrated in FIG. 15C.

Figures 15E, 15F:
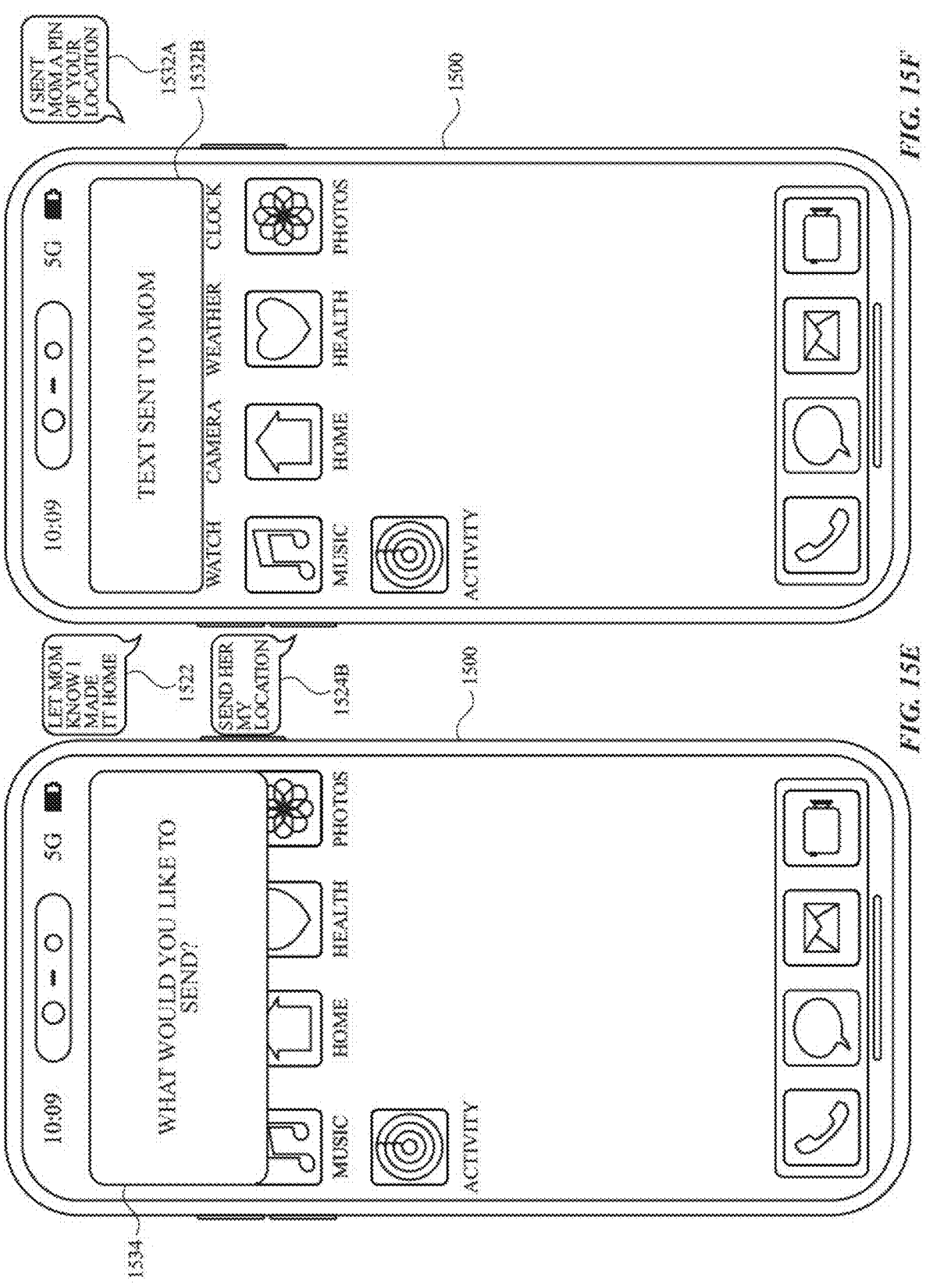

At FIG. 15D, digital assistant 900 receives query 1522 of "Let mom know I made it home," which is detected as an audio input at computer system 1500 as illustrated in FIG. 15E. Digital assistant 900 provides query 1522 to query decoration module 904 to obtain context data related to query 1522 and possible tools that could be used to satisfy the query, as discussed above. In particular, context retrieval module 904a obtains context data 1524A that identifies the contact "Mom," and tool retrieval module 904b obtains the candidate protocol 1526A of "send_email" and candidate protocol 1526B of "send_message" as possible tools that could be used to fulfill query 1522.

Query decoration module 904 provides context data 1524A, protocol 1526A, and protocol 1526B to query router 906. Query router 906 determines to route query 1522 to plan generation module 910 based on protocol 1526A, which belongs to an intent domain handled by second digital assistant execution module 914 (e.g., determining that second digital assistant execution module 914 is capable of performing the task and providing a response to query 1522 and/or determining that first digital assistant execution module 908 is not capable of performing the task and providing a response to query 1502).

Based on the routing decision to handle query 1522 using second digital assistant execution module 914, query router 906 compiles response information to provide to plan generation module 910 to use in interpreting and fulfilling the request, such as a representation of query 1522, context data 1524A, and protocol 1526A (e.g., and/or any other identified candidate protocols). Plan generation module 910 (e.g., and/or the other components in connection with second digital assistant module 914) determines plan 1528 to send an email to the contact Mom.

Digital assistant 900 then obtains additional context 1524B related to query 1522, specifically, a second audio input "Send her my location." As illustrated in FIG. 15E, in some embodiments, additional context 1524B is received in response to prompt 1534 output by digital assistant 900. For example, based on the results of query decoration, query routing, and/or plan generation, digital assistant 900 seeks additional context to increase confidence in the response, to fill in missing slot values, and/or disambiguate between multiple interpretations of query 1522. Accordingly, in some embodiments, additional context 1524B represents a system-prompted update to query 1522. In some embodiments, additional context 1524B is detected (e.g., as an audio input) without first providing prompt 1534, and additional context 1524B represents a user-initiated update (e.g., similarly to the second-in-time portion 1502B of query 1502).

Digital assistant 900 provides additional context 1524B to query decoration module 904, which determines that additional context 1524B provides additional context for query 1522 (e.g., based on the language of additional context 1524B, the provision of prompt 1534, and/or other context data). Query decoration module 904 uses context retrieval module 904a to determine that, based on additional context 1524B, context data 1524C, representing the user's current location, is to be used in satisfying query 1522.

Similarly to the tools available to tool retrieval module 904b, in some embodiments, some types and/or specific items of context data available to context retrieval module 904a are classified into domains to be handled by different execution modules. For example, in some examples, first digital assistant execution module 908 is implemented locally on computer system 1500 while components of plan generation module 910, plan resolution module 912, second digital assistant execution module 914, and/or response generation module 916 are implemented remotely (e.g., on a digital assistant server). As such, context data classified as personal or private, such as location, medical and/or biometric data, secure account information, and/or personal identifying information are restricted to being handled by first digital assistant execution module 908.

Because the context data for fulfilling query 1522 changes to include additional context 1524B (e.g., additional context 1524B represents a correction to the initial interpretation of query 1522 based on context 1524A), when query decoration module 904 provides additional context 1524B to query router 906 in connection with query 1522, query router 906 re-checks the routing decision. Based on additional context 1524B's classification as personal or private data, query router 906 selects first digital assistant execution module 908 to fulfill query 1522. Accordingly, query router 906 rewrites query 1522 to create rewritten query 1530, "Send Mom my location," which inserts additional context 1524B. In some embodiments, as described above, query router 906 additionally sends a cancel signal to plan generation module 910 (e.g., and/or another component in connection with second digital assistant execution module 914) to prevent second digital assistant execution module 914 from executing plan 1528.

As described above with respect to FIGS. 10A-10C, query router 906 provides first digital assistant execution module 908 with rewritten query 1530, context data 1524A-1524B, and protocol 1526B. First digital assistant execution module 908 produces result 1532 of sending a message to the contact Mom including information representing the user's current location. Result 1532 includes an audio component 1532A and a visual component 1532B (e.g., including automatically-generated visual, text, and/or audio content, and/or generative visual, text, and/or audio content), as illustrated in FIG. 15F.

Figures 15H, 15I:
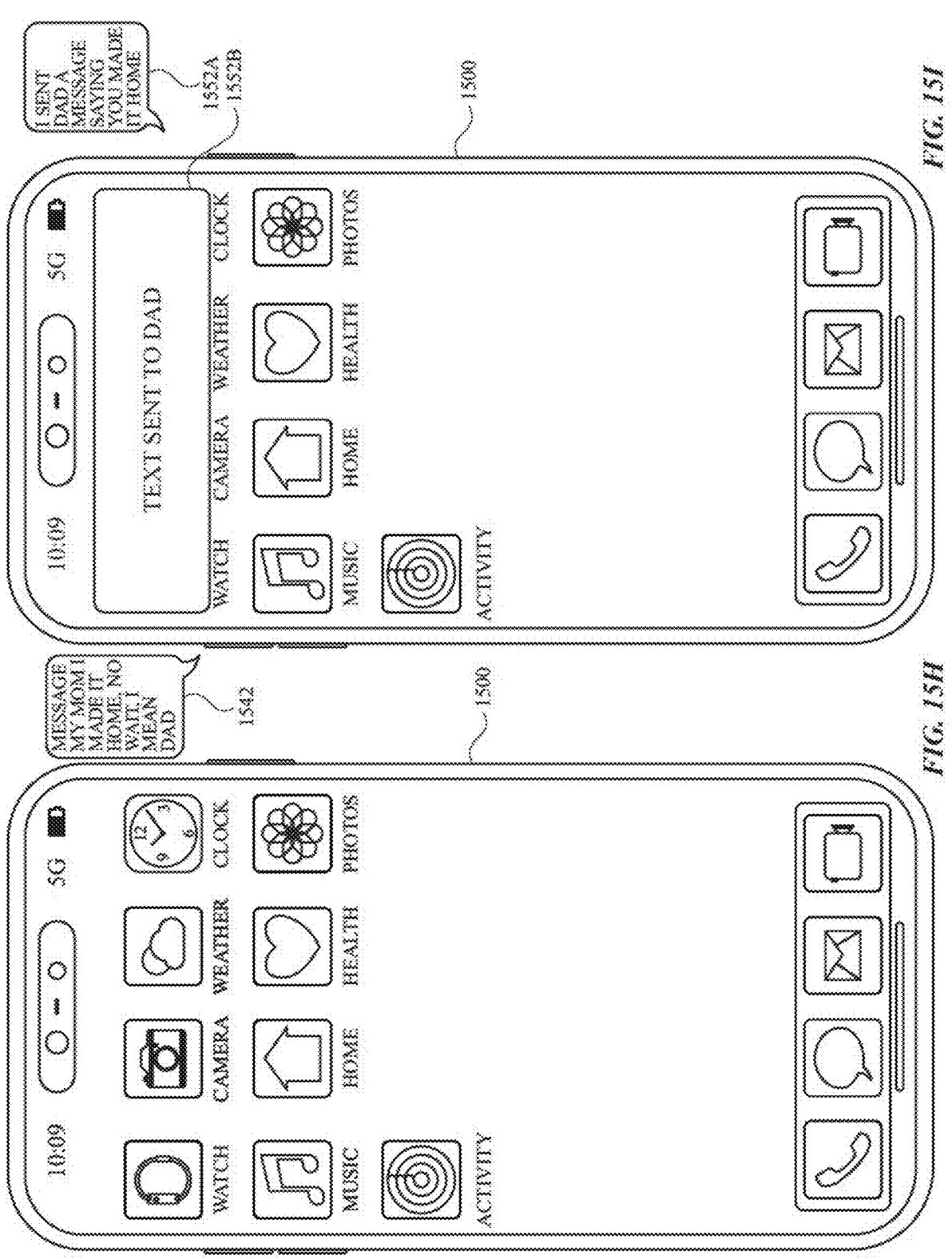

At FIG. 15G, digital assistant 900 receives query 1542 of "Message my mom I made it home, no wait, I mean dad." Query 1542 is received as an audio input by computer system 1500, as illustrated in FIG. 15H. Query 1542 includes a first in time portion 1542A, "Message my mom I made it home," and a second-in-time portion 1542B, "no wait, I mean dad." As described above with respect to FIGS. 15A-15C, digital assistant 900 provides first-in-time portion 1542A to query decoration module 904, which identifies context data 1544A (e.g., the contact "Mom") and protocol 1546A (e.g., "send_message"). Based on first-in-time portion 1542A, context data 1544A, and protocol 1546A, query router 906 determines that query 1542 should be handled by first digital assistant execution module 908, and rewrites query 1542 to create rewritten query 1548, "Send a message to mom saying I made it home."

Digital assistant 900 then provides second-in-time portion 1542B ("no wait, I mean dad") of query 1542 to query decoration module 904, which determines that second-in-time portion 1542B provides additional context for query 1542 (e.g., as opposed to a new request), and uses context retrieval module 904a to identify context data 1544C (e.g., the contact "Dad"). Query decoration module 904 provides additional context data 1544B, representing second-in-time portion 1542B, and context data 1544C to query router 906.

Because context data 1544A and 1544C represent mismatched slot values (e.g., different contacts) for performing protocol 1546A (e.g., which has not changed based on additional context data 1544B), query router 906 re-checks the routing decision for query 1542. Query router 906 again determines that query 1542 should be handled by first digital assistant execution module 908 (e.g., the routing decision does not change based on additional context data 1544B and/or context data 1544C). As illustrated in FIG. 15G, rather than re-write query 1542 a second time, query router 906 generates a correction signal 1550, which specifically identifies the correction to the response handling information previously provided to first digital assistant execution module 908. For example, correction signal 1550 identifies that the slot value previously filled by the contact "Mom" should be updated to the contact "Dad." In some embodiments, query router 906 generates a similar correction signal (e.g., specifically identifying changed context and/or tools) for queries that are both originally routed and re-routed to plan generation module 910/second digital assistant execution module 914. In some embodiments, additionally to or instead of a correction signal, query router 906 performs a new re-write and/or sends the updated handling information to the handling agent (e.g., allowing the handling agent to identify the specific correction needed based on context data 1544B and/or context data 1544C).

Query router 906 provides first digital assistant execution module 908 with correction signal 1550, and first digital assistant execution module 908 produces result 1552 of sending a message to the contact Dad. Result 1552 includes an audio component 1552A and a visual component 1552B (e.g., including automatically-generated visual, text, and/or audio content, and/or generative visual, text, and/or audio content), as illustrated in FIG. 15I.

Figure 16B:
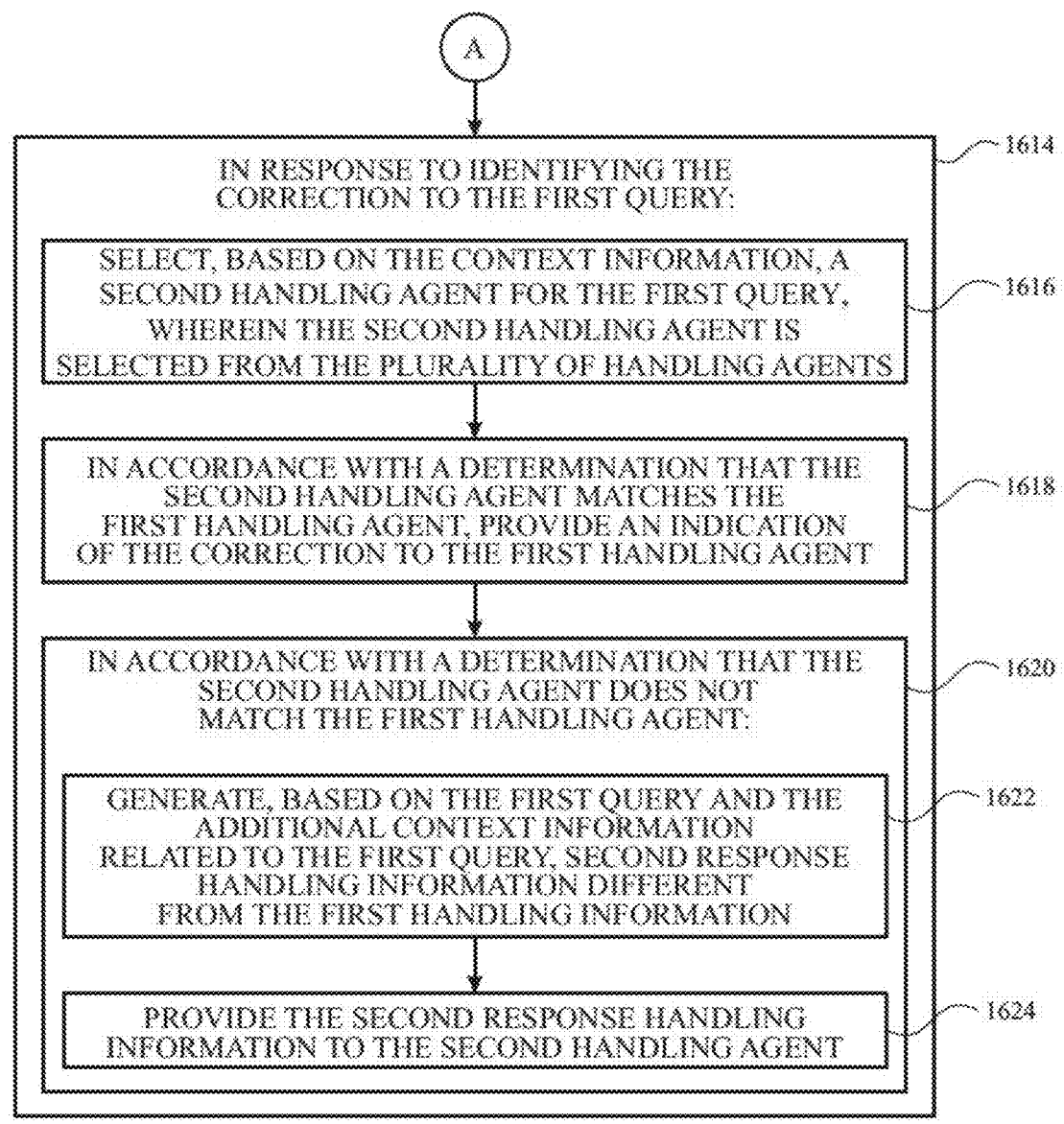

FIGS. 16A-16B illustrate block diagram of process 1600 for query execution by the digital assistant, according to various examples. Process 1600 is performed, for example, using one or more electronic devices implementing a digital assistant. In some examples, process 1600 is performed using a client-server system (e.g., system 100), and the blocks of process 1600 are divided up in any manner between the server (e.g., DA server 106) and a client device. In other examples, the blocks of process 1600 are divided up between the server and multiple client devices (e.g., a mobile phone and a smart watch). Thus, while portions of process 1600 are described herein as being performed by particular devices of a client-server system, it will be appreciated that process 1600 is not so limited. In other examples, process 1600 is performed using only a client device (e.g., user device 104) or only multiple client devices. In process 1600, some blocks are, optionally, combined, the order of some blocks is, optionally, changed, and some blocks are, optionally, omitted. In some examples, additional steps may be performed in combination with the process 1600.

Process 1600 is performed, for example, using one or more computer systems (e.g., 100, 300, 500, 1000, 1100, 1200, and/or 1500) (e.g., a smartphone, a desktop computer, a laptop, a tablet, and/or a wearable electronic device) that is in communication with one or more input devices (e.g., a button, a motion detector (e.g., an accelerometer and/or gyroscope), a location sensor (e.g., GPS, Wi-Fi, and/or a radio that indicates a location of the computer system), a microphone, and/or a touch sensitive surface), and optionally in communication with a display generation component (e.g., a display controller and/or a touch-sensitive display system). Process 1600 is performed, for example, using one or more electronic devices implementing a digital assistant. In some examples, process 1600 is performed using a client-server system (e.g., system 100), and the blocks of process 1600 are divided up in any manner between the server (e.g., DA server 106) and a client device. In other examples, the blocks of process 1600 are divided up between the server and multiple client devices (e.g., a mobile phone, smart watch, personal computer, tablet device, headset, television, and/or other computing device). Thus, while portions of process 1600 are described herein as being performed by particular devices of a client-server system, it will be appreciated that process 1600 is not so limited. In other examples, process 1600 is performed using only a client device (e.g., user device 104) or only multiple client devices. In process 1600, some blocks are, optionally, combined, the order of some blocks is, optionally, changed, and some blocks are, optionally, omitted. In some examples, additional steps may be performed in combination with the process 1600.

The computer system (e.g., 1000, 1100, 1200, and/or 1500) receives (1602) an audio input (e.g., 1502, 1522, 1524B, and/or 1542). In response to receiving the audio input, the computer system obtains (1604), based on the audio input, a first query (e.g., 1502A, 1522, and/or 1542A) (in some embodiments, a textual transcription, e.g., of a spoken audio input; in some embodiments, a tokenized representation of the audio input).

The computer system selects (1606), based on the first query, a first handling agent for the first query, wherein the first handling agent is selected from a plurality of handling agents (e.g., as described with respect to FIGS. 9 and 15A-15I). For example, the computer system makes a routing decision between a plurality of software agents (e.g., digital assistant execution modules) that the computer system can access/call on to fulfill user requests, including performing tasks related to interpreting a request, determining actions to take in response to the request, performing (or causing performance of) the actions, and/or generating outputs (e.g., outputs presenting the results of the actions taken, spoken outputs, displayed outputs, audio outputs, tactile outputs, and/or other types of outputs provided to a user via the computer system). In some embodiments, the first handling agent is selected from a set of available handling agents, such as a set including a first digital assistant component (e.g., a component including first digital assistant execution model 908, as described with respect to FIG. 9) and a second digital assistant component (e.g., a component including plan generation module 910, plan resolution module 912, second digital assistant execution module 914, and/or response generation module 916, as described with respect to FIG. 9). For example, the plurality of handling agents may include different intelligence engines, such as digital assistant module 726 (e.g., including input/output processing module 728, speech-to-text (STT) processing module 730, natural language processing module 732, dialogue flow processing module 734, task flow processing module 736, service processing module 738, and speech synthesis processing module 740), foundation system 800 (e.g., including context module 804, tokenization module 806, input embedding module 808, and/or foundation model 810), and/or another large language model (LLM), machine learning model, neural network, and/or generative AI model. For example, the plurality of handling agents may be stored in different ways (e.g., locally and/or remotely), be managed differently (e.g., by a first- or third-party administrator), be associated with different functionalities (e.g., particular applications or domains), and/or have different requirements (e.g., processing power, battery life, network connectivity, and/or authentication requirements).

The computer system generates (1608), based on the first query, first response handling information (e.g., 1504A, 1506A, 1508, 1524A, 1526A, 1526B, 1544A, 1546A, and/or 1548). For example, as described with respect to FIGS. 9 and 15A-15I, the computer system compiles contextual data, candidate protocols, and/or query re-writes with which to provide the selected handling agent. In some embodiments, the first response handling information is generated differently based on which handling agent is selected (e.g., generating a re-written query, such as 1508 and/or 1548, when a first type of handling agent is selected and/or including the first query (e.g., without re-writing or in addition to a re-write) when a second type of handling agent is selected).

The computer system obtains (1610) additional context information related to the first query (e.g., 1504B, 1524B, and/or 1544B) (e.g., after receiving the audio input, selecting the first handling agent for the first query, and/or generating the first response handling information; in some embodiments, after providing the first response handling information to the first handling agent). In some embodiments, the additional context information includes a later user input, such as a later part of a decomposed input (e.g., "send an email to Dad, no wait, I mean Mom"), an input following an interruption or barge-in (e.g., "send a message to Dad" "ok, what—" "no, I mean an email"), and/or a computer-prompted clarification (e.g., "send 'Happy Birthday' to Mom" "do you want to send a message or an email?" "message"). In some embodiments, the additional context information includes a rewrite of the query (e.g., "send a message to mom, no wait, I mean an email" is rewritten as "send an email to mom").

The computer system identifies (1612), based on the additional context information related to the first query, a correction to the first query. For example, identifying the correction to the first query includes identifying a state mismatch between the understanding of the first query when the initial routing decision is made and the current understanding of the first query based on the additional context information, such as identifying a mismatched domain (e.g., domains handled by a first type of agent versus a second type of agent), a mismatched intent, and/or a mismatched slot value (e.g., entity or parameter). For example, as described with respect to FIGS. 15A-15C, the identified intent changes from protocol 1506A to protocol 1506B based on additional context data 1504B. For example, as described with respect to FIGS. 15D-15F, the identified slot value for the communication to be sent changes to include the user's current location (context data 1524C). For example, as described with respect to FIGS. 15G-15I, the identified slot value for the contact changes from Mom (1544A) to Dad (1544C). In some embodiments, the computer system identifies the correction to the first query using other language processing techniques and context (e.g., conversation history) to determine that the additional context information represents a correction to the first query (e.g., as opposed to a wholly new request).

In response to identifying the correction to the first query (1614), the computer system selects (1616), based on the context information, a second handling agent for the first query, wherein the second handling agent is selected from the plurality of handling agents (e.g., re-doing the re-routing decision). In accordance with a determination that the second handling agent matches the first handling agent (e.g., as described with respect to FIGS. 15G-15I), the computer system provides (1618) an indication of the correction (e.g., 1550) to the first handling agent. In some embodiments, the first handling information is corrected prior to providing it to the handling agent (e.g., the indication of the correction is integrated into the first handling information). In some embodiments, the indication of the correction specifically identifies changed slot values to the handling agent (e.g., as described with respect to FIGS. 15G-15I).

In response to identifying the correction to the first query (1614) and in accordance with a determination that the second handling agent does not match the first handling agent (1620) (e.g., as described with respect to FIGS. 15A-15F), the computer system generates (1622), based on the first query and the additional context information related to the first query, second response handling information different from the first response handling information (e.g., a newly rewritten query and/or a new context set, depending on the agent), and provides (1624) the second response handling information to the second handling agent. In some embodiments, the computer system sends un-do signal to first agent. In some embodiments, the computer system discards first response handling information.

In some embodiments, in accordance with a determination that the first handling agent is a first type of agent (e.g., first digital assistant execution module 908), the first response handling information includes a rewritten version of the first query (e.g., 1508 and/or 1548) (e.g., as described with respect to FIGS. 9, 15A-15C, and/or 15G-15I). In some embodiments, generating the first response handling information/generating the rewritten version of the first query includes performing query decoration. In some embodiments, generating the rewritten version of the first query includes removing linguistic disfluencies. In some embodiments, in accordance with a determination that the first handling agent is a second type of agent (e.g., plan generation module 910 and/or second digital assistant execution module 914), different from the first type of agent, the first response handling information includes a first set of context information related to the first query.

In some embodiments, generating the first response handling information is performed (e.g., at least in part) by an initial agent (e.g., 904 and/or 906), wherein the initial agent is not included in the plurality of handling agents. For example, the initial agent includes query decoration module 904 and/or query router 906. In some embodiments, generating the second response handling information is performed (e.g., at least in part) by the initial agent. In some embodiments, the initial agent converts the audio input to text and/or tokenizes the audio input, e.g., to obtain the first query.

In some embodiments, generating the first response handling information includes, in accordance with a determination that a set of one or more rewrite criteria is satisfied, generating, using the initial agent, a rewritten version of the first query (e.g., 1508 and/or 1548). In some embodiments, generating the second response handling information includes generating, using the initial agent, a second rewritten version of the first query (e.g., incorporating the correction). For example, the initial agent pre-processes queries prior to providing them to the selected handling agent. For example, the rewritten version of the first query includes a tokenized version of the query. For example, the set of one or more rewrite criteria includes a criterion based on the selected handling agent, e.g., rewritten queries are only generated for certain handling agents and not for others.

In some embodiments, generating the rewritten version of the first query includes removing one or more disfluencies (e.g., repeated words, filler words, stutters, pauses, and/or redundancies) from the first query (e.g., as described with respect to FIG. 10D) (e.g., the query re-write includes a cleaned-up version of the literal input query). In some embodiments, the first query corresponds to the same intent before and after removing the disfluencies, e.g., the removed disfluencies are linguistic disfluencies that can be removed without changing the intent of the query.

In some embodiments, generating the rewritten version of the first query includes identifying metadata (e.g., contextual data, entities, and/or intents) related to the first query and including at least a portion of the metadata in the rewritten version of the first query (e.g., annotating and/or compiling the first query with associated metadata). For example, portions of the first query (e.g., words, phrases, and/or other utterances) are annotated with corresponding contextual data, entities, and/or intents. For example, rewritten queries 1508 and/or 1548 are annotated with a pointer to the contact "Mom" (e.g., in the user's digital address book and/or an entity repository) and/or message text is inserted.

In some embodiments, the initial agent (e.g., including 904 and/or 906) includes a first large-language model, wherein the first large-language model is trained (e.g., adapted) to output a first type of output. In some embodiments, the first LLM is trained using particular techniques, data sets, and/or numbers of parameters. In some embodiments, the plurality of handling agents includes a respective handling agent (e.g., plan generation module 910), wherein the respective handling agent includes a second large-language model, wherein the second large-language model is trained (e.g., adapted) to output a second type of output, different from the first type of output. In some embodiments, the second LLM is trained using different techniques, data sets, and/or numbers of parameters than the first LLM. For example, the initial agent (e.g., including query decoration module 904 and/or query router 906) and a handling agent such as plan generation model 910 are trained and/or adapted for different types of language processing.

In some embodiments, the second type of output is a query response output (e.g., 1112, 1212*a*, 1212*b*, 1510, and/or 1528) (e.g., a natural-language response to a query and/or one or more tasks to perform in response to the query). For example, the respective handling agent includes a plan generation LLM (e.g., as described with respect to plan generation module 910).

In some embodiments, generating the first response handling information includes, in accordance with a determination that the first handling agent is the respective handling agent, including the first query (e.g., the text transcription and/or tokenized representation of the audio input) in the first response handling information (e.g., as described with respect to FIGS. 15D-15F). For example, the respective handling agent is provided with the non-rewritten version of the first query to process, rather than processing the re-written version. In some embodiments, a rewritten query is not generated when the respective handling agent is selected. In some embodiments, a rewritten query is generated and provided to the respective handling agent along with the first query (e.g., the non-rewritten query). In some embodiments, contextual data related to the first query is also included in response handling information for the respective handling agent, e.g., for the respective handling agent to use when interpreting the first query.

In some embodiments, the first type of output is a query rewrite output (e.g., 1008, 1018, 1026A, 1026B, 1508, 1530, and/or 1548) (e.g., a pre-processed query). For example, the respective handling agent includes an LLM for query decoration module and/or an LLM for query routing.

In some embodiments, the plurality of handling agents includes a first respective handling agent, wherein the first respective handling agent is a module that executes at the computer system (e.g., exclusively), and a second respective handling agent, wherein the second respective handling agent is a module that executes at least in part at a remote computer system different from the computer system. For example, at least one potential handling agent is local to the computer system, and at least one potential handling agent performs some functions remotely, e.g., via a cloud service and/or at a server. In some embodiments, the plurality of handling agents includes handling agents with different levels of digital security, e.g., different levels or types of data encryption. In some embodiments, the plurality of handling agents includes one or more first-party digital assistant components and/or one or more third-party digital assistant components.

In some embodiments, the additional context information related to the first query includes a rewritten version of the first query. For example, the first handling agent (e.g., the initial routing decision) is selected based on an initial version of the first query (e.g., a text transcription and/or tokenized representation of the audio input), and the second handling agent (e.g., the second routing decision) is selected after additional processing on the first query is performed (e.g., removing disfluencies and/or identifying context data, entities, and/or intents). For example, with respect to the embodiments described at FIGS. 15A-15C, after initially processing first-in-time portion 1502A of query 1502, query decoration module 906 rewrites query 1502 based on both first-in-time portion 1502A and second-in-time portion 1502B (e.g., removing the disfluency "no wait, I mean" and carrying the context of first-in-time portion 1502A through to second-in-time portion 1502B), resulting in a rewrite (e.g., "Email my mom I made it home") that contradicts the initial interpretation of query 1502.

In some embodiments, obtaining the first query includes obtaining the first query based on a first portion of the audio input (e.g., 1502A, 1522, and/or 1542A) (e.g., the first query represents a first user utterance), and the additional context information includes a representation of a second portion of the audio input (e.g., 1502B, 1524B, and/or 1544B) (e.g., a text transcription and/or tokenized representation), wherein the second portion of the audio input was received after the first portion of the audio input (e.g., the second portion represents a later-in-time user utterance). In some embodiments, the second portion of the audio input represents a correction to the first portion of the audio input, e.g., the user corrects a previous word, phrase, and/or statement. In some embodiments, the first portion and second portion of the audio input are both received without prompting from the computer system (e.g., the computer system does not provide an output prompting the second portion of the audio input before it is received).

In some embodiments, in response to receiving the audio input, the computer system determines, based on a representation of the audio input (e.g., a text transcription and/or tokenized representation), the first portion of the audio input and the second portion of the audio output (e.g., as described with respect to FIG. 10E). For example, the computer system (e.g., the initial agent) decomposes a stream of detected audio into two or more discrete utterances. For example, the initial agent includes an LLM trained to parse audio input into discrete utterances based on linguistic features such as syntax, cadence, tone, pauses, and/or other features indicating that a user has completed, terminated, and/or changed a topic and/or intent of their speech.

In some embodiments, after receiving the audio input, the computer system receives a second audio input, wherein the additional context information includes a representation of the second audio input (e.g., 1524B). In some embodiments, the computer system determines that the second audio input represents a correction to the audio input (e.g., the second audio input includes content relating to and/or contradicting the audio input), an interruption to the audio input (e.g., the user halts the speech of the audio input and then re-starts speaking the second audio input), and/or an interruption to an ongoing output of the computer system (e.g., the user interrupts an initial output).

In some embodiments, after obtaining the first query (in some embodiments, and after selecting the first handling agent and/or generating the first handling information), the computer system outputs a prompt (e.g., 1534) (in some embodiments, an audio prompt, such as a spoken natural-language output; in some embodiments, a displayed output, such as a selectable menu, button, and/or input field) for an item of context information related to the first query. In some embodiments, after obtaining the first query, the computer system identifies that an intent, entity, and/or parameter associated with the first query does not satisfy confidence criteria (e.g., the intent, entity, and/or parameter cannot be determined with sufficient confidence), and outputs a request to the user to confirm and/or clarify the ambiguous value. In some embodiments, after outputting the prompt for the item of context information related to the first query, the computer system receives a user input identifying the item of context information related to the first query, wherein the additional context information includes the item of context information related to the first query (e.g., 1524B). For example, the computer system includes the prompted confirmation and/or clarification in the additional context information to determine whether a correction is needed.

In some embodiments, generating the second response handling information includes, in accordance with a determination that the second handling agent is a first type of handling agent (e.g., an agent such as the first digital assistant execution module 908), generating, based on the first query and the additional context information related to the first query, a second rewritten version of the first query (e.g., 1530). In some embodiments, generating the second response handling information includes, in accordance with a determination that the second handling agent is a second type of handling agent (e.g., an agent such as the plan generation module 910), selecting a set of context information related to the first query (e.g., as described with respect to FIGS. 15D-15F) (in some embodiments, the set of context information includes an initial query re-write and/or the first query).

In some embodiments, identifying the correction to the first query includes identifying, based on the first query, a first response domain, and identifying, based on the additional context information related to the first query, a second response domain different from the first response domain (e.g., as described with respect to FIGS. 15A-15C). For example, a correction exists when the ontological and/or task domain initially identified for the first query changes based on the additional context.

In some embodiments, identifying the correction to the first query includes identifying, based on the first query, a first intent (e.g., 1506A), and identifying, based on the additional context information related to the first query, a second intent (e.g., 1506B) different from the first intent (e.g., as described with respect to FIGS. 15A-15C). For example, a correction exists when the intent initially identified for the first query changes based on the additional context.

In some embodiments, identifying the correction to the first query includes identifying, based on the first query, a first parameter value for a first parameter (e.g., 1544A) (e.g., a first slot), and identifying, based on the additional context information related to the first query, a second parameter value for the first parameter (e.g., 1544B and/or 1524C) (e.g., as described with respect to FIGS. 15D-15I). For example, a correction exists when a parameter value initially identified for the first query changes based on the additional context.

In some embodiments, selecting the first handling agent for the first query includes determining, based on the first query, a respective response domain. In some embodiments, selecting the first handling agent for the first query includes, in accordance with a determination that the respective response domain corresponds to a first set of response domains, selecting a first respective handling agent from the plurality of handling agents, and in accordance with a determination that the respective response domain corresponds to a second set of response domains different from the first set of response domains, selecting a second respective handling agent from the plurality of handling agents (e.g., as described with respect to FIGS. 15A-15F). For example, domains such as medicine, private information, photos, and/or text messaging are included in the first set of response domains, and domains such as information seeking, ordering food, and/or emailing are included in the second set of response domains.

In some embodiments, selecting the first handling agent for the first query includes determining, based on the first query, a respective intent (e.g., 1506A, 1526A, and/or 1546A). In some embodiments, selecting the first handling agent for the first query includes, in accordance with a determination that the respective intent corresponds to a first set of intents, selecting a first respective handling agent from the plurality of handling agents, and in accordance with a determination that the respective intent corresponds to a second set of intents different from the first set of intents, selecting a second respective handling agent from the plurality of handling agents (e.g., as described with respect to FIGS. 15A-15C). For example, domains such as sending texts, reading biometric data, and/or checking secure online account information are included in the first set of response domains, and domains such as sending emails, ordering delivery, and/or searching the internet are included in the second set of response domains.

In some embodiments, selecting the first handling agent for the first query includes determining, based on the first query, a respective parameter value for a respective parameter. In some embodiments, selecting the first handling agent for the first query includes, in accordance with a determination that the respective parameter value corresponds to a first type of value (e.g., as described with respect to 1524C) (e.g., a piece of private and/or personal information, such as a phone number, address, email address, and/or biometric reading), selecting a first respective handling agent from the plurality of handling agents, and in accordance with a determination that the respective parameter value does not correspond to the first type of value (e.g., the parameter value is not private and/or personal information), selecting a second respective handling agent from the plurality of handling agents (e.g., as described with respect to FIGS. 15D-15F).

In some embodiments, selecting the first handling agent for the first query includes, in accordance with a determination that the first query satisfies a set of one or more privacy criteria (e.g., the domain, intent, and/or parameter values of determined from the first query indicate that the query relates to a private and/or personal topic and/or information), selecting a first respective handling agent from the plurality of handling agents, and in accordance with a determination that the first query does not satisfy the set of one or more privacy criteria, selecting a second respective handling agent from the plurality of handling agents (e.g., as described with respect to FIGS. 15D-15F).

In some embodiments, selecting the first handling agent for the first query includes determining, based on the first query, a first tool (e.g., 1506A, 1526A, and/or 1546A) (e.g., an actionable intent; in some embodiments, an application intent) corresponding to the first query. In some embodiments, selecting the first handling agent for the first query includes, in accordance with a determination that the first tool is included in a first set of tools associated with a first respective handling agent of the plurality of handling agents, selecting the first respective handling agent from the plurality of handling agents, and in accordance with a determination that the first tool is included in a second set of tools associated with a second respective handling agent of the plurality of handling agents, selecting the second respective handling agent from the plurality of handling agents (e.g., as described with respect to FIGS. 15A-15C). For example, the first set of tools represent the intent capabilities of the first respective handling agent (e.g., intents handled by and/or accessible to the first respective handling agent). For example, the second set of tools represent the intent capabilities of the second respective handling agent (e.g., intents handled by and/or accessible to the second respective handling agent).

The operations described above with reference to FIGS. 16A-16B are optionally implemented by components depicted in FIGS. 1-4A, 6A-6B, 7A-7C, 8, 9, 10A-10E, 11A-11C, 12A-12D, and/or 15A-15I. For example, the operations of process 1600 may be implemented by digital assistant 900 residing on computer systems 1000, 1100, 1200, and/or 1500. It would be clear to a person having ordinary skill in the art how other processes are implemented based on the components depicted in FIGS. 1-4A, 6A-6B, 7A-7C, 8, 9, 10A-10C, 11A-11C, 12A-12D, and/or 15A-15I.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

Some embodiments described herein can include use of artificial intelligence and/or machine learning systems (sometimes referred to herein as the AI/ML systems). The use can include collecting, processing, labeling, organizing, analyzing, recommending and/or generating data. Entities that collect, share, and/or otherwise utilize user data should provide transparency and/or obtain user consent when collecting such data. The present disclosure recognizes that the use of the data in the AI/ML systems can be used to benefit users. For example, the data can be used to train models that can be deployed to improve performance, accuracy, and/or functionality of applications and/or services. Accordingly, the use of the data enables the AI/ML systems to adapt and/or optimize operations to provide more personalized, efficient, and/or enhanced user experiences. Such adaptation and/or optimization can include tailoring content, recommendations, and/or interactions to individual users, as well as streamlining processes, and/or enabling more intuitive interfaces. Further beneficial uses of the data in the AI/ML systems are also contemplated by the present disclosure.

The present disclosure contemplates that, in some embodiments, data used by AI/ML systems includes publicly available data. To protect user privacy, data may be anonymized, aggregated, and/or otherwise processed to remove or to the degree possible limit any individual identification. As discussed herein, entities that collect, share, and/or otherwise utilize such data should obtain user consent prior to and/or provide transparency when collecting such data. Furthermore, the present disclosure contemplates that the entities responsible for the use of data, including, but not limited to data used in association with AI/ML systems, should attempt to comply with well-established privacy policies and/or privacy practices.

For example, such entities may implement and consistently follow policies and practices recognized as meeting or exceeding industry standards and regulatory requirements for developing and/or training AI/ML systems. In doing so, attempts should be made to ensure all intellectual property rights and privacy considerations are maintained. Training should include practices safeguarding training data, such as personal information, through sufficient protections against misuse or exploitation. Such policies and practices should cover all stages of the AI/ML systems development, training, and use, including data collection, data preparation, model training, model evaluation, model deployment, and ongoing monitoring and maintenance. Transparency and accountability should be maintained throughout. Such policies should be easily accessible by users and should be updated as the collection and/or use of data changes. User data should be collected for legitimate and reasonable uses of the entity and not shared or sold outside of those legitimate uses. Further, such collection and sharing should occur through transparency with users and/or after receiving the informed consent of the users. Additionally, such entities should consider taking any needed steps for safeguarding and securing access to such data and ensuring that others with access to the data adhere to their privacy policies and procedures. Further, such entities should subject themselves to evaluation by third parties to certify, as appropriate for transparency purposes, their adherence to widely accepted privacy policies and practices. In addition, policies and/or practices should be adapted to the particular type of data being collected and/or accessed and tailored to a specific use case and applicable laws and standards, including jurisdiction-specific considerations.

In some embodiments, AI/ML systems may utilize models that may be trained (e.g., supervised learning or unsupervised learning) using various training data, including data collected using a user device. Such use of user-collected data may be limited to operations on the user device. For example, the training of the model can be done locally on the user device so no part of the data is sent to another device. In other implementations, the training of the model can be performed using one or more other devices (e.g., server(s)) in addition to the user device but done in a privacy preserving manner, e.g., via multi-party computation as may be done cryptographically by secret sharing data or other means so that the user data is not leaked to the other devices.

In some embodiments, the trained model can be centrally stored on the user device or stored on multiple devices, e.g., as in federated learning. Such decentralized storage can similarly be done in a privacy preserving manner, e.g., via cryptographic operations where each piece of data is broken into shards such that no device alone (i.e., only collectively with another device(s)) or only the user device can reassemble or use the data. In this manner, a pattern of behavior of the user or the device may not be leaked, while taking advantage of increased computational resources of the other devices to train and execute the ML model. Accordingly, user-collected data can be protected. In some implementations, data from multiple devices can be combined in a privacy-preserving manner to train an ML model.

In some embodiments, the present disclosure contemplates that data used for AI/ML systems may be kept strictly separated from platforms where the AI/ML systems are deployed and/or used to interact with users and/or process data. In such embodiments, data used for offline training of the AI/ML systems may be maintained in secured datastores with restricted access and/or not be retained beyond the duration necessary for training purposes. In some embodiments, the AI/ML systems may utilize a local memory cache to store data temporarily during a user session. The local memory cache may be used to improve performance of the AI/ML systems. However, to protect user privacy, data stored in the local memory cache may be erased after the user session is completed. Any temporary caches of data used for online learning or inference may be promptly erased after processing. All data collection, transfer, and/or storage should use industry-standard encryption and/or secure communication.

In some embodiments, as noted above, techniques such as federated learning, differential privacy, secure hardware components, homomorphic encryption, and/or multi-party computation among other techniques may be utilized to further protect personal information data during training and/or use of the AI/ML systems. The AI/ML systems should be monitored for changes in underlying data distribution such as concept drift or data skew that can degrade performance of the AI/ML systems over time.

In some embodiments, the AI/ML systems are trained using a combination of offline and online training. Offline training can use curated datasets to establish baseline model performance, while online training can allow the AI/ML systems to continually adapt and/or improve. The present disclosure recognizes the importance of maintaining strict data governance practices throughout this process to ensure user privacy is protected.

In some embodiments, the AI/ML systems may be designed with safeguards to maintain adherence to originally intended purposes, even as the AI/ML systems adapt based on new data. Any significant changes in data collection and/or applications of an AI/ML system use may (and in some cases should) be transparently communicated to affected stakeholders and/or include obtaining user consent with respect to changes in how user data is collected and/or utilized.

Despite the foregoing, the present disclosure also contemplates embodiments in which users selectively restrict and/or block the use of and/or access to data. That is, the present disclosure contemplates that hardware and/or software elements can be provided to prevent or block access to data. For example, in the case of some services, the present technology should be configured to allow users to select to "opt in" or "opt out" of participation in the collection of data during registration for services or anytime thereafter. In another example, the present technology should be configured to allow users to select not to provide certain data for training the AI/ML systems and/or for use as input during the inference stage of such systems. In yet another example, the present technology should be configured to allow users to be able to select to limit the length of time data is maintained or entirely prohibit the use of their data for use by the AI/ML systems. In addition to providing "opt in" and "opt out" options, the present disclosure contemplates providing notifications relating to the access or use of personal information. For instance, a user can be notified when their data is being input into the AI/ML systems for training or inference purposes, and/or reminded when the AI/ML systems generate outputs or make decisions based on their data.

The present disclosure recognizes AI/ML systems should incorporate explicit restrictions and/or oversight to mitigate against risks that may be present even when such systems having been designed, developed, and/or operated according to industry best practices and standards. For example, outputs may be produced that could be considered erroneous, harmful, offensive, and/or biased; such outputs may not necessarily reflect the opinions or positions of the entities developing or deploying these systems. Furthermore, in some cases, references to third-party products and/or services in the outputs should not be construed as endorsements or affiliations by the entities providing the AI/ML systems. Generated content can be filtered for potentially inappropriate or dangerous material prior to being presented to users, while human oversight and/or ability to override or correct erroneous or undesirable outputs can be maintained as a failsafe.

The present disclosure further contemplates that users of the AI/ML systems should refrain from using the services in any manner that infringes upon, misappropriates, or violates the rights of any party. Furthermore, the AI/ML systems should not be used for any unlawful or illegal activity, nor to develop any application or use case that would commit or facilitate the commission of a crime, or other tortious, unlawful, or illegal act. The AI/ML systems should not violate, misappropriate, or infringe any copyrights, trademarks, rights of privacy and publicity, trade secrets, patents, or other proprietary or legal rights of any party, and appropriately attribute content as required. Further, the AI/ML systems should not interfere with any security, digital signing, digital rights management, content protection, verification, or authentication mechanisms. The AI/ML systems should not misrepresent machine-generated outputs as being human-generated.

As described above, one aspect of the present technology is the gathering and use of data available from various sources to improve the delivery to users of responses to queries. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver responses that are of greater interest to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of responding to queries, the present technology can be configured to allow users to select to "opt in" or "opt out" of participation in the collection of personal information data during registration for services or anytime thereafter. In another example, users can select not to provide mood-associated data for response generation services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A computer system configured to communicate with a display generation component and an input device comprising:

one or more processors; and memory storing one or more programs configured to be executed by the one or more processors, the one or more programs including instructions for:

detecting a query;

in response to detecting the query:

retrieving contextual data related to the query;

in accordance with a determination that the query includes a request of a first type, wherein determining that the query includes the request of the first type includes determining that the query does not include a complex knowledge seeking intent:

converting the query to a rewritten query based on the contextual data related to the query; and providing the rewritten query to a first digital assistant component; and in accordance with a determination that the query includes a request of a second type different from the request of the first type, wherein determining that the query includes the request of the second type includes determining that the query includes a complex knowledge seeking intent;

providing the query and the contextual data related to the query to a second digital assistant component different from the first digital assistant component; and generating, using a large language model of the second digital assistant component, a prompt with a format for a large language model of a third digital assistant component that is different from the second digital assistant component and the first digital assistant component, wherein the prompt is generated based on the query and the contextual data and includes a plurality of possible application intents and a plurality of possible entities for performing the complex knowledge seeking intent.

2. The computer system of claim 1, wherein the contextual data related to the query includes a set of possible entities available to the computer system that match the query.

3. The computer system of claim 2, wherein the set of possible entities includes an entity being displayed via a display generation component of the computer system.

4. The computer system of claim 1, wherein the contextual data includes an application intent related to the query.

5. The computer system of claim 4, the one or more programs further including instructions for:

selecting the application intent from a list of application intents associated with an application included in the query.

6. The computer system of claim 4, the one or more programs further including instructions for:

selecting the application intent from a list of application intents associated with an application displayed via a display generation component of the computer system.

7. The computer system of claim 1, the one or more programs further including instructions for:

determining a semantic comparison between the query and a set of possible application intents; and selecting the application intent related to the query from the set of possible application intents.

8. The computer system of claim 7, wherein determining the semantic comparison between the query and the set of possible application intents includes:

comparing the query to a set of descriptions corresponding to the set of possible application intents; and comparing the query to a set of examples corresponding to the set of possible application intents.

9. The computer system of claim 1, wherein the contextual data includes conversational history between a user and a digital assistant.

10. The computer system of claim 1, wherein determining that the query includes the request of the first type further comprises:

determining whether a domain of the query corresponds to a domain associated with the request of the first type.

11. The computer system of claim 1, wherein determining that the query includes the request of the first type further comprises:

determining a type of contextual data required to respond to the query; and determining whether the type of contextual data required to respond to the query is a type of contextual data for the first digital assistant component.

12. The computer system of claim 1, wherein determining that the query includes the request of the first type further comprises:

determining a task specified in the query; and in accordance with a determination that the task specified in the query is a task associated with the first digital assistant component, determining that the query includes the request of the first type.

13. The computer system of claim 1, wherein determining that the query includes the request of the first type further comprises:

in accordance with a determination that the query specifies the first digital assistant component, determining that the query includes the request of the first type.

14. The computer system of claim 1, wherein converting the query to the rewritten query based on the contextual data related to the query further comprises:

adding information from a subsequently received query to the query to create the rewritten query.

15. The computer system of claim 1, the one or more programs further including instructions for:

after providing the rewritten query to the first digital assistant component:

causing the first digital assistant component to perform a task determined from the rewritten query; and providing an output of the task.

16. The computer system of claim 1, the one or more programs further including instructions for:

in response to detecting the query and after retrieving contextual data related to the query:

separating the query into a first query and a second query.

17. The computer system of claim 16, where in the first query is determined based on a first domain associated with a first request of the query and the second query is determined based on a second domain associated with a second request of the query.

18. The computer system of claim 16, the one or more programs further including instructions for:

after separating the query into the first query and the second query:

in accordance with a determination that the first query includes the request of the first type:

converting the first query to the rewritten query based on the contextual data related to the query; and providing the rewritten query to the first digital assistant component; and in accordance with a determination that the first query includes the request of the second type different from the request of the first type, providing the first query and the contextual data related to the query to the second digital assistant component different from the first digital assistant component.

19. The computer system of claim 16, the one or more programs further including instructions for:

after separating the query into the first query and the second query:

providing the first query to the first digital assistant component; and providing the second query to the second digital assistant component different from the first digital assistant component.

20. The computer system of claim 19, the one or more programs further including instructions for:

causing the first digital assistant component to perform a first task determined from the first query;

generating, using the large language model of the second digital assistant component, a prompt with a format for the large language model of a third digital assistant component that is different from the second digital assistant component and the first digital assistant component;

causing the third digital assistant component to perform a second task determined from the second query using the prompt; and providing an output including results of the first task and the second task.

21. The computer system of claim 1, wherein the query with the complex knowledge seeking intent includes a query that requires an output of a first task determined from the request to be used as an input of a second task determined from the request.

22. A non-transitory computer-readable storage medium storing one or more programs configured to be executed by one or more processors of a computer system that is in communication with a display generation component and an input device, the one or more programs including instructions for:

detecting a query;

in response to detecting the query:

retrieving contextual data related to the query;

in accordance with a determination that the query includes a request of a first type, wherein determining that the query includes the request of the first type includes determining that the query does not include a complex knowledge seeking intent:

converting the query to a rewritten query based on the contextual data related to the query; and providing the rewritten query to a first digital assistant component; and in accordance with a determination that the query includes a request of a second type different from the request of the first type, wherein determining that the query includes the request of the second type includes determining that the query includes a complex knowledge seeking intent;

providing the query and the contextual data related to the query to a second digital assistant component different from the first digital assistant component; and generating, using a large language model of the second digital assistant component, a prompt with a format for a large language model of a third digital assistant component that is different from the second digital assistant component and the first digital assistant component, wherein the prompt is generated based on the query and the contextual data and includes a plurality of possible application intents and a plurality of possible entities for performing the complex knowledge seeking intent.

23. The non-transitory computer-readable subject matter of claim 22, wherein the contextual data related to the query includes a set of possible entities available to the computer system that match the query.

24. The non-transitory computer-readable subject matter of claim 22, wherein the contextual data includes an application intent related to the query.

25. The non-transitory computer-readable subject matter of claim 22, the one or more programs further including instructions for:

determining a semantic comparison between the query and a set of possible application intents; and selecting the application intent related to the query from the set of possible application intents.

26. The non-transitory computer-readable subject matter of claim 22, wherein the contextual data includes conversational history between a user and a digital assistant.

27. The non-transitory computer-readable subject matter of claim 22, wherein determining that the query includes the request of the first type further comprises:

determining whether a domain of the query corresponds to a domain associated with the request of the first type.

28. The non-transitory computer-readable subject matter of claim 22, wherein determining that the query includes the request of the first type further comprises:

determining a type of contextual data required to respond to the query; and determining whether the type of contextual data required to respond to the query is a type of contextual data for the first digital assistant component.

29. The non-transitory computer-readable subject matter of claim 22, wherein determining that the query includes the request of the first type further comprises:

determining a task specified in the query; and in accordance with a determination that the task specified in the query is a task associated with the first digital assistant component, determining that the query includes the request of the first type.

30. The non-transitory computer-readable subject matter of claim 22, wherein determining that the query includes the request of the first type further comprises:

in accordance with a determination that the query specifies the first digital assistant component, determining that the query includes the request of the first type.

31. The non-transitory computer-readable subject matter of claim 22, wherein converting the query to the rewritten query based on the contextual data related to the query further comprises:

adding information from a subsequently received query to the query to create the rewritten query.

32. The non-transitory computer-readable subject matter of claim 22, the one or more programs further including instructions for:

after providing the rewritten query to the first digital assistant component:

causing the first digital assistant component to perform a task determined from the rewritten query; and providing an output of the task.

33. The non-transitory computer-readable subject matter of claim 22, the one or more programs further including instructions for:

in response to detecting the query and after retrieving contextual data related to the query:

separating the query into a first query and a second query.

34. A method comprising:

at a computer system that is configured to communicate with a display generation component and an input device:

detecting a query;

in response to detecting the query:

retrieving contextual data related to the query;

in accordance with a determination that the query includes a request of a first type, wherein determining that the query includes the request of the first type includes determining that the query does not include a complex knowledge seeking intent:

converting the query to a rewritten query based on the contextual data related to the query; and providing the rewritten query to a first digital assistant component; and in accordance with a determination that the query includes a request of a second type different from the request of the first type, wherein determining that the query includes the request of the second type includes determining that the query includes a complex knowledge seeking intent;

providing the query and the contextual data related to the query to a second digital assistant component different from the first digital assistant component; and generating, using a large language model of the second digital assistant component, a prompt with a format for a large language model of a third digital assistant component that is different from the second digital assistant component and the first digital assistant component, wherein the prompt is generated based on the query and the contextual data and includes a plurality of possible application intents and a plurality of possible entities for performing the complex knowledge seeking intent.

35. The method of claim 34, wherein the contextual data related to the query includes a set of possible entities available to the computer system that match the query.

36. The method of claim 34, wherein the contextual data includes an application intent related to the query.

37. The method of claim 34, further comprising:

determining a semantic comparison between the query and a set of possible application intents; and selecting the application intent related to the query from the set of possible application intents.

38. The method of claim 34, wherein the contextual data includes conversational history between a user and a digital assistant.

39. The method of claim 34, wherein determining that the query includes the request of the first type further comprises:

determining whether a domain of the query corresponds to a domain associated with the request of the first type.

40. The method of claim 34, wherein determining that the query includes the request of the first type further comprises:

determining a type of contextual data required to respond to the query; and determining whether the type of contextual data required to respond to the query is a type of contextual data for the first digital assistant component.

41. The method of claim 34, wherein determining that the query includes the request of the first type further comprises:

determining a task specified in the query; and in accordance with a determination that the task specified in the query is a task associated with the first digital assistant component, determining that the query includes the request of the first type.

42. The method of claim 34, wherein determining that the query includes the request of the first type further comprises:

in accordance with a determination that the query specifies the first digital assistant component, determining that the query includes the request of the first type.

43. The method of claim 34, wherein converting the query to the rewritten query based on the contextual data related to the query further comprises:

adding information from a subsequently received query to the query to create the rewritten query.

44. The method of claim 34, further comprising:

after providing the rewritten query to the first digital assistant component:

causing the first digital assistant component to perform a task determined from the rewritten query; and providing an output of the task.

45. The method of claim 23, further comprising:

in response to detecting the query and after retrieving contextual data related to the query:

separating the query into a first query and a second query.

*    *    *    *    *